US011635302B2

(12) United States Patent
O'Beirne et al.

(10) Patent No.: US 11,635,302 B2
(45) Date of Patent: Apr. 25, 2023

(54) MAPPING APPLICATION WITH TRANSIT MODE

(71) Applicant: Apple Inc., Cupertino, CA (US)

(72) Inventors: Justin O'Beirne, San Francisco, CA (US); Eleanor Cady Wachsman, San Francisco, CA (US); Nathaniel V. Kelso, San Francisco, CA (US); Aaron A. Reiner, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 17/334,059

(22) Filed: May 28, 2021

(65) Prior Publication Data
US 2021/0302193 A1   Sep. 30, 2021

Related U.S. Application Data

(63) Continuation of application No. 16/439,979, filed on Jun. 13, 2019, now Pat. No. 11,054,275, which is a continuation of application No. 15/645,889, filed on Jul. 10, 2017, now Pat. No. 10,345,117, which is a continuation of application No. 14/871,403, filed on Sep. 30, 2015, now Pat. No. 9,702,724, which is a continuation-in-part of application No. 14/869,995,
(Continued)

(51) Int. Cl.
| | |
|---|---|
| *G01C 21/36* | (2006.01) |
| *G06T 11/00* | (2006.01) |
| *G01C 21/32* | (2006.01) |
| *G01C 21/34* | (2006.01) |
| *G09B 29/00* | (2006.01) |
| *G08G 1/123* | (2006.01) |

(52) U.S. Cl.
CPC ......... *G01C 21/3676* (2013.01); *G01C 21/32* (2013.01); *G01C 21/3423* (2013.01); *G01C 21/367* (2013.01); *G01C 21/3679* (2013.01); *G06T 11/001* (2013.01); *G09B 29/008* (2013.01)

(58) Field of Classification Search
CPC .... G01C 21/36; G01C 21/3676; G01C 21/32; G01C 21/3423; G01C 21/367; G08G 1/123; G06T 11/001
See application file for complete search history.

(56) References Cited

U.S. PATENT DOCUMENTS

| | | | | |
|---|---|---|---|---|
| 6,912,462 B2 * | 6/2005 | Ogaki | ..................... | G06F 16/29 |
| | | | | 340/995.14 |
| 8,868,338 B1 * | 10/2014 | Chau | ................... | G09B 29/106 |
| | | | | 701/458 |
| 2013/0325321 A1 * | 12/2013 | Pylappan | ............... | G01C 21/20 |
| | | | | 701/410 |

OTHER PUBLICATIONS

Google Maps, "Layers in Google Maps," Mar. 28, 2012, Retrieved from https://www.youtube.com/watch?v=AE-Al5mNu44, Retrieved on Oct. 11, 2023, p. 3.

(Continued)

*Primary Examiner* — Tan Q Nguyen
(74) *Attorney, Agent, or Firm* — Invoke

(57) ABSTRACT

Some embodiments provide a mapping application that displays a transit map including a group of transit lines. The mapping application receives a request to display a transit route in the transit map. The mapping application also, in response to the received request, displays the transit route by modifying portions of transit lines along the route to emphasize the portions of the transit lines while modifying other transit lines not along the route to de-emphasize the transit lines not along the route.

20 Claims, 30 Drawing Sheets

Related U.S. Application Data filed on Sep. 29, 2015, now Pat. No. 10,514,271, and a continuation-in-part of application No. 14/869,993, filed on Sep. 29, 2015, now Pat. No. 10,495,478, and a continuation-in-part of application No. 14/545,680, filed on Jun. 6, 2015, now Pat. No. 9,726,506.

(60) Provisional application No. 62/172,147, filed on Jun. 7, 2015.

(56) References Cited

OTHER PUBLICATIONS

Google, "Google Maps for mobile Layers," Oct. 6, 2009, Retrieved from https://www.youtube.com/watch?v=1W90u0Y1HGI, Retrieved on Oct. 11, 2022, p. 2.

Jarober, "JS 4U 230: Layering on a Transit Map," Dec. 18, 2012, Retrieved from https://www.youtube.com/watch?v=NJOBWu_r7l, Retrieved on Oct. 11, 2022, p. 3.

\* cited by examiner

MAPPING APPLICATION WITH TRANSIT MODE

INCORPORATION BY REFERENCE; DISCLAIMER

Each of the following applications are hereby incorporated by reference: application Ser. No. 16/439,979 filed Jun. 13, 2019; application Ser. No. 15/645,889 filed Jul. 10, 2017; application Ser. No. 14/871,403 filed Sep. 30, 2015; application Ser. No. 14/869,995 filed Sep. 29, 2015; application Ser. No. 14/869,993 filed Sep. 29, 2015; application No. 62/172,147 filed Jun. 7, 2015; application Ser. No. 14/545,680 filed Jun. 6, 2015. The Applicant hereby rescinds any disclaimer of claim scope in the parent application(s) or the prosecution history thereof and advises the USPTO that the claim in this application may be broader than any claim in the parent application(s).

BACKGROUND

With proliferation of mobile devices such as smartphones, users are enjoying numerous applications of numerous kinds that can be run on their devices. One popular type of such application is mapping and navigation applications that allow users to browse maps and get route directions. Despite their popularity, these mapping and navigation applications have yet to introduce a comprehensive and efficient transit muting and navigation system to the market.

BRIEF SUMMARY

Some embodiments provide an integrated mapping and navigation application with several map browsing modes, including a novel transit browsing mode. The mapping and navigation application of some embodiments executes on a mobile device (e.g., a smartphone, tablet, etc.) and may be used to view maps (e.g., around a current device location) and routes from a specified location (e.g., the current location of the device) to a specified destination. In some embodiments, the map browsing modes include a standard map browsing mode that displays a first schematic map of a region emphasizing a first set of features and a transit map browsing mode that displays a second schematic map of the region emphasizing a second set of transit-related features. The map browsing modes of some embodiments may also include a raster-image based mode, and a hybrid of the standard (or transit) mode with the raster-image based mode.

In some embodiments, the standard map browsing mode emphasizes roads, land cover (e.g., parks, etc.), places of interest, waterways, etc. by presenting these map constructs using bright and vivid colors, as well as prominently displaying road and place of interest names, road shields (e.g., Interstate highway shields), etc. In the transit map browsing mode, however, these constructs are de-emphasized in favor of transit-related constructs. For example, in some embodiments, the same map region is displayed in transit mode with fewer roads displayed and labeled, and the land cover, roads, and waterways displayed using more faded coloration. However, in transit mode, the application displays the transit lines and transit stations in the region, using much more vivid colors. In some embodiments, the application uses transit line colors based on the colors used by the transit system providers to identify different transit routes in the region. In some embodiments, the application uses stylesheets to render the same data (e.g., the same vector-based polygons) using different textures and/or colors in standard mode and transit mode. For instance, the stylesheet might specify a bright green texture for parks in standard mode but a paler green texture for the same parks in transit mode.

As mentioned, the transit mode of some embodiments emphasizes transit-related map constructs, including transit lines and transit stations. In some embodiments, different zoom levels of the transit mode will display different features. At the lowest zoom levels (e.g., displaying an entire country or continent), intra-city transit will not be shown, and only the large-scale transit lines (e.g., interstate train or bus lines, large intra-state lines) will be shown. These may correlate to a specific transit route or transit provider, or simply show the existence of transit routes between cities. As the user zooms in to higher zoom levels, the application displays more detailed transit information in some embodiments. Smaller-scale transit lines are shown, using colors that differentiate the different lines. In addition, transit line shields are displayed along the lines to allow the user to identify the different transit providers and/or transit routes.

In some embodiments, at a given zoom level, the application displays certain transit lines more prominently than other transit lines. For instance, certain lines deemed to be more important for the particular map region (e.g., higher-frequency lines, lines for a particular transit system, lines that carry more passengers on a regular basis, etc.) are displayed using thicker lines and/or brighter, more saturated coloration. In addition, when multiple transit routes share the same tracks (for. e.g., trains) or mads (for. e.g., buses), some embodiments display the multiple routes as a single line, with multiple line shields to indicate the multiple different transit routes (e.g., different trains or buses). When one of the routes branches off, some embodiments use the single line shield to identify that branch, in some cases displaying the branch as a thinner line than used for the trunk line. For more important transit systems in the area, some embodiments display multi-colored lines next to each other rather than grouping the lines into a single transit line. In addition, when multiple lines use parallel, but separate tracks, the application of some embodiments displays the lines separately.

Some embodiments display road labels in transit mode, though for fewer roads than in the standard map browsing mode. Specifically, some embodiments display mad labels for mads along which transit lines travel (e.g., bus lines, trolley lines, etc.). In some embodiments, the application displays these road labels on the road (as in standard map browsing mode) when the road label does not obscure any transit stops or stations along the mad. However, when the transit line includes too many transit stops or stations, the application displays the mad label next to the road rather than overlaid on the mad (as when displaying traffic information in standard mode of some embodiments).

In addition to transit lines, the application also prominently displays transit stations, which also vary in appearance based on the zoom level. At very low zoom levels, the application, may only display major cities along the transit lines, not indicating any information about particular stations within the cities. At slightly higher zoom levels, but still showing a large-scale transit map, more cities are displayed, but only one station representation is shown for the city (even if multiple stations or stops am present in the city). As the zoom level is increased, more transit station information will be displayed.

In some embodiments, the transit stations or stops along a transit line are displayed using the same color as the line (e.g., circles of that color), and labeled with the station name. When a station includes stops for more than one transit route, however, some embodiments use a white station representation (referred to herein as a pill). The white station pills may be circles, or may be represented using oblong shapes so that the station representation is intersected by the transit line representation of each transit route that runs though or stops at the station. This enables users to identify which stations allow for transfers between transit routes. In addition, when stations are connected (e.g., by above-ground or underground walkways), some embodiments display these connections between the white station pills once the user has zoomed in enough on the transit map.

At still higher zoom levels, some embodiments display an outline of the transit station shape using polygons, with the entrances and exits of the station highlighted in the map. Some embodiments use a transparent texture to indicate below-ground stations (e.g., subway terminals) and a more opaque texture to indicate above-ground stations (with a single station possibly having both above-ground and below-ground sections).

In some embodiments, the transit information may be dynamic based on incident information as well as the time of day. Some embodiments include selectable items on the map display indicating transit-related incidents, which may be selected to view further information about the incident. These incidents may indicate line or station closures, accidents, construction, etc., which may affect the travel time along a transit route. Furthermore, some embodiments display transit lines and stations differently at different times of the day, depending on whether the routes are operating and the stations are open or closed. Specifically, some embodiments display transit lines as dashed lines (rather than solid lines), using dimmer coloration, or otherwise de-emphasized at times of day that the corresponding routes are not operating. Similarly, transit stations that are closed am displayed using cross-hatching, a different color, etc. to indicate that the station is not open.

The transit constructs (lines and stations) are selectable in some embodiments. Specifically, selecting a transit line causes the mapping application to emphasize that line by comparison to the non-selected lines in the map display. Some embodiments display the selected line using a thicker line and/or higher color saturation, while also desaturating and/or thinning the non-selected lines. In other embodiments, the application desaturates and/or thins the non-selected lines, while leaving the selected line the same. In addition, transit stations along the non-selected line are de-emphasized in favor of the transit stations along the selected line. Users can also, in some embodiments, select a transit station in the map display. Doing so causes the application to emphasize all of the transit lines that intersect the selected station (and their respective stations and stops) in some embodiments, as though those lines were selected. In addition, the application displays a banner for the selected station, which is selectable to view additional station information.

In addition to the transit browsing mode, some embodiments include a transit navigation mode. In transit navigation mode, the application provides directions for various transit legs of a route to a destination, as well as directions for walking between the transit legs. The map display during transit navigation mode emphasizes the transit lines that are on the route over those that are not on the route. In addition, when walking to board a transit vehicle, the application provides detailed instructions for navigating a station, including which entrance of the station to use and from which platform to board a transit vehicle (if relevant). During a transit leg, the application highlights the stops on the current leg and updates the progress along that leg, so as to provide the user with an indication as to when to disembark the transit vehicle.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description. and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features of the invention am set forth in the appended claims. However, for purposes of explanation, several embodiments of the invention are set forth in the following figures.

DETAILED DESCRIPTION

Figure 1:
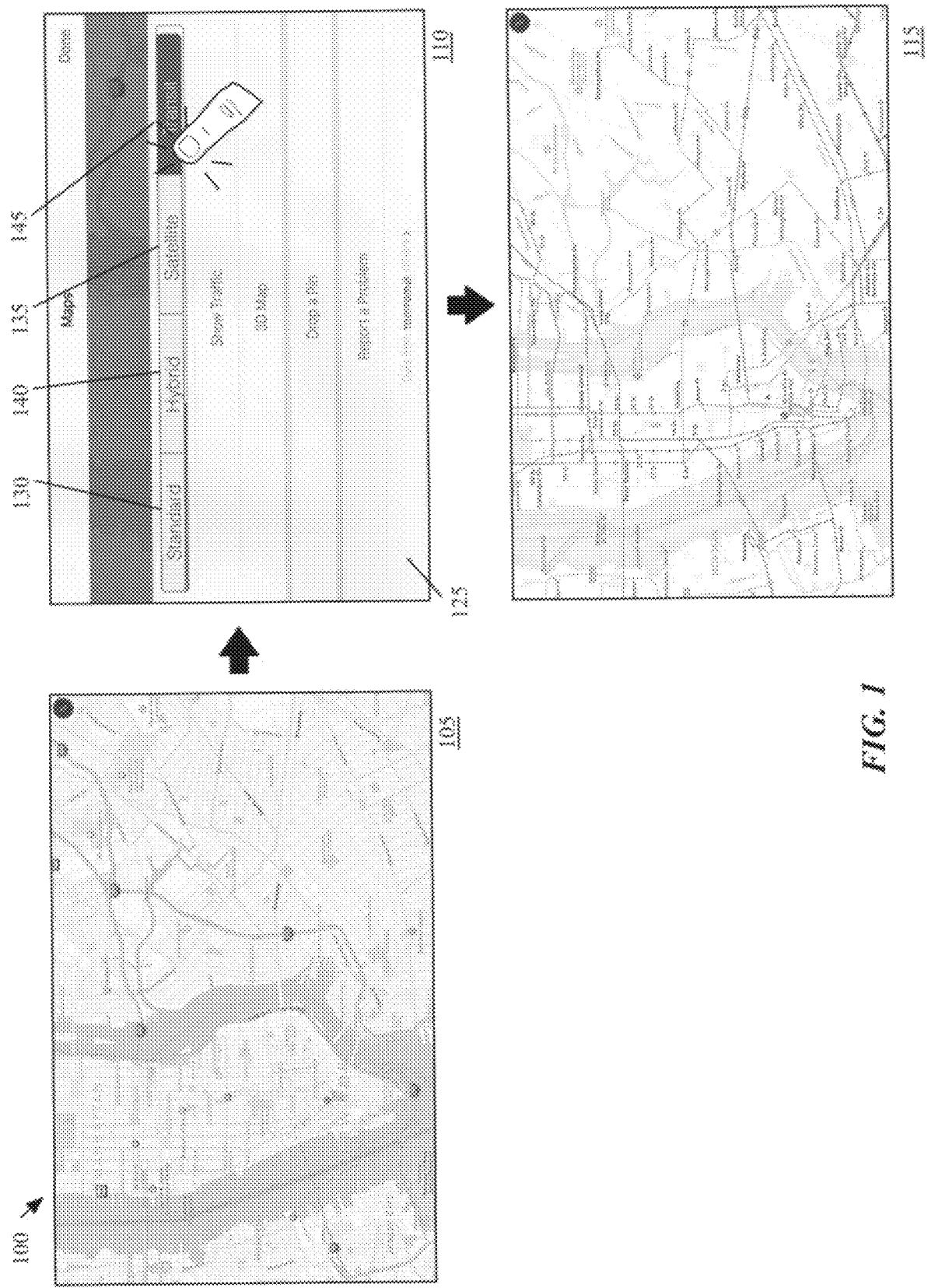
FIG. 1 illustrates an example of a graphical user interface of an integrated mapping application of some embodiments that includes a transit browsing mode.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide an integrated mapping and navigation application with several map browsing modes, including a novel transit browsing mode. The mapping and navigation application of some embodiments executes on a mobile device (e.g., a smartphone, tablet, etc.) and may be used to view maps (e.g., around a current device location) and routes from a specified location (e.g., the current location of the device) to a specified destination. In some embodiments, the map browsing modes include a standard map browsing mode that displays a first schematic map of a region emphasizing a first set of features and a transit map browsing mode that displays a second schematic map of the region emphasizing a second set of transit-related features. The map browsing modes of some embodiments may also include a raster-image based mode, and a hybrid of the standard (or transit) mode with the raster-image based mode.

In some embodiments, the standard map browsing mode emphasizes roads, land cover (e.g., parks, etc.), places of interest, waterways, etc. by presenting these map constructs using bright and vivid colors, as well as prominently displaying road and place of interest names, road shields (e.g., Interstate highway shields), etc. In the transit map browsing mode, however, these constructs are de-emphasized in favor of transit-related constructs. For example, in some embodiments, the same map region is displayed in transit mode with fewer roads displayed and labeled, and the land cover, roads, and waterways displayed using more faded coloration. However, in transit mode, the application displays the transit lines and transit stations in the region, using much more vivid colors. In some embodiments, the application uses transit line colors based on the colors used by the transit system providers to identify different transit routes in the region. In some embodiments, the application uses stylesheets to render the same data (e.g., the same vector-based polygons) using different textures and/or colors in standard mode and transit mode. For instance, the stylesheet might specify a bright green texture for parks in standard mode but a paler green texture for the same parks in transit mode.

As mentioned, the transit mode of some embodiments emphasizes transit-related map constructs, including transit lines and transit stations. In some embodiments, different zoom levels of the transit mode will display different features. At the lowest zoom levels (e.g., displaying an entire country or continent), intra-city transit will not be shown, and only the large-scale transit lines (e.g., interstate train or bus lines, large intra-state lines) will be shown. These may correlate to a specific transit route or transit provider, or simply show the existence of transit routes between cities. As the user zooms in to higher zoom levels, the application displays more detailed transit information in some embodiments. Smaller-scale transit lines are shown, using colors that differentiate the different lines. In addition, transit line shields are displayed along the lines to allow the user to identify the different transit providers and/or transit routes.

In some embodiments, at a given zoom level, the application displays certain transit lines more prominently than other transit lines. For instance, certain lines deemed to be more important for the particular map region (e.g., higher-frequency lines, lines for a particular transit system, lines that carry more passengers on a regular basis, etc.) are displayed using thicker lines and/or brighter, more saturated coloration. In addition, when multiple transit routes share the same tracks (for. e.g., trains) or mads (for. e.g., buses), some embodiments display the multiple routes as a single line, with multiple line shields to indicate the multiple different transit routes (e.g., different trains or buses). When one of the routes branches off, some embodiments use the single line shield to identify that branch, in some cases displaying the branch as a thinner line than used for the trunk line. For more important transit systems in the area, some embodiments display multi-colored lines next to each other rather than grouping the lines into a single transit line. In addition, when multiple lines use parallel, but separate tracks, the application of some embodiments displays the lines separately.

Some embodiments display road labels in transit mode, though for fewer roads than in the standard map browsing mode. Specifically, some embodiments display mad labels for mads along which transit lines travel (e.g., bus lines, trolley lines, etc.). In some embodiments, the application displays these road labels on the road (as in standard map browsing mode) when the road label does not obscure any transit stops or stations along the mad. However, when the transit line includes too many transit stops or stations, the application displays the road label next to the road rather than overlaid on the road (as when displaying traffic information in standard mode of some embodiments).

In addition to transit lines, the application also prominently displays transit stations, which also vary in appearance based on the zoom level. At very low zoom levels, the application, may only display major cities along the transit lines, not indicating any information about particular stations within the cities. At slightly higher zoom levels, but still showing a large-scale transit map, more cities are displayed, but only one station representation is shown for the city (even if multiple stations or stops are present in the city). As the zoom level is increased, more transit station information will be displayed.

In some embodiments, the transit stations or stops along a transit line are displayed using the same color as the line (e.g., circles of that color), and labeled with the station name. When a station includes stops for more than one transit route, however, some embodiments use a white station representation (referred to herein as a pill). The white station pills may be circles, or may be represented using oblong shapes so that the station representation is intersected by the transit line representation of each transit route that runs through or stops at the station. This enables users to identify which stations allow for transfers between transit routes. In addition, when stations are connected (e.g., by above-ground or underground walkways), some embodiments display these connections between the white station pills once the user has zoomed in enough on the transit map.

At still higher zoom levels, some embodiments display an outline of the transit station shape using polygons, with the entrances and exits of the station highlighted in the map. Some embodiments use a transparent texture to indicate below-ground stations (e.g., subway terminals) and a more opaque texture to indicate above-ground stations (with a single station possibly having both above-ground and below-ground sections).

In some embodiments, the transit information may be dynamic based on incident information as well as the time of day. Some embodiments include selectable items on the map display indicating transit-related incidents, which may be selected to view further information about the incident. These incidents may indicate line or station closures, accidents, construction, etc., which may affect the travel time along a transit route. Furthermore, some embodiments display transit lines and stations differently at different times of the day, depending on whether the routes are operating and the stations are open or closed. Specifically, some embodiments display transit lines as dashed lines (rather than solid lines), using dimmer coloration, or otherwise de-emphasized at times of day that the corresponding routes are not operating. Similarly, transit stations that am closed am displayed using cross-hatching, a different color, etc. to indicate that the station is not open.

The transit constructs (lines and stations) am selectable in some embodiments. Specifically, selecting a transit line causes the mapping application to emphasize that line by comparison to the non-selected lines in the map display. Some embodiments display the selected line using a thicker line and/or higher color saturation, while also desaturating and/or thinning the non-selected lines. In other embodiments, the application desaturates and/or thins the non-selected lines, while leaving the selected line the same. In addition, transit stations along the non-selected line am de-emphasized in favor of the transit stations along the selected line. Users can also, in some embodiments, select a transit station in the map display. Doing so causes the application to emphasize all of the transit lines that intersect the selected station (and their respective stations and stops) in some embodiments, as though those lines were selected. In addition, the application displays a banner for the selected station, which is selectable to view additional station information.

In addition to the transit browsing mode, some embodiments include a transit navigation mode. In transit navigation mode, the application provides directions for various transit legs of a route to a destination, as well as directions for walking between the transit legs. The map display during transit navigation mode emphasizes the transit lines that are on the route over those that are not on the route. In addition, when walking to board a transit vehicle, the application provides detailed instructions for navigating a station, including which entrance of the station to use and from which platform to board a transit vehicle (if relevant). During a transit leg, the application highlights the stops on the current leg and updates the progress along that leg, so as to provide the user with an indication as to when to disembark the transit vehicle.

I. Map Display in Transit Mode

The integrated mapping application of some embodiments includes several different modes for displaying a map, including a transit mode that emphasizes certain transit-related constructs (transit lines, transit stations, etc.). When a user initiates a transit browsing mode from another mode (e.g., a standard map mode, a raster-based satellite or flyover mode, a hybrid map/flyover mode, etc.), some embodiments modify the map display. Specifically, some embodiments modify the map cartography to display and emphasize transit stations and the transit lines that service and intersect those transit stations, while other features emphasized in the previous map rendering mode are diminished (e.g., highways, roads, parks, etc.). In some embodiments, the standard map features are displayed in such a way that they fade into the background, while the transit lines ae displayed in more vibrant colors in the foreground of the map display.

A. Initiating Transit Mode

FIG. 1 illustrates an example of a graphical user interface (GUI) 100 of an integrated mapping application of some embodiments that includes a transit browsing mode. The GUI 100 is displayed on a device that executes the mapping application, such as a smart phone, tablet, laptop computer, desktop computer, etc. This figure specifically illustrates an example of initiating a transit browsing mode through the mapping application GUI over three stages 105-115. The transit browsing mode has a novel user interface (UI) design that seamlessly and cohesively integrates transit information for a particular locality in which the GUI 100 is displaying.

The first stage 105 illustrates the mapping application displaying a map GUI 100 in the standard map mode of the application. This map specifically shows Manhattan, N.Y., and surrounding localities (e.g., portions of New Jersey, Brooklyn, etc.). As shown in the figure, the standard mode of the mapping application emphasizes various features in the map, including roads of various sizes, parks, points of interest, geographical features, etc. In some embodiments, the standard map browsing mode includes various user interface items (not shown in this figure), that allow the user to, e.g., switch between 2D and 3D map views, select the map browsing mode, and search for a location on the map. The user can search for a location in order to retrieve navigation instructions to the location (and subsequently enter a navigation mode) in some embodiments. In addition, some embodiments allow the user to view traffic information while in the standard mode.

The second stage 110 shows a mode selection GUI 125 of the mapping application after the user has selected a control (not shown) within the GUI 100 of the first stage 105. When the user selects the control (e.g., via a touchscreen gesture if the application operates on a touchscreen device, such as a tap operation, a swipe operation, etc.), some embodiments display the mode selection GUI 125 by sliding in the GUI over all or a portion of the map view, replacing the map view GUI 100 with the mode selection GUI 125, etc. The mode selection GUI 125 of some embodiments includes various controls that allow the user to, e.g., drop a pin at a particular location on the map (e.g., the center of the map), change the map view from 2D to 3D, report a problem to a centralized map provider service, show traffic conditions on the map, and potentially other actions.

In addition, the mode selection GUI includes several UI controls 130-145 for selecting different map browsing modes. As shown, these include the control 130 for selecting a standard map mode, the control 135 for selecting a satellite or flyover map mode, and the control 140 for selecting a hybrid of these two modes. In some embodiments, the standard map mode provides a schematic representation of a map that uses map tiles with constructs defined in terms of, e.g., vector graphics, and highlights (with labels, symbols, etc.) various constructs (roads, places of interest, bodies of water, etc.) in the map. The satellite or flyover map mode, in some embodiments, uses raster-based graphics (in combination with vector graphics, in some embodiments) to display images (in 2D and 3D) of the map area. The hybrid mode, in some embodiments, uses the raster images of the satellite mode, while overlaying certain labels and symbols in order to indicate road information, place of interest information, etc. Some embodiments do not have both a hybrid and satellite mode, only offering one or the other.

Lastly, the transit mode control 145 causes the mapping application to display the map region in transit mode. In some embodiments, the transit mode is similar to the standard mode, in that the map region is displayed as a schematic representation rather than using images. However, in the transit mode of some embodiments, the map application highlights and emphasizes different constructs, primarily relating to the transit systems (e.g., subways, light rails, bus lines, ferries, high-speed rails, trolleys, cable cars, aerial tramways, etc.) present in the map region. Each type of mode representation may allow the user to view specific information without cluttering the mapping application display with unnecessary information. In the second stage 110 of FIG. 1, the user selects (e.g., via a tap operation on the touchscreen) the transit mode control 145 to initiate transit browsing mode.

The third stage 115, as a result, shows the same map region as in the first stage 105 (i.e., Manhattan and surrounding areas), but now displays this map region in transit browsing mode rather than the standard map mode. As a result, the map GUI 100 presents different information for the map region. For instance, some of the features previously emphasized in standard mode map (e.g., highways, roads, points of interest, etc.) are now less emphasized in the transit browsing mode map. Specifically, roads and road signs that were once colorful and predominant am now faded in the background as to not obstruct the transit information being displayed in the transit browsing mode. Important features in standard mode that were colorful am now represented in a grayish (completely or partially desaturated) color in the transit browsing mode because they are less important to the user in this particular mode.

The transit browsing mode instead presents transit information useful in the displayed map region more vividly. For instance, the various colorful lines that traverse through the map represent various transit lines that service transit routes, which are navigable by the user. These transit routes may all be routes for the same type of transit vehicle, or may include routes for various different types of transit vehicles (subway, light rail, bus, cable car, etc.). In addition to the emphasized colorful lines representing the transit routes, the map includes several emphasized shapes that represent stops or transit stations that are positioned along the lines. In some embodiments, the transit station shapes may include colored shapes (e.g., colored the same color as the line that intersects the station), white shapes (e.g., for stations intersected by multiple lines), etc. In some embodiments, larger stations intersected by multiple transit lines are displayed using polygonal representations of the actual transit station (at least in some zoom levels). In some embodiments, some such stations are represented as an elongated white pill intersected by the multiple transit lines. Accordingly, transit information presented regarding the locality allows the user to identify operational transit routes from one location to another using various types of transit vehicles and transit vehicle routes.

B. Transit Mode Map Characteristic

As mentioned above, the transit browsing mode allows a user to view transit information for a particular locality. When a user views a map in the integrated mapping application, there are instances in which the user wants to view certain information while not being distracted by other unnecessary information. Once the user has entered the transit browsing mode, transit information presented to the user is carefully curated so as to not display too much or too little information with respect to the zoom level of the locality displayed in the map. Several examples of the amount and types of transit information displayed in the map will now be described with reference to FIGS. 2-4.

1. Transit Map at Different Zoom Levels

Figure 2A:
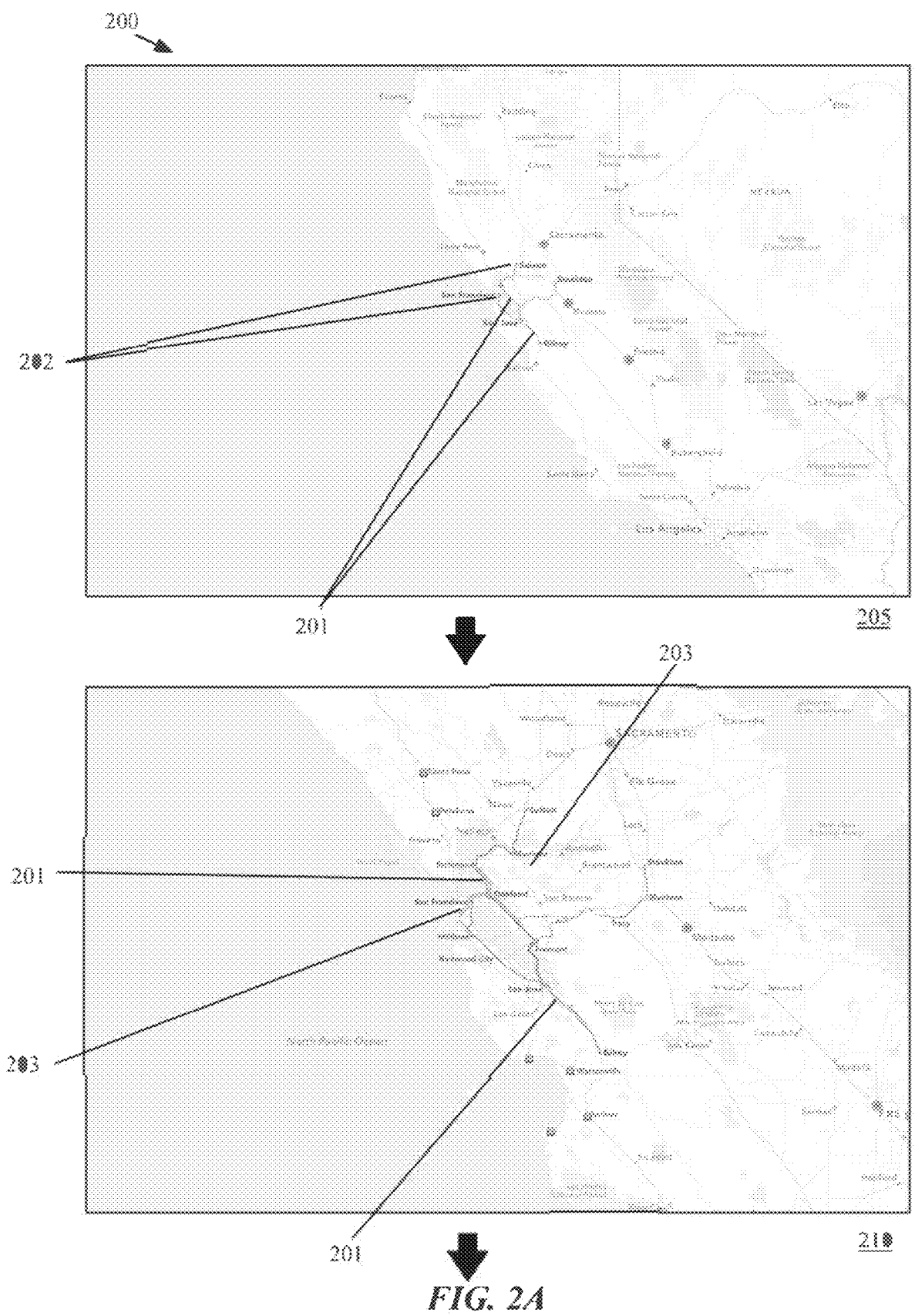
FIGS. 2A-2B provide illustrative examples of the amount and types of transit information displayed within a map at different zoom levels.
Figure 2B:
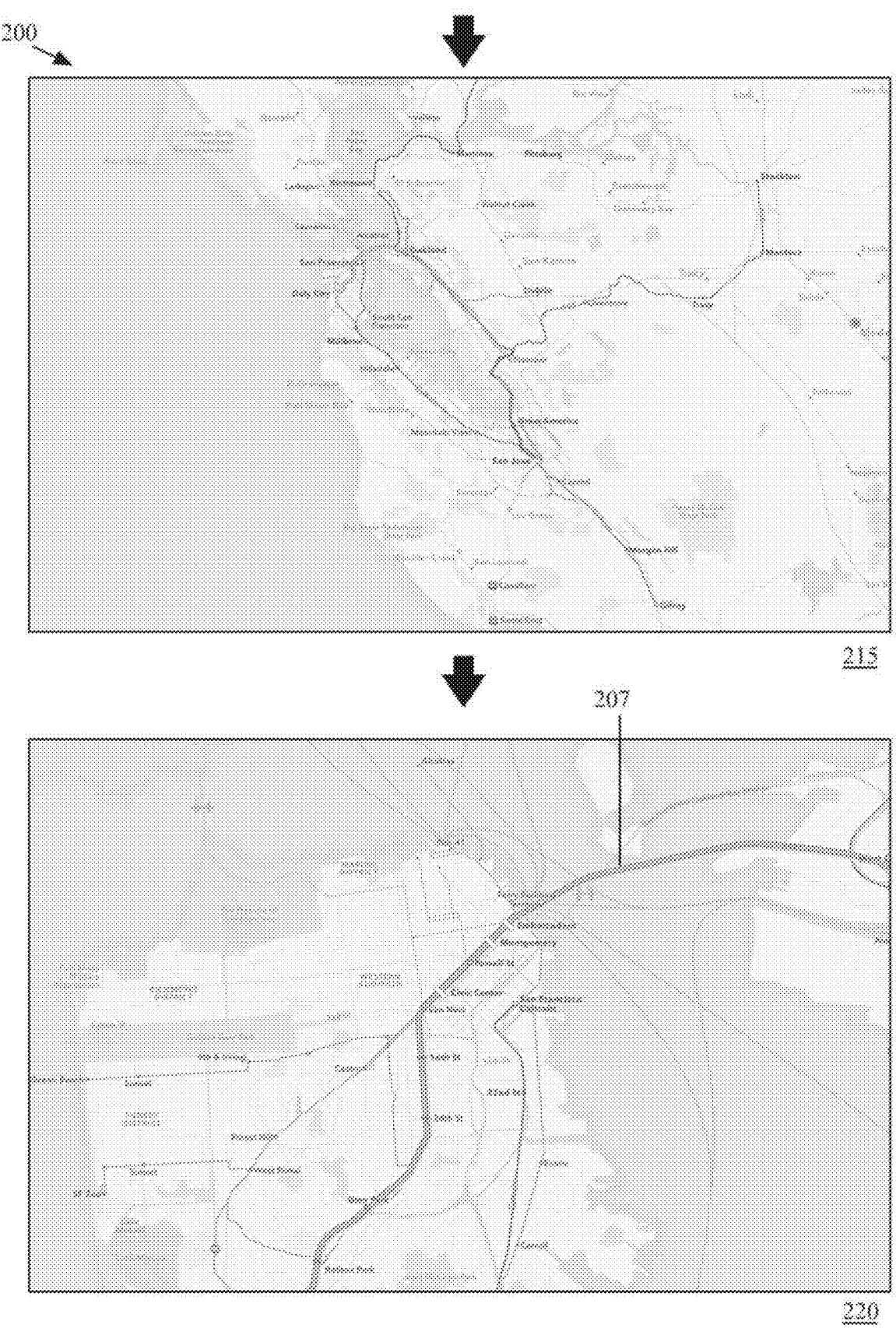

FIG. 2A-2B provide illustrative examples of the amount and types of transit information displayed within a map at different zoom levels. Four stages 205-220 illustrate different zoom levels of a region in a map 200 as displayed in the mapping application GUI of some embodiments. Specifically, the four stages 205-220 illustrate the increasing levels of detail of transit information displayed by the mapping application of some embodiments at successively higher zoom levels.

The first stage 205 illustrates a map 200 at a low zoom level that allows for the display of most of California. Centered on the San Francisco Bay Area, the map displays multiple transit lines 201 that service transit vehicle routes throughout the greater Bay Area and neighboring regions. In some embodiments, the displayed transit lines displayed at a particular zoom level are the transit lines operated by specific transit system providers. For instance, at very low zoom levels (e.g., even lower zoom levels than shown in the first stage 205), the application may only display transit lines operated by national transit system providers (e.g., Amtrak trains, Greyhound bus lines, etc.), while regional transit system providers are not shown. In other embodiments, the transit lines shown on the map at a low zoom level represent an overview of the transit network between cities in a particular region, and do not necessarily correspond to one transit provider or another. For example, at such a low zoom level, a particular drawn line may correspond to multiple transit providers, simply indicating that transit is available between two cities.

As mentioned, the map at this stage 205 is centered around the San Francisco Bay Area. In some embodiments, the transit lines that are displayed am for areas within a particular distance of the location of the device executing the mapping application. In other embodiments, the locality in which the transit lines am displayed is in relation to the location of the map 200 that is located in the center of the map region. Although in the map 200 only a few transit lines are displayed, in some embodiments other transit lines may be displayed throughout any geographical location displayed within the map 200. In other embodiments, a user must request specific transit lines for display.

Transit station shapes (referred to herein in some cases as "pills") 202 on the transit lines 201 indicate stops along the transit lines. Such stops my include, but are not limited to: stops for only a particular transit line, transit transfer stations for at least two transit lines, a transit station, etc. The pills 202 are labeled with the city names in which the stops are located. At the low zoom level of stage 205, displaying every stop that intersects each transit line would result in a cluttered map. Thus, the map application specifically displays the pills 202 to coincide with certain cities named on the map at which transit stations occur. Some embodiments only show some of the cities that include transit stops, with different embodiments using different criteria to select these cities. For instance, various embodiments may use the largest cities along a transit line, the cities with the most transit stops for the line, cities that act as transit hubs, the start and end cities for the transit line, etc. In order to preserve the aesthetics of the map, other stops in intermediate cities are not displayed at lower zoom levels in some embodiments. In addition, all stops in the named cities are grouped together and indicated in the map 200 using a single pill 202 for the city in which the stops are located (e.g., San Francisco), rather than multiple pills for the multiple transit stations in the city. In some embodiments, each transit station indicated by a city name represents the main transit station within that city. In other embodiments, the transit station merely indicates the geographical position of that city it represents.

The second stage 210 illustrates the map 200 displaying a slightly higher zoom level of the northern California region. With more of a focus on the San Francisco Bay Area, the map 200 is able to display more information regarding the transit lines in this region. For instance, along with the transit lines 201 that are displayed in the first stage 205, other, smaller transit lines 203 between cities in the San Francisco Bay Area geographical region (which is in the center of the map region) are displayed. Also, additional stops, indicated by the cities in which they reside, are displayed along the original transit lines 201.

The transit lines 201 and 203 are displayed with different colors. In some embodiments, the different colored transit lines represent transit vehicle routes that are operated by different transit system providers, or different transit routes (which might be operated by the same provider). For instance, one of the transit lines 201 is displayed as red and labeled as being operated by the transit system provider "Caltrain", while another of the lines 201 is purple and labeled as "ACE". However, some of the other colored lines 201 and 203 connecting. e.g., San Francisco. Oakland. and Suisun. do not indicate the transit system providers. In some embodiments, this information, which allows a user to determine which transit system provider operates a particular transit route, is available for transit lines that are at least a specified length, or have at least a specified length that is separate from other transit lines, such that the information does not clutter the display of the map.

The third stage 215 illustrates that the user has zoomed in further on the San Francisco Bay Area in the transit map 200, extending eastwards to Stockton. The map 200 now displays additional transit lines, each in different colors, as well as additional transit stations/stops. The San Francisco area now includes a ribbon of four lines running from Daly City through the Embarcadero, splitting up in the East Bay, among various other transit lines that are now included in the map. Furthermore, the map now shows ferry lines running throughout the bay.

The additional transit stations shown on the map now include both the colored pills (e.g., purple circles along the ACE line, red circles along the Caltrain line, etc.) as well as white pills (both circular and elongated) at various hubs with multiple lines. The white station pills that represent transit transfer stations, or hubs, indicate that a user may switch between transit lines at these stations. In contrast, stops that are represented as pills of the same color as the transit lines that run through them are single stops along the particular transit lines. These stops allow a user to get on and off the corresponding transit vehicle that services the transit lines, but do not lend themselves to easily transferring from one transit vehicle route to another.

Furthermore, a larger number of the transit lines indicate the transit service provider now that they occupy a larger portion of the GUI (e.g., the blue line from Gilroy up through Martinez labeled "Capital Corridor"). The more crowded, shorter lines (e.g., those only operating closer to San Francisco) are not labeled, to prevent clutter.

The fourth stage 220 shows an even closer view of San Francisco, Calif., at a higher zoom level. The map 200 displays yet more transit lines with additional transit stops (as well as additional labels. Some embodiments display certain transit lines of the same service as a single line when they follow the same path (e.g., same roads, tracks, etc.). For instance, the MUNI lines between the West Portal and Church stops include the L. K, and M lines all displayed as a single line. In some embodiments, however, transit lines that follow parallel but separate paths, or even the same paths are displayed separately within the map display. For instance, the red, yellow, blue, and green BART lines between Daly City and West Oakland follow predominantly the same set of train tracks, and are drawn separately (e.g., because they are deemed more important than the MUNI lines in this region). In some embodiments, lines deemed more important (e.g., operating with higher frequency, carrying more passengers, etc.) are split apart, as with the aforementioned BART lines.

Showing multiple transit lines that service the same area allows a user to determine whether a transfer from one transit route to another is necessary when traveling from one place to another. Each transit line that is displayed at various zoom levels preserves its color in order to allow a user to quickly identify which transit lines run through a particular area in a locality. In some embodiments, the color of the transit line corresponds to the color used by the transit vehicle provider to represent that transit route, or is similar to that color. In other embodiments, the color of the transit line is chosen in order to not conflict with colors of other transit lines displayed in the map.

At such a high zoom level, the fourth stage 220 shows additional details not previously viewable. For example, multiple pills are now used to represent separate stations within a city. For instance, the Embarcadero station and the Civic Center station are represented using separate white pills in San Francisco, along with numerous other station. Most of the stops along each transit line are now labeled with the particular station name instead of the city name (though in some cases, the city name and station name will be the same). When viewing the map at this mom level, giving the user the station name allows the user to identity a more specific travel route instead of an overview of the travel lines in the locality. Also, the map displays multiple transit lines 207 serviced by transit vehicle routes that are operated by the same transit system provider. Once again, this allows the user to identify a travel route with more accuracy. In addition, as in the standard map browsing mode, additional street names and POI names are displayed, which gives the user more context regarding the displayed region.

2. Transit Stations

In some embodiments, additional details regarding transit stations become viewable at high zoom levels. For instance, a transit station that has a below-ground transit vehicle (e.g., subway) that run on transit vehicle routes intersecting the transit station may not display the subterranean sections of the transit station until shown at a higher zoom level, which reduces the amount of unnecessary information from the map.

Figure 3:
FIGS. 3 and 4 provide illustrative examples of transit station representations shown in different zoom levels of map regions.
Figure 4:

FIGS. 3 and 4 provide illustrative examples of transit station representations shown in different zoom levels of a map region. Specifically, two stages 305 and 310 of FIG. 3 illustrate a first train station in Daly City (south of San Francisco) at two intermediate zoom levels, then two stages 405 and 410 of FIG. 4 illustrate a second train station in Brooklyn at two higher zoom levels. These figures illustrate the increasing levels of transit station detail displayed by the mapping application of some embodiments.

The first stage 305 of FIG. 3 illustrates the map 300 displaying several transit lines in the vicinity of San Francisco, Calif. Theme transit lines intersect various transit stops/stations that are represented differently in the displayed map. For instance, some transit stations, such as the transit station 301, are represented by colored circles matching the color of the single lines that stop at those stations. In addition, some embodiments at this or higher zoom levels, uses stations represented by shields that indicate the specific transit system (e.g., stations represented by MUNI or BART logos). In some embodiments, as shown, the stations for different transit systems may have different sizes (e.g., based on the thickness of the transit line). Transfer stations (e.g., between lines of one transit system, between different transit systems, etc.) are shown as white station pills, as described above. Examples of such stations include the transfer stations 302 and 303, which are shown as different sizes.

The second stage 310 shows that the mapping application now displays the map 300 of San Francisco at a higher zoom level. In this example, the size of station 302 (the non-circular Daly City station) has increased. In addition, the map now displays additional detail for the station—specifically, the map shows the boundaries of the station itself, in a salmon color. As will be shown in the subsequent figure, the boundaries of the station can be displayed in order to provide the user significantly more detail about the stations.

In some embodiments, when multiple separate stations (e.g., for different transit systems) are connected, the mapping application displays the connects between such stations at higher zoom levels. In some embodiments, these connections are used to indicate that there are direct walkable connections between the stations (e.g., underground pathways, etc.), that do not require navigating the mads to walk between stations in order to transfer from one transit system to the other. Some embodiments display these stations as white, even though the stations may appear to be only for a single transit line.

The first stage 405 of FIG. 4 illustrates an area of Brooklyn, centered around the Atlantic Avenue-Barclays Center station complex. As shown, this area includes several stations for different systems, including the Long Island Railroad (LIRR) and New York subway systems. At this higher zoom level, the salmon schematic representation of the transit station is slightly visible. In some cases, if several stations are connected, at this or slightly higher zoom levels the application displays separate pills or system shields, but the map representation also includes the polygons for the station to indicate the station outline as well as any walkways between the stations (using, e.g., the semi-transparent salmon color).

The second stage 410 shows additional detail for the transit station complex around the Barclays Center. This stage illustrates the complex as a whole with significant detail. For instance, the application now displays entrances and exits 414, in order to give the user information about where the station may be entered or exited. The station entrances and exits will be described in further detail below by reference to FIG. 23. In some embodiments, the application not only displays an indicator for the entrance/exit displayed, but also indicates the type of access point as well (i.e., whether the access point is an exit, entrance, or both, whether there is an elevator, escalator, stairs, etc. available, and other information).

In addition, this illustrates that the single transit complex includes several different stops for different transit systems and different lines. Specifically, the badge 406 represents the stops for subway lines D. N. and R, the badge 407 represents the stop for subway lines B and Q, the badge 408 represents the stops for subway lines 2, 3, 4, and 5, and the badge 409 represents the stop for the LIRR. As the user zooms in, in this situation, the transit map browsing mode provides more detailed transit information. In the case of transit stations, the stations indicate where within the stations the stops for different transit lines am located. However, at lower zoom levels, stops within a station for different lines (e.g., multiple hallways) are grouped together (i.e., when the scale of the map renders the distinction between different portions of a station meaningless because the distance between the stops is a negligible portion of the display). In some embodiments, each badged hallway displays (i) the lines that stop at that location and (ii) the different types of possible transfers between transit lines. In some embodiments, several different transit routes can traverse through each hallway on the same transit line, and/or several different types of transit vehicles can run through each hallway.

Figure 5:
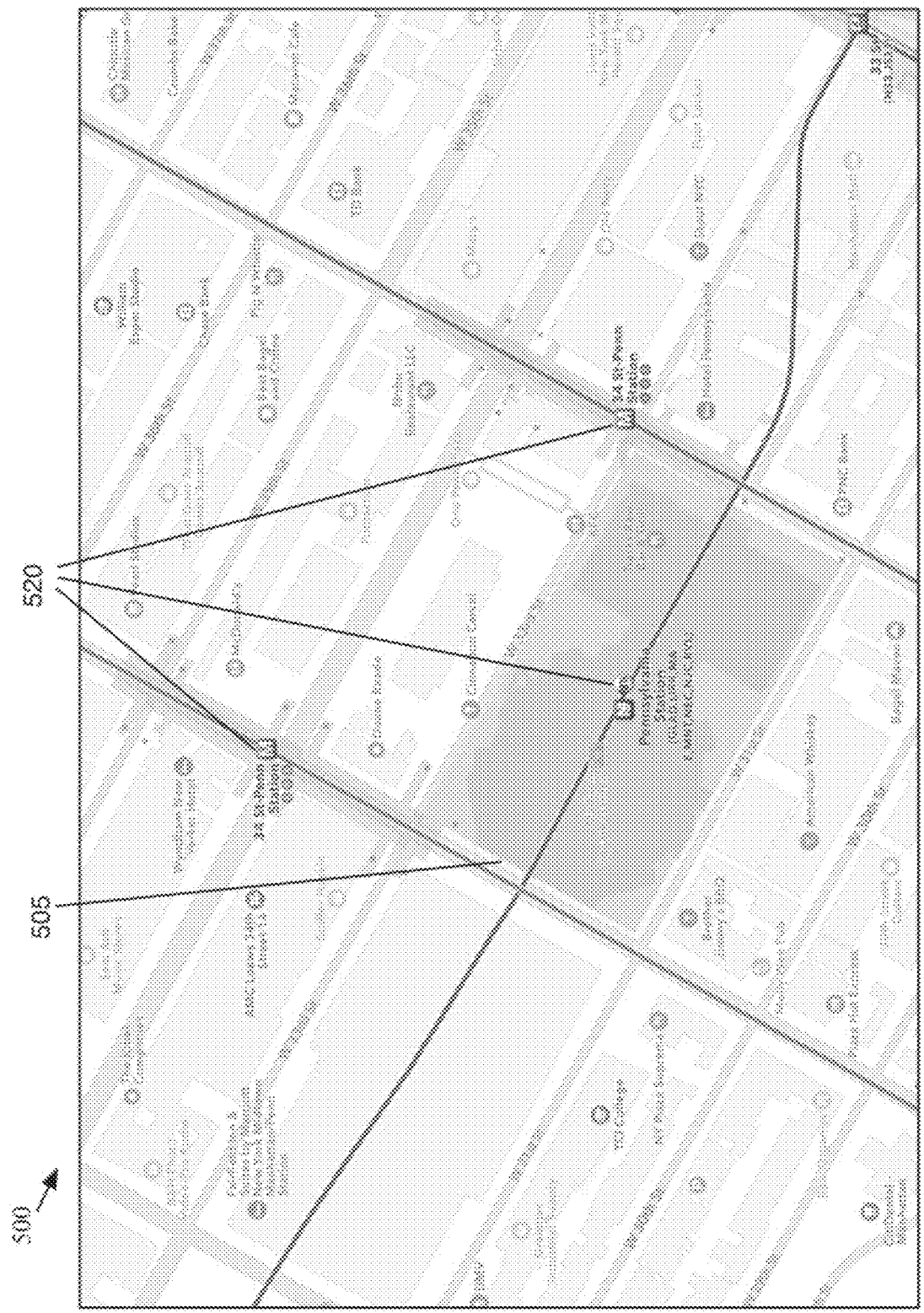
FIG. 5 illustrates an example of additional transit station information that the mapping application of some embodiments displays at high zoom levels.

FIG. 5 illustrates an example of additional transit station information that the mapping application of some embodiments displays at high zoom levels. Specifically, this figure illustrates a map application GUI 500 in transit mode displaying a map region in New York City, with a transit station 505 (representing Penn Station in Manhattan) prominently displayed.

As shown in FIG. 5, the mapping application displays various types of useful information to a user regarding the transit station 505. For instance, the application differentiates the display of portions of the transit station that am above-ground compared to portions that am below-ground. In this case, the above-ground portions am displayed as darker and mom opaque than the below-ground portions, which am lighter and mom transparent. This information may be useful in indicating to the user where she will have to get to in order to catch a particular transit vehicle or after exiting a particular transit vehicle. The distinguishing between upper and lower levels enables a user to traverse a complex transit station with ease. The transit station 505 also displays badges 520 that represent the different transit routes that stop at the transit station, and shows where in the transit station these various routes can be found. In this example, the mapping application shows the location of the subway stops (one for lines 1, 2, and 3, and the other for lines A. C. and E) in relation to each other and the rest of Penn Station, which has tracks for numerous other lines (New Jersey Transit, LRR, etc.) In addition, the applications displays points of interest within the station—for example, this shows Madison Square Garden and Tracks Raw Bar & Grill located within Penn Station.

3. Standard Map Vs. Transit Map

As mentioned above, the transit browsing mode is one of several modes of the integrated mapping application of some embodiments. Different modes available in the integrated mapping application display (1) the same information in different formats and/or (2) different types of information. Some embodiments, as noted above, include both a standard mode that emphasizes browsing and searching for different locations in the map as well as a transit mode that emphasizes transit constructs in the map. The standard mode also allows a user to initiate a navigation presentation of some embodiments for traveling from one location to another via roads (e.g., by searching for a location and then requesting a navigation route to that location). The transit mode of some embodiments also enables a user to search for different locations in the map and request a transit-based route to the location in some embodiments.

Figure 6:
FIG. 6 illustrates an example of the differences between the same map presented in the standard mode and the transit browsing mode of the mapping application of some embodiments.

FIG. 6 illustrates an example of the differences between the same map presented in the standard mode and the transit browsing mode of the mapping application of some embodiments.

This example is provided in terms of two map displays 605-610 that each display the same map region in different modes. The first map display 605 shows a map of San Francisco, Calif. in the standard mode of the integrated mapping application, while the second map display 610 shows the same map region in the transit browsing mode of the integrated mapping application. The distinctions discussed below are a few of the differences between these two map browsing modes in some embodiments, though other embodiments may include other differences between the modes. In some embodiments, information displayed in one mode may not be displayed in another mode, while other embodiments display the same information for any map region presented in the GUI (at the same zoom level) irrespective of the mode.

There ae many differences between the transit mode's map display 610 and the standard mode's map display 605. First, the colors of the transit map displayed in the map display 610 are dimmed in comparison to the standard mode map that is shown in the map display 605. Specifically, geographical features of the standard mode map are brighter and bolder, while the same features displayed in the transit mode map appear washed out (e.g., desaturated). For instance, the bay in the standard mode map display 605 is a bright blue, while the same bay in the transit mode map display 610 is a very light blue. Similarly, parks in the standard mode display are shown in various colors from bright green to a dark forest green, whereas these same parks are significantly lighter in the transit mode display. Even the generic land cover is a bright beige in the standard mode display 605 and a more routed grayish/white in the transit mode display 610.

As another difference, the mapping application of some embodiments displays point of interest indicators in different sizes and colors between the two modes. In this example, for instance, the indicators 616 in the standard mode (indicating Alamo Square and St. Mary's Medical Center) are shown in vibrant colors (green and red, respectively), whereas the corresponding indicators 615 are dimmer (desaturated) in the transit mode display. Some of the points of interest shown in the standard mode map are not even marked in the transit mode map, as well. However, the transit mode map 610 displays other points of interest in some embodiments that are along or near transit lines, and which are deemed likely to be of interest to a transit-goer (e.g., a tourist). Thus, the transit mode map includes building representations of, e.g., St. Mary's Cathedral 620, Coit Tower 625, etc.

The roads, including both surface streets and highways, are also displayed differently between the two modes. Surface streets (non-freeways) in the standard map mode are displayed in different colors and sizes, either being represented as single gray lines (for smaller streets), thick white lines (for larger streets), or thick yellow lines with orange borders (for yet larger streets). Freeways (i.e., limited-access motorways) are shown as a brighter and thicker yellow lines with orange borders to clearly stand out as larger roads. In the transit mode of some embodiments, however, the streets aw significantly de-emphasized, with non-transit-related streets and highways (i.e., those that do not correspond to transit lines) displayed as either thin gray lines. For freeways, some embodiments use thick white lines. Similarly, the highway shields (e.g., for the 101 freeway) ae larger and bright in the map viewing mode, but smaller and faded or not present in the transit mode. Some embodiments replace the freeways or other roads entirely, and replace them with transit lines. In some embodiments, any type of road (e.g., street, highway, etc.) not dedicated to the types of transit information the transit mode is trying to convey will be either deemphasized or replaced with necessary transit information.

Each mode described above will emphasize and/or deemphasize features in their respective map displays based on the information the mode is trying to convey. For instance, standard mode allows a user to perform many tasks (e.g., browsing, searching, initiating a navigation presentation, etc.). Therefore, the standard mode of some embodiments emphasizes location information within the map region. Although, the transit browsing mode allows a user to perform many of the tasks as in standard mode, transit browsing mode is explicitly meant to emphasize mass transit options (i.e., transportation other than personal motor vehicles). Hence, the transit browsing mode of some embodiments emphasizes transit information and deemphasizes other information (e.g., streets, locations, etc.) on the premise that when a user initiates the transit mode, the user is mainly interested in transit information.

4. Operations for Displaying Map in Transit Mode

Figure 7:
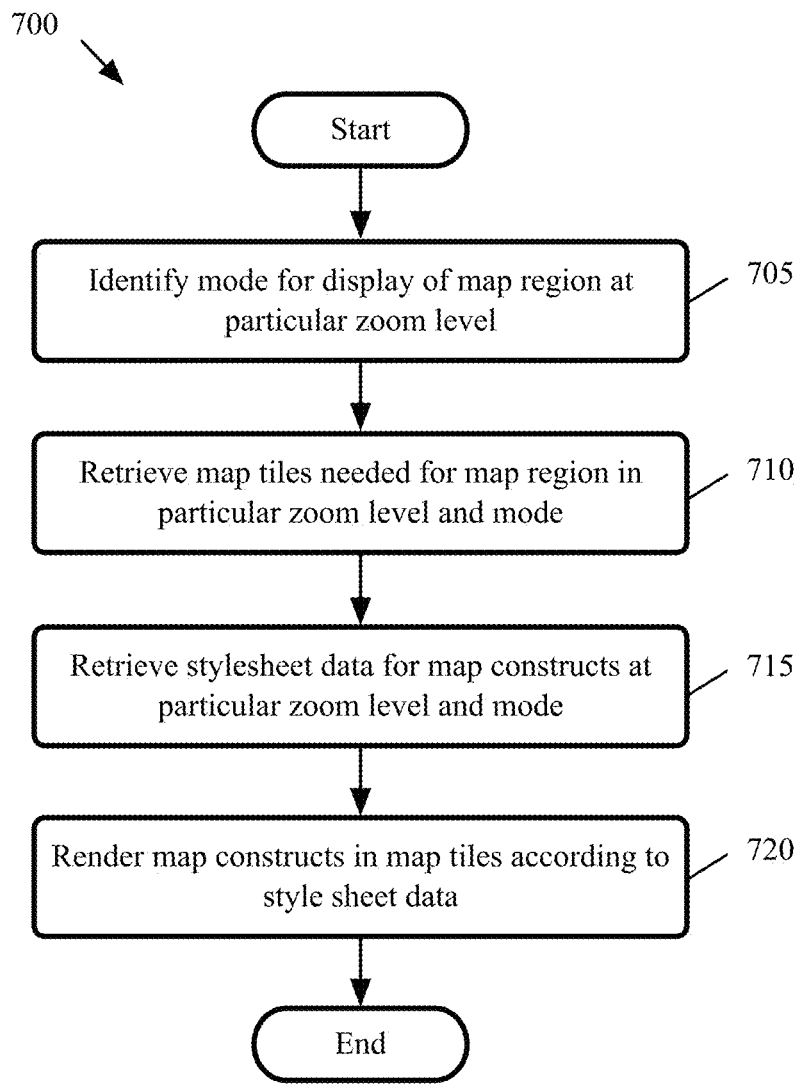
FIG. 7 conceptually illustrates a process of some embodiments for rendering a map display in transit mode for a particular zoom level of the map.

FIG. 7 conceptually illustrates a process 700 of some embodiments for rendering a map display in transit mode for a particular zoom level of the map. In some embodiments, the process 700 is performed by a mapping application operating on a device to display map information to a user. The device may be a mobile device (e.g., a touchscreen mobile device such as a smart phone or tablet), a desktop or laptop computer, or other device on which a mapping application operates.

As shown, the process 700 begins by identifying (at 705) the current mode of the mapping application that will be used to display a map region at a particular zoom level. As described above, in some embodiments the map browsing modes include at least transit mode and standard mode, which display schematic maps using, e.g., vector graphics representation of the map constructs in a map region. In addition, some embodiments include a satellite or flyover mode that uses camera-captured images of the real world map region to create a map, as well as a hybrid mode that combines some of the vector graphics and/or labeling data of the standard mode with the camera-captured images. Some embodiments may also include 2D and 3D versions of each of these modes, or at least of the standard mode. In addition, as described below, the mapping application may include one or more navigation modes (which may be rendered in 2D or 3D, in some embodiments). In some embodiments, the user can change the zoom level of the map through. e.g., touch interactions with the map display, and the application may display different features or display features differently at different zoom levels.

The process 700 retrieves (at 710) the map tiles needed for the map region in the particular zoom level and display mode. In some embodiments, the mapping application uses tile-based rendering, and uses different sets of tiles for different zoom levels, or for groups of zoom levels (e.g., using one set of tiles for a range of zoom levels by interpolating the tile information between zoom levels). In addition, some embodiments use different sets of map tiles for different constructs displayed in the map. For example, some embodiments use standard map tiles that contain information about most of the map information, and use building map tiles that contain building information, which may be used to display building outlines in 2D mode and to display 3D building shapes in the 3D standard mode. For transit mode, some embodiments use the standard map tiles in addition to separate transit map tiles, which contain information used by the mapping application to render the transit constructs (e.g., transit lines, stations, etc.). In other embodiments, the transit constructs are contained in the standard map tiles, and are emphasized more strongly in transit mode than in standard mode.

The map tiles, in some embodiments, represent portions of a map at, e.g., a particular zoom level. In some embodiments, the map tiles are vector-based map tiles, encoded using vector graphics (e.g., Scalable Vector Graphics (.svg) or a Drawing file (.drw)). The vector graphics identify map construct polygons and provide the location for these constructs in the map region, etc. For example, transit tiles (or standard map tiles that contain transit information) may contain a series of coordinates through which a particular transit line runs, or may define the line in terms of other constructs (e.g., defining a bus line in terms of the roads that it travels along). The transit stations may be defined as polygons in some embodiments. In addition, some map tiles (e.g., the tiles for satellite or flyover mode) may be raster-based map tiles (e.g., encoded using any number of standard digital image representations, such as Bitmap (.bmp), Graphics Interchange Format (.gif), Joint Photographic Experts Group (.jpg, .jpeg, etc.), Portable Networks Graphic (.png), or Tagged Image File Format (.tiff). Some embodiments also include tiles with a combination of vector and raster data.

In some embodiments, the mapping application retrieves the map tiles from a cache on the device when possible. If the needed map tiles are not available, however, the mapping application sends a request to a server-based mapping service for the particular tiles needed (according to a list or other data structure stored by the mapping application that identifies the tiles required for any map region at each zoom level). In some embodiments, in order to better handle rapid changes in zoom level and map region, the application requests additional tiles from the mapping service, for other zoom levels of the current map region as well as nearby map regions at the current and other zoom levels.

The process 700 then retrieves (at 715) stylesheet data for map constructs at the particular zoom level and mode of the map region. In some embodiments, the stylesheet data is stored with the mapping application, with updated stylesheet information downloaded from the mapping service as necessary. However, as the stylesheets take up a relatively smaller amount of storage as compared to the map tiles, they can be permanently stored on the device, rather than regularly emptied from a cache. The stylesheets, in some embodiments, specify the appearance of various constructs (e.g., buildings, streets, land cover, labels, shadows, transit lines, transit stations, etc.) defined in the map tiles in different modes of the mapping application (and at different zoom levels). For example, the stylesheets may specify the different textures to apply to the constructs in standard and transit modes, the color of the textures, etc.

Finally, the process renders (at 720) the map constructs defined in the map tiles according to the stylesheet data. The map rendering of some embodiments is described further by reference to FIG. 8 below. In some embodiments, the application builds a mesh using the map tiles and textures the polygons of the mesh using stylesheet data for the particular mode and zoom level. For example, the standard map constructs (roads, parks, etc.) have different styles defined for transit mode than for standard mode in order to de-emphasize these constructs in the transit mode of some embodiments.

Figure 8:
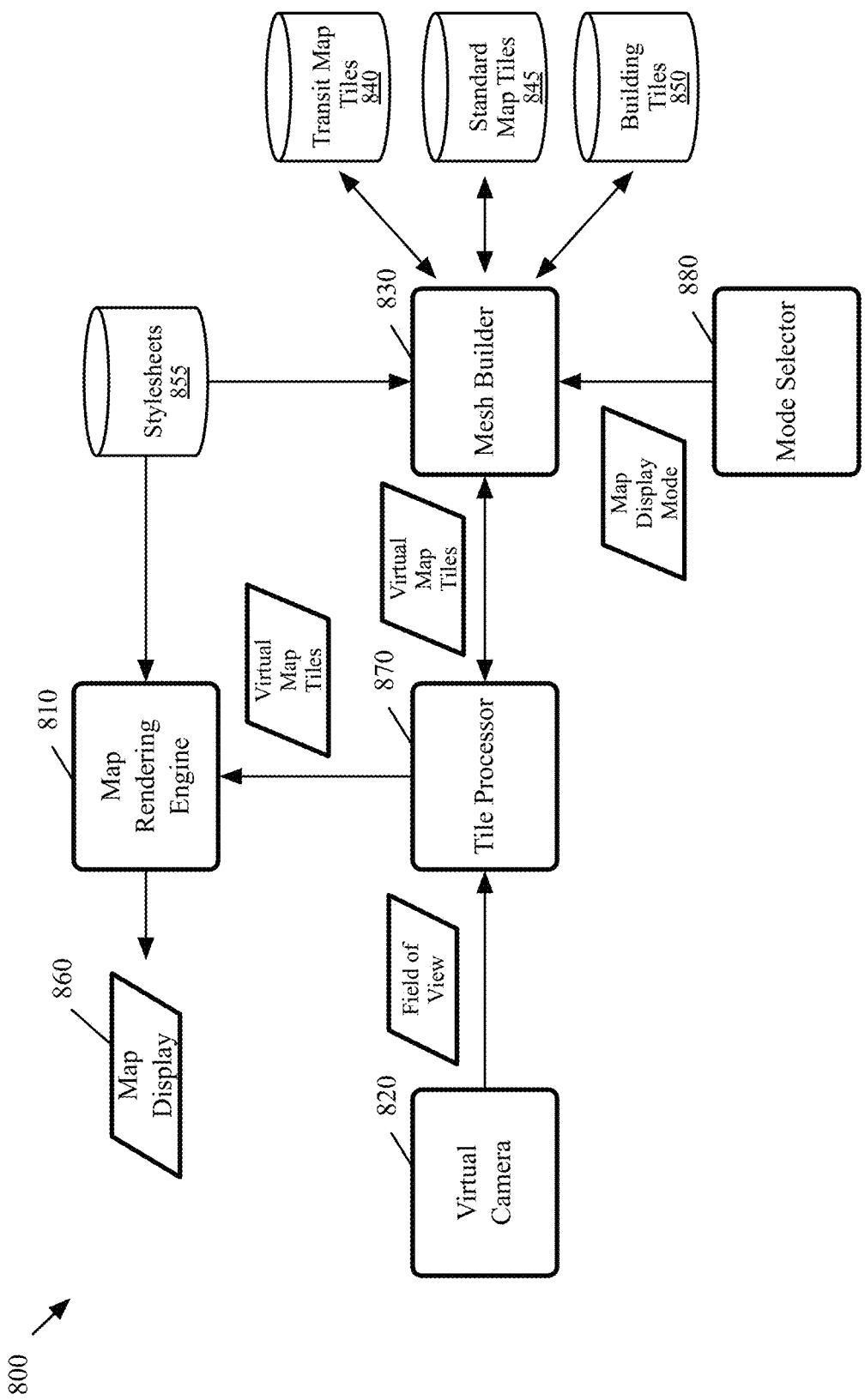
FIG. 8 conceptually illustrates a processing pipeline of the mapping application of some embodiments for rendering a map display based on different map tiles and stylesheets according to a particular mode of the map application.

FIG. 8 conceptually illustrates a processing pipeline 800 of the mapping application of some embodiments for rendering a map display 860 based on different map tiles 840-850 and stylesheets 855 according to a particular mode of the map application. As shown, the processing pipeline 800 includes a map rendering engine 810, a virtual camera module 820, a mesh builder 830, a tile processor 870, three different map tile storages 840-850, a stylesheet storage 855, and a mode selector 880.

In some embodiments, the transit tiles storage 840 stores transit map tiles for rendering various map constructs in transit mode, and the standard tiles storage 845 stores most of the map information. The building tiles storage 850 of some embodiments stores 2D and 3D map tiles (also referring to as building tiles) for use in displaying buildings in certain map regions. While shown as separate sets of tiles in this figure, in some embodiments the transit constructs are actually stored in the standard map tiles, and there are no separate transit map tiles. The stylesheets storage 855 stores definitions for rendering map constructs at different zoom levels and in different modes (e.g., standard mode, transit mode, etc.). One of ordinary skill in the art will recognize that these storages are merely representative of the manners in which the rendering pipeline could retrieve the needed tiles. In some embodiments, the application first checks a cache, and if the tiles are not in the cache then sends a request to a mapping service for the needed tiles (e.g., according to a list of tiles indexed by map region and zoom level).

The virtual camera 820 identifies a location and orientation (e.g., perspective position, zoom level, etc.) from which to view a 2D or 3D map. The virtual camera 820 sends the field of view of the map (also referred to as a viewing frustum) to the tile processor 870 for processing. In the 2D transit mode shown in the above figures, the virtual camera 820 identifies the boundaries of the map region that will be displayed.

The tile processor 870 receives fields of view for map displays from the virtual camera 820. In some embodiments, the tile processor 870 performs any necessary culling of the map view before sending the mesh builder 830 "empty" virtual map tiles. The tile processor 870 of some embodiments also receives "built" virtual map tiles from the mesh builder 830 (in response to sending the empty virtual map tiles to the mesh builder) and sends them to the map rendering engine 810 for rendering.

The mesh builder 830 of some embodiments prepares virtual map tiles for tile processor 870. The mesh builder 830 receives the current mode of the mapping application (e.g., standard mode, transit mode, flyover mode, hybrid mode, etc.) from a mode selector 880. The mesh builder 830 then requests map tiles from the map tile storages 840-850 based on the viewing mode received from the mode selector 880 and the particular zoom level of the identified location (identified by the field of view in the virtual map tiles). For instance, the mesh builder 830 of some embodiments requests transit map tiles and standard map tiles when in transit mode, but standard map tiles and building tiles when in standard mode. In some embodiments, the mesh builder 830 also uses building tiles in transit mode. In addition, some embodiments also include navigation tiles for displaying a more immersive presentation when in a driving navigation mode. In addition, as mentioned above, in some embodiments the transit map constructs are actually contained in the standard map tiles, and them are no separate transit map tiles.

Also, the mesh builder 830 receives stylesheet data from the stylesheet storage 855. The stylesheets, in some embodiments, specify the appearance of various constructs (e.g., buildings, streets, land cover, labels, shadows, transit lines, transit stations, etc.) defined in the map tiles in different modes of the mapping application (and at different zoom levels). For example, the stylesheets may specify the different textures to apply to the constructs in standard and transit modes, the color of the textures, etc.

Once the mesh builder 830 receives the map tiles and stylesheet data, the mesh builder 830 builds a polygon mesh using vector data stored in the tiles. The mesh builder 830 specifies the appearance of map constructs in the mesh based on the stylesheet data retrieved from the stylesheet storage 855 according to the map display mode. In some embodiments, the mesh builder 830 builds the polygon mesh on a virtual tile-by-tile basis and sends the virtual map tiles, which, in some embodiments, are a polygon mesh version of the virtual map tiles the mesh builder 830 received from by the tile processor 870. To build the mesh, the mesh builder 830 of some embodiments generates a mesh of vertices according to the vector data in the received map tiles (the standard, transit, and/or building tiles), generates triangles from the mesh to simplify rendering, adds shadows to the mesh (e.g., by labeling vertices and/or polygons), and applies texture information to the mesh.

In some embodiments, the texture information may be determined based on the stylesheet data 855. Furthermore, some embodiments also use this stylesheet data 855 to determine the shadow, triangulation, and or mesh construction data. Using stylesheet-driven rendering enables simple modification to many aspects of the map output, because changes to a texture, color, etc. can be made through a minor modification of a stylesheet. This facilitates the use of different textures for certain types of objects at different zoom levels, map display modes, or geographic regions. For instance, when viewed at a low zoom level (less detail), some embodiments might color a park a simple light green. On the other hand, as the user zooms in to a higher zoom level (more detail), the stylesheets indicate to apply a pattern (e.g., a foliage pattern) to the park region. This also enables the same standard map tiles to be used for standard map view and transit map view. Instead of needing to download new tiles, the mapping application applies different textures to the mads, parks, places of interest, etc. in the transit mode (i.e., using a lighter texture for land cover in transit mode, and using a lighter texture and smaller mesh for roads in transit mode). This information can be coded into a stylesheet and then the mesh builder simply adds the appropriate texture information to a tile mesh based on the mode and/or zoom level of the tile.

The map rendering engine 810 is responsible for generating a drawing (e.g., a map view of a map) to output to a display device based on the field of view received from the virtual camera 820. Additional details of the mesh builder 830, the virtual camera 820, the tile processor 870, and the map rendering engine 810 are described in further detail in U.S. Patent Publication 2013/0322702, which is incorporated herein by reference.

An example operation of the processing pipeline 800 will now be described. The virtual camera 820 identifies a location and orientation from which the virtual camera 820 views a map. The virtual camera 820 sends to the tile processor 870 a field of view of the map based on the identified location and orientation, which includes the zoom level.

When the tile processor 870 receives the field of view, the tile processor 870 of some embodiments culls the field of view. The tile processor 870 then sends empty virtual map tiles (i.e., virtual map tiles that indicate the required field of view but do not have mesh information) to the mesh builder 830 for processing. The tile process 870 also receives information indicating the current mode of the mapping application (e.g., standard mode, transit mode, etc.).

When the mapping application generates map views in transit mode, the mesh builder 830 retrieves transit map tiles from the transit tiles storage 840 and standard map tiles from the standard tiles storage 845, based on the zoom level of the identified location. As mentioned, in some embodiments different sets of map tiles are used by the processing pipeline 800 for rendering map views in these different viewing modes. The transit, standard, and other map tiles are cached for a period of time in some embodiments, and if the needed tiles are not present in the cache, the application retrieves the map tiles from the mapping service.

Once the mesh builder 830 has all the appropriate map tiles and stylesheet data, the mesh builder 830 builds a polygon mesh based on vector data in the map tiles. The mesh builder 830 then specifies the appearance of map constructs of the polygon mesh based on the stylesheet data, according to the current mode and zoom level of the map view. The mesh builder 830 then sends the built virtual map tiles to the tile processor 870.

When the tile processor 870 receives the virtual map tiles from the mesh builder 830, the tile processor 870 sends them to the map rendering engine 810 for rendering. The map rendering engine 810 receives the virtual map tiles from the tile processor 870 and renders a map view 860 based on the virtual map tiles. In some embodiments, the rendering engine 810 also uses stylesheet data to perform its rendering, as described in the above-incorporated U.S. Patent Publication 2013/0322702.

C. Transit Line Characteristics

Figure 9:
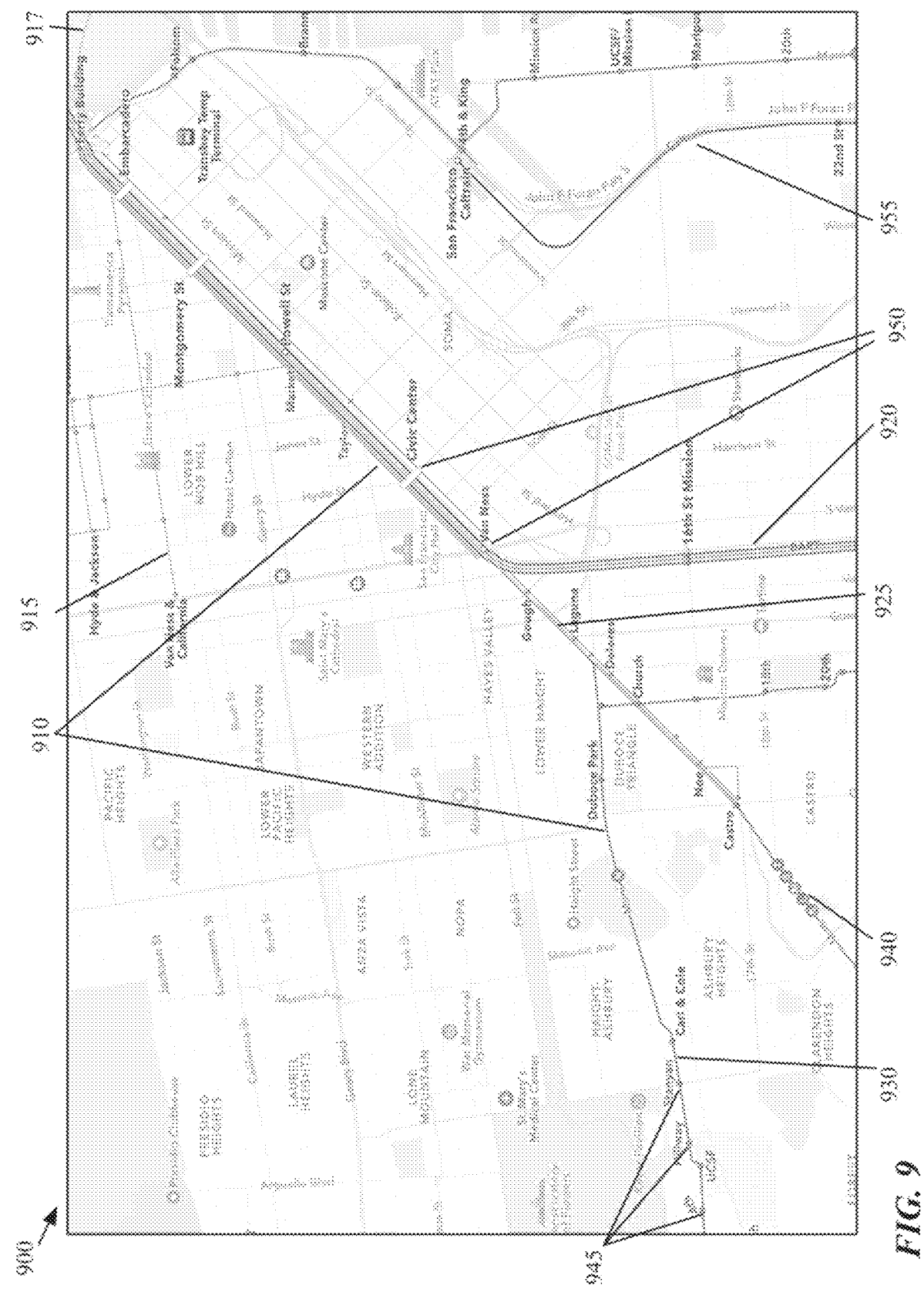
FIG. 9 illustrates various characteristics of different types of transit lines in the transit browsing mode of some embodiments.

One of the primary features of transit mode is the transit lines showing various transit routes. As indicated above by reference to FIG. 2, as a user zooms in on the map in transit mode, more and more transit lines are displayed with increasing levels of detail. FIG. 9 illustrates various characteristics of different types of transit lines in the transit browsing mode of some embodiments. Specifically, FIG. 9 illustrates a transit mode map display 900 that shows a portion of the transit system in San Francisco, Calif. Here, each colored line in the map display 900 represents at least one transit route. In some embodiments, the color of the transit line corresponds to a color that a transit system provider uses to designate the transit line (e.g., in schedules provided by the system provider, on the transit vehicles, in stations, etc.). These transit line colors may be the exact color used by the transit providers, or a similar color (e.g., a different shade of the same basic color) to those used.

As shown in map display 900, various types of transit lines are displayed in the transit browsing mode. For instance, the map display 900 displays several rail lines 910 that are each designated as a separate color to indicate which rail routes or providers service particular areas. Also, to further distinguish between rail lines 910, badged line shields are placed on some of the rail lines to identify the particular rail route represented by the corresponding line. In addition, cable car lines 915 are also displayed as thin orange lines, and ferry lines 917 are displayed as a brighter blue over the dimmed blue of the body of water through which the ferry travels. The above-mentioned examples are only a subset of the various types of transit lines that may be displayed by the mapping application, as some embodiments may display any other type of transit line, including tramways, high-speed rail, etc., using different lines and colors. Some embodiments include bus lines representing different bus routes as thin lines overlaid on the streets of the cy on which the buses travel Certain features of the transit routes may cause their transit lines to be displayed in a particular manner as well. For instance, grouped rail lines 920 that run alongside each other (or, in some cases, over the same set of tracks) are displayed in parallel as the lines displayed on the map to correspond to the actual geography of the transit lines (rather than drawn as straight lines between stops). These grouped sets of rail lines may be operated by a single provider (e.g., BART in this case) or by several different providers (e.g., NJ Transit and Amtrak paralleling each other for large stretches in New Jersey. or BART and MUNI in this example). In some embodiments, a set of transit lines that run parallel to each other will be drawn as such, even if the lines do not all stop at the same set of stations. For example, even if the green line of the set of grouped BART rail lines 920 only had stops at 16$^{th}$ Street and Embarcadero, because the actual rail lines follow the same path as the other lines (the blue, yellow, and red lines), the green line is displayed parallel to the other lines on the map display rather than as a straight line between these stations. For parallel sets of transit lines with curves in multiple directions, the use of actual track location data prevents lines that should be parallel from crisscrossing each other as would be the case with station-to-station data.

In addition, the map application in transit mode may display transit trunk lines that service at least two transit routes that may branch off to separate lines. For example, the map display 900 includes a transit trunk line 925 for the transit system provider colloquially known as "Muni" (operated by the SF Municipal Transportation Agency). In some embodiments, each of the transit routes represented by the trunk line 925 are identified by the transit line shields 940 that are displayed on the trunk line 925. In some embodiments, these shields am sorted numerically, alphabetically, or using another common sorting technique (in this case, the shields 940 are sorted alphabetically). As shown in the map display, the transit trunk line branches off in the southwest into multiple separate transit lines that represent the different rail routes of the Muni system. For example, the transit trunk line 925 branches off to rail line 930 that represents the transit route "N" (while the lines continue on), as well as other lines. The transit trunk lines are discussed further below by reference to FIG. 10.

As described above by reference to FIGS. 2A-2B, many features am displayed along the transit vehicle routes. Stops or stations 945 along a transit line are displayed as pills and transfer stations 950 along the transit vehicle route are displayed as white colored pills. Each transfer station identifies a location at which a user may change from one transit vehicle route to another. In some embodiments, the size of the white colored pill corresponds to the number of different transit vehicle routes that converge at that particular location, at least in certain zoom levels. For stations of the more prominent transit services, some embodiments display the logo of the transit provider on the transit station pills. In some embodiments, the name of the transit provider is displayed along the transit line (e.g., the Caltrain indicator 955).

In addition, each type of rail line (e.g., bus, light rail, etc.) may have varying appearances based on the frequency with which transit vehicles operate on the particular line, or a different importance metric. Specifically, in some embodiments darker and/or thicker lines are used to represent higher-frequency lines. Thus, for example, the MUNI trunk line 925 is a thicker, darker pink than the F line (not labeled) running directly alongside it. Similarly, the cable car lines 915 are narrower and less bright. Other importance metrics indicated by the color of the transit lines in some embodiments may include the number of travelers of the particular transit line, etc.

Figure 10:
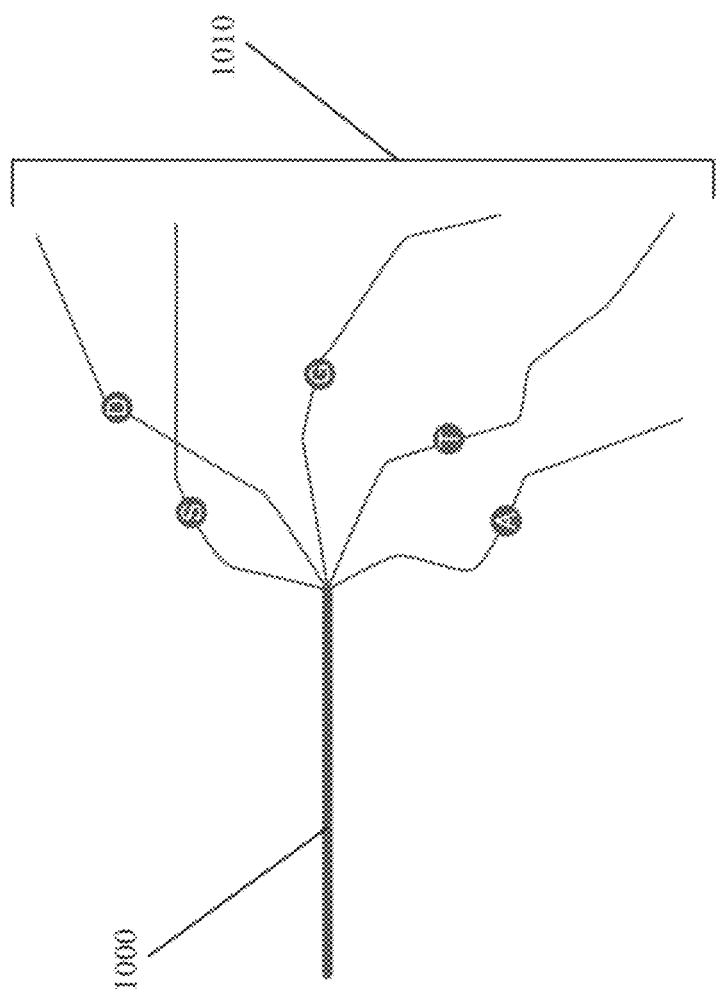
FIG. 10 illustrates an example of a trunk rail line that branches off to several separate rail lines.

As mentioned, FIG. 10 illustrates an example of a trunk rail line that branches off to several separate rail lines. As shown, the blue trunk rail line 1000 is drawn as thicker and darker than the separate lines 1010 (i.e., A, D, G. S. and T) that branch off of this route. In some embodiments, such a line is used for a single transit line off of which several lines split (e.g., as shown in this example). Alternatively or conjunctively, a thicker line may be used when multiple lines of the same transit service follow the same path (e.g., the same rail line for a subway or light rail, the same streets for a bus line), but the line is not prominent enough in the map display to display multiple parallel lines. For instance, the Muni lines J, K, L, M, N, and T grouped together in FIG. 9 is an example of such a grouped trunk line, with all of the lines that split off drawn in the same color. In some embodiments, the color of rail lines are the same as the trunk rail line they branch from in order to indicate that these lines are operated by the same transit service provider.

In some cases, when a rail line branches off of a trunk transit line, the branched transit line itself may also be a trunk line off of which several individual transit lines branch. In this case, some embodiments continue to display the partial trunk line in the thicker, darker style of the larger trunk line, while other embodiments introduce degrees of thickness, brightness, and/or darkness to indicate relative branching. In some embodiments, all of the lines of such a system with multiple levels of branching are displayed using the same general color.

As described above, some embodiments display the transit lines along the actual physical path of the transit line, rather than as straight lines between stations. To display the transit lines as such, some embodiments use map tiles that describe the transit lines in terms of closely-spaced vertices (e.g., every 10 ft., every 50 ft., etc.). This data enables the mapping application to provide an accurate representation of the transit lines. This feature is illustrated in the case of a transit line that runs along or within a curved road. In some embodiments, the mapping application also snaps the transit line to a path along the road. In some embodiments, the mapping application receives separate map tiles (e.g., from a mapping service) for the transit data and for the rest of the map data, and snapping the transit line to the mad ensures that the transit line lines up with the rest of the map.

Figure 11:
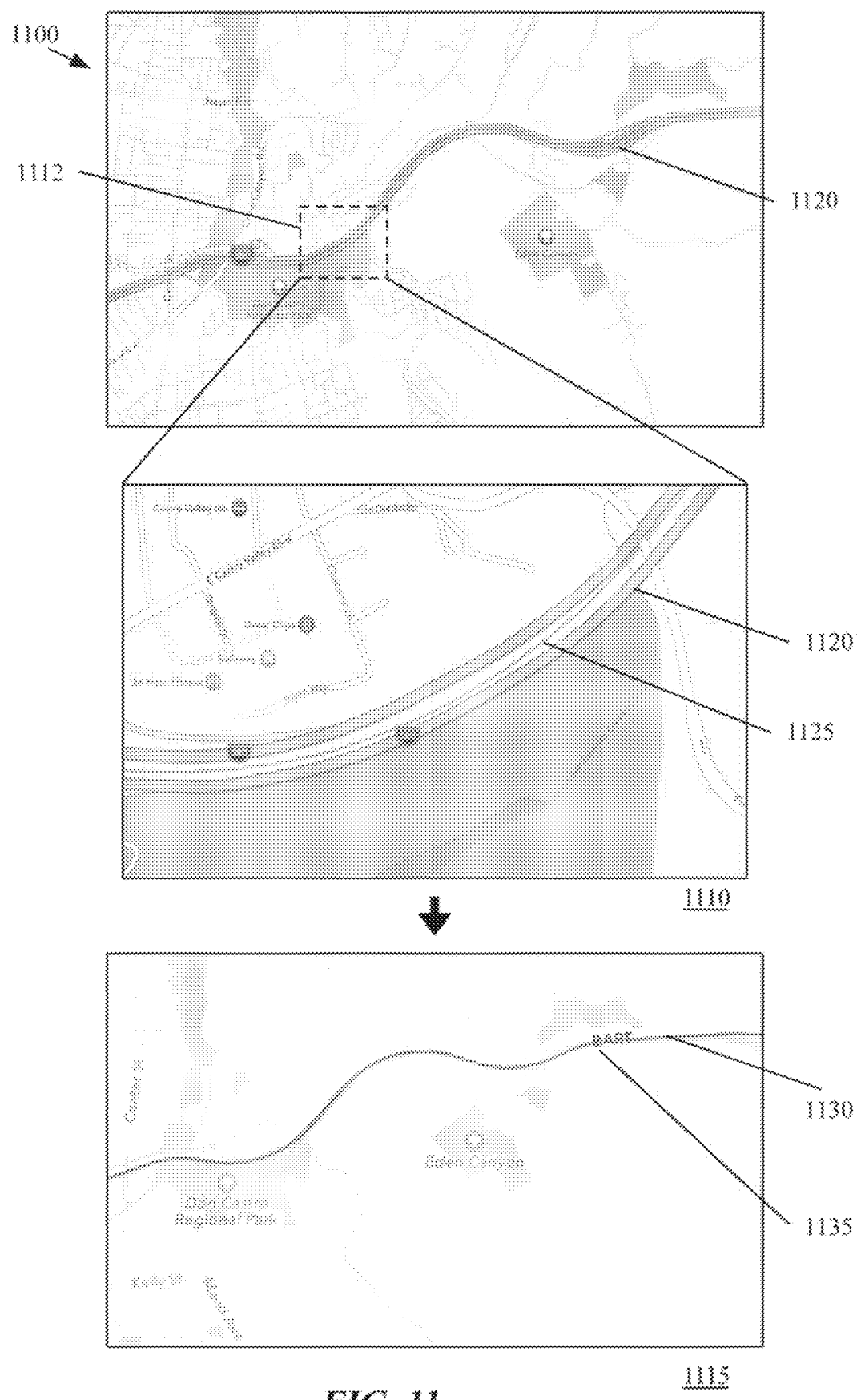
FIG. 11 illustrates an example of a colored rail line in transit browsing mode that directly snaps on the actual railway track represented in standard mode.

FIG. 11 illustrates an example of a colored rail line in transit browsing mode that directly snaps on the actual railway track represented in standard mode. Specifically, FIG. 11 illustrates two stages 1110 and 1115 that show a map region 1100, which includes a rail line, in standard map browsing mode and transit mode. As shown in the first stage 1110, the map region 1100 includes a section of the I-580 freeway 1120 near Hayward, Calif. The first stage 1110 also shows a zoomed-in portion 1112 of the map region 1100 in the standard mode of the integrated mapping application. As illustrated by the zoomed-in portion, a separation exists between the two roads of the I-580 freeway 1120 (one of which is for westbound traffic and the other of which is for eastbound traffic), and within that separation is a representation of a railway track (shown as a gray line in the standard map browsing mode). This corresponds to an actual railway track that it represents, which runs between the two carriageways of this freeway.

The second stage 1115 shows the same map region 1100 in the transit browsing mode of the mapping application of some embodiments (e.g., after a user has switched between the modes). As shown, when displayed in transit mode, a blue colored rail line 1130 is displayed on top of the representation of the actual railway track 1125. In addition, a line label 1135 indicates that the blue colored rail line 1130 represents a BART transit route. The placement of the rail line 1130 over the railway track 1125 allows the user to have a more accurate understanding of (i) where the rail line travels and (ii) if traveling along the rail line, the location of the user in relation to her destination.

The transit mode of some embodiments also displays various transit incidents, that affect the operation of transit routes, in the map display. These incidents may include line construction, accidents, station incidents, or other incidents that affect the operation of a rail line. In addition, traffic, accidents, or construction on standard mads may affect the operation of bus lines, and some embodiments, display such incidents as well.

Figure 12:
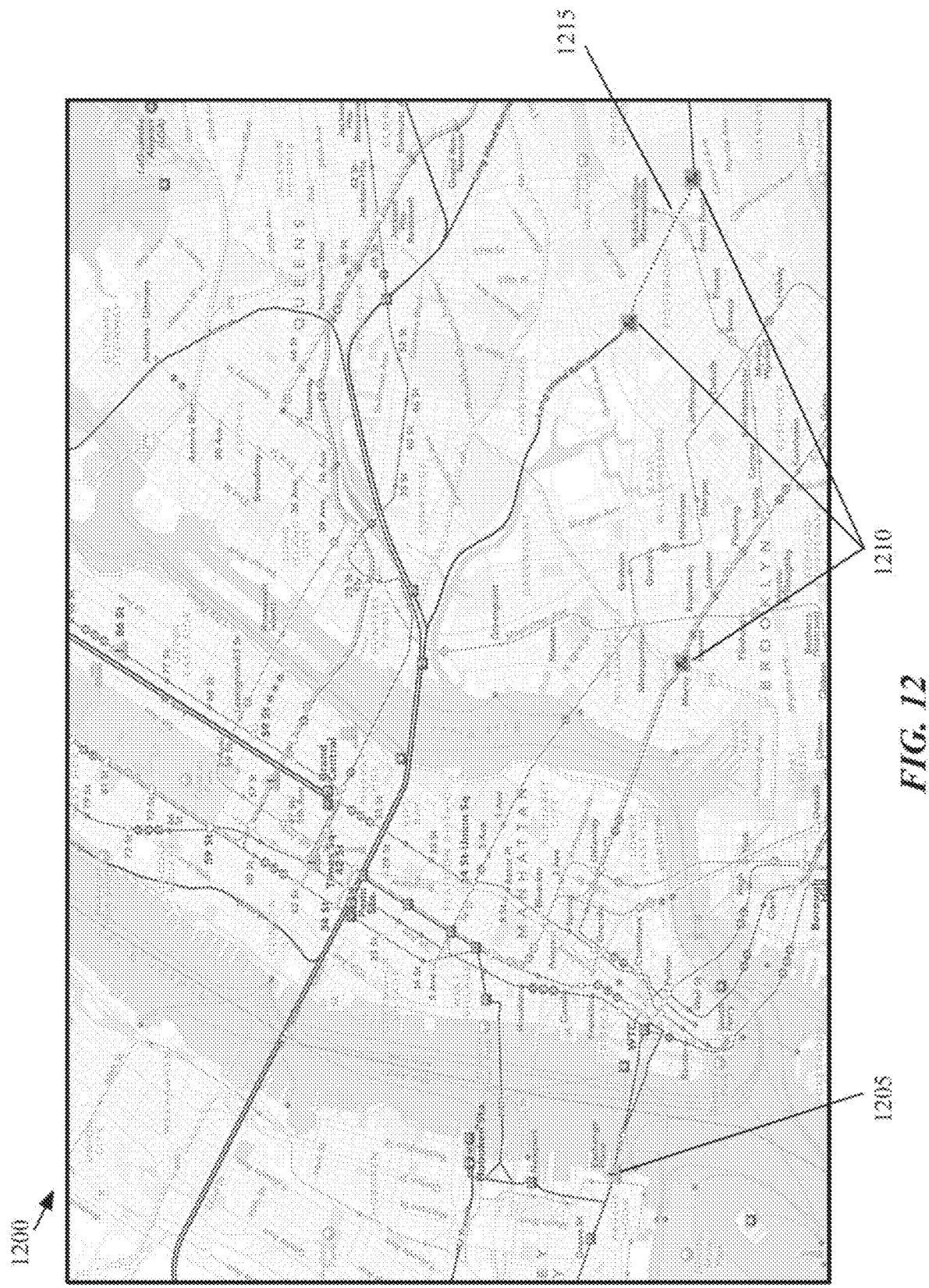
FIG. 12 illustrates an example of a map display of some embodiments that graphically indicates incidents along transit routes in a map region.

FIG. 12 illustrates an example of a map display 1200 of some embodiments that graphically indicates incidents along transit routes in a map region. For instance, the map region 1200 displays a generic incident badge 1205 at a particular location along a transit route in order to indicate that there is an issue with the transit route at the particular location. In some embodiments, a selection of the incident badge (e.g., with a tap gesture over the screen location of the badge 1205) causes the map application to display information about the incident (e.g., the type of incident, its affect on the transit route, etc.).

Some embodiments also include incident badges that indicate specific types of activities along a transit route. For instance, the map display 1200 includes construction incident badges 1210 to indicate that construction is occurring along the respective transit routes over which they appear. In some embodiments, the construction incident badges may indicate construction on the transit route itself (e.g., railway construction) or construction near the transit route (e.g., station construction or road construction along a bus line). In addition to construction incident badges, some embodiments include badges for other types of specific incidents, such as accidents, station closures, etc. As with the general incident badges, the specific incident badges of some embodiments are selectable to view additional information about the incident.

The mapping application of some embodiments also uses various graphic indicators to indicate to the user the condition of transit routes. In this example, the mapping application displays a dotted section of rail line 1215 along with two construction incident badges 1210 at either end of the dotted section. This indicates that this portion of the transit line is under construction or is being serviced. Different embodiments may use the dotted transit lines to indicate that the transit route is not operating or is operating at less than full capacity (e.g., fewer transit vehicles are servicing the route, the transit vehicles are operating slower than usual through the section of the route, etc.).

D. Temporarily Changing Transit Information

Many transit systems do not operate on a 24-hour basis and even those that do may have certain lines and/or stations that are closed for part of the day (usually at night and in the early morning). Thus, at different times of day, certain transit lines may not be operative and certain transit stations may be closed. The mapping application of some embodiments indicates this by dynamically modifying the display of transit lines and transit stations when those transit entities are closed. In some embodiments, the transit map data received by the mapping application from a mapping service includes schedule data for each of the transit lines and transit stations in a map tile. Using this schedule data, the mapping application can determine whether to display a particular line or station as closed based on the current time according to the device clock, thus accurately representing the transit options currently available to the user of the device.

Figure 13:
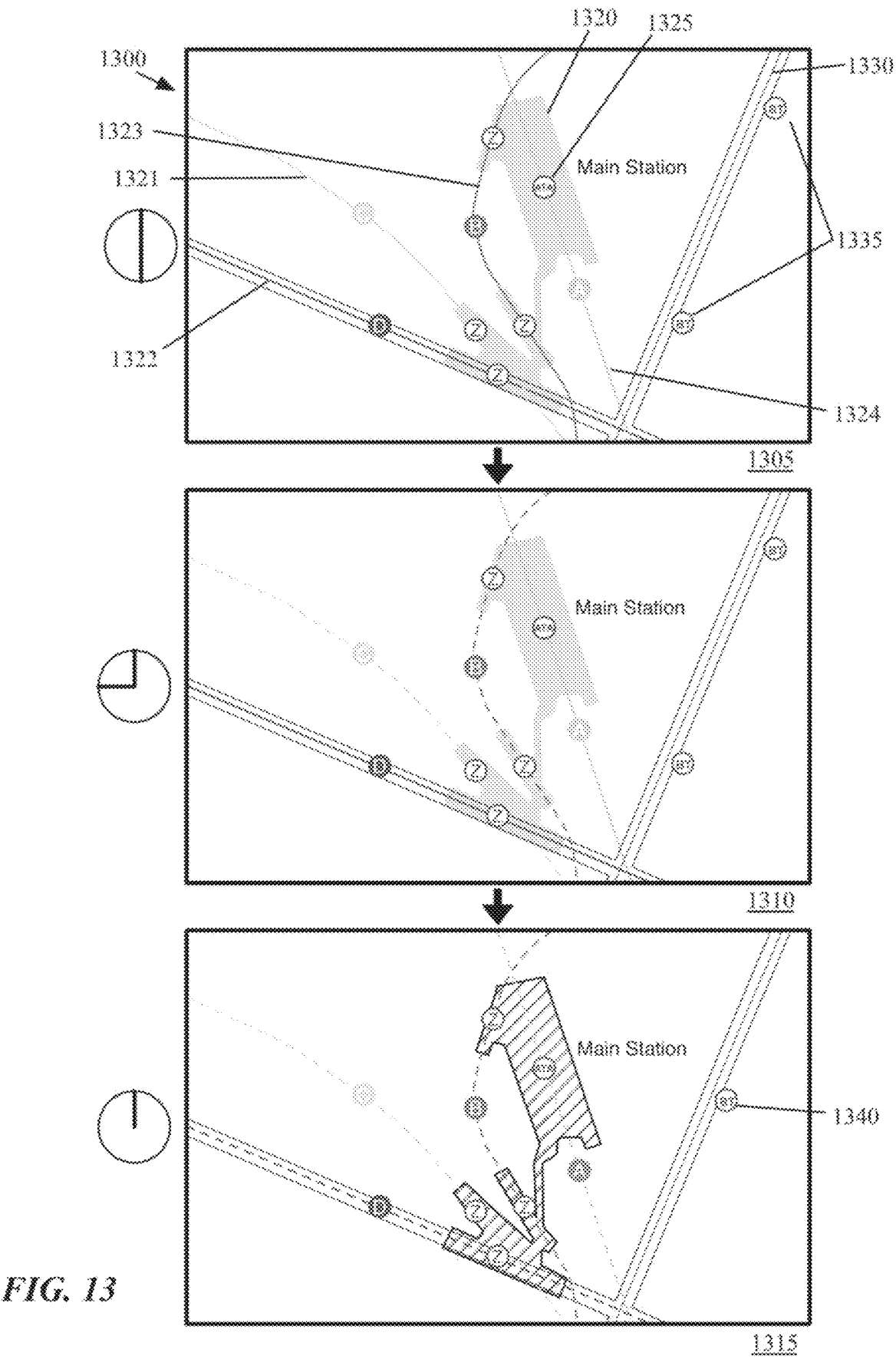
FIG. 13 illustrates the dynamic nature of transit lines and transit stations in the mapping application of some embodiments, with example rail and bus lines and a transit station that are displayed differently at different times of day.

FIG. 13 illustrates the dynamic nature of transit lines and transit stations in the mapping application of some embodiments, with example rail and bus lines and a transit station that are displayed differently at different times of day. Specifically, this figure illustrates a mapping application GUI 1300 with a map display that includes several rail lines 1321-1324, a bus line 1330, and a transit station 1320 at three different stages 1305-1315 that each represent three different times of day.

The first stage 1305 shows that the map region displayed in the mapping application GUI 1300 includes a green rail line 1324 for the transit route "A", which intersects a main transit station 1320. The application displays a badge 1325 for the main station 1320 that represents the transit system provider of the transit route "A" (the "ATA" badge, for transit provider ATA). In addition, several other rail routes intersect the hallways of the transit station 1320—specifically, a red rail line 1323, a purple rail line 1322, and a cyan rail line 1321, which represent transit routes B. C, and D, respectively. In addition, the mapping application GUI 1300 includes a bus line 1330 that runs on a street near the transit station 1320. Along the bus line 1330, the application displays two bus stops 1335 at which buses along the bus line 1330 stop. This bus line 1330 may represent a single bus route, or multiple bus routes that use the particular street in some embodiments.

The first stage 1305 illustrates the map region at 6 PM, as shown by the clock to the left of the map display. At this time, all four rail lines 1321-1324 and transit station 1320 are operational, as well as the bus line 1330 and the two bus stops 1335. To indicate that these lines and stops are operating at the current time, the mapping application displays the four rail lines 1321-1324 as solid lines and the transit station 1320 using its standard color for complex stations once zoomed in far enough to see the station details (a light salmon color hem in the illustrated example).

The second stage 1310 shows the mapping application GUI 1300 displaying the same map region three hours later, at 9 PM. At this time, the rail lines 1321 and 1323 (routes C and B, respectively) are no longer operating (e.g., because the last train through this area was earlier than 9 PM). As such, the mapping application displays the rail lines as dashed rather than solid lines, though keeping the line color. As the other two rail lines 1322 and 1324 (routes A and D) as well as the bus line 1330 are still operational at this time, the application displays them as solid lines. In some embodiments, if the user were to request a transit route, the application would only offer routes using currently operating transit routes, and thus would exclude routes B and C.

The third stage 1315 shows the same map region in the mapping application GUI 1300 after three more hours have passed, at midnight. By this time, all of the four rail routes represented by the lines 1321-1324 are closed, and thus all of these the application displays all of these lines as dashed. Furthermore, the transit station 1320 is closed at midnight, and thus the application uses a different appearance to display the station as compared to when the station was open. In this case, the application displays the station using cross-hatching, though other embodiments may lighten the station display or use a different mechanism to indicate that the station is not currently open. Furthermore, the bus stops 1335 are not displayed along the bus line 1330, because these stops are closed late at night. Instead, the application displays a bus stop 1340 at a different location along the bus line, which buses use at this hour. Some embodiments, as shown here, only display the bus stops that am currently operational; other embodiments, however, would display all three bus stops along the map at all times, bit differentiate the appearance of the stops that are operating and those that are not operating at any given time.

While in this example the mapping application displays non-operational transit routes using a dashed line and closed stations using a different appearance, different embodiments may use different or additional techniques to differentiate between operational and non-operational routes. For instance, some embodiments display labels over or near closed transit lines, at least at higher zoom levels where more rom is available. In other embodiments, the application either does not display closed transit lines or prefers open transit lines to closed transit lines at a given zoom level. Some embodiments that display multiple transit lines as separate lines when the lines are operational instead display the lines as a single line if all of the lines are non-operational. In the case where multiple transit routes are grouped into a single line even when operational, some embodiments display solid badges for operational routes and transparent or hatched badges for non-operational routes when only a subset of the routes are operating.

E. Selection of Transit Lines and Stations

In some embodiments, the transit lines and stations emphasized in the map region in the mapping application's transit mode are selectable. In some embodiments, selecting a particular transit line (e.g., through a tap gesture or other selection action) causes the mapping application to emphasize the transit line (by modifying either the selected line, the non-selected lines, or a combination thereof) and/or to display information about the selected transit line. For instance, some embodiments desaturate the non-selected transit lines, and some such embodiments display the selected transit line with additional saturation.

Figure 14:
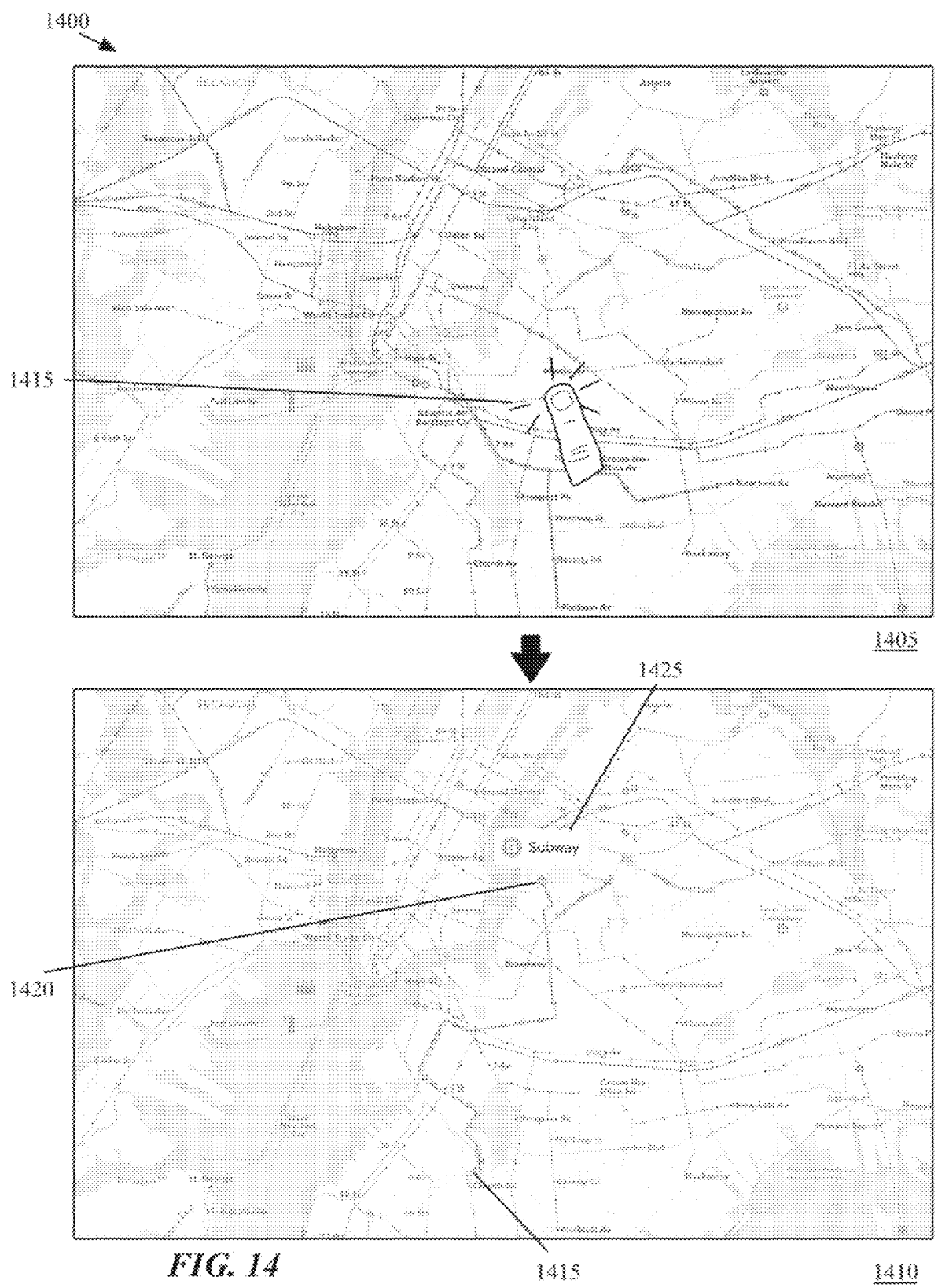
FIG. 14 illustrates an example of the selection of a transit line for a single transit route.

FIG. 14 illustrates an example of the selection of a transit line for a single transit route over two stages 1405-1410 of the mapping application GUI 1400 of some embodiments. The first stage 1405 displays the mapping application GUI 1400 in transit mode, showing a map region with a section of New York city and its surrounding areas. The map displays numerous transit lines of various colors, including the subway line "G" 1415 displayed using the color green. At this stage, the user selects the green G line 1415 by performing a tap gesture. As shown here, in some embodiments the user can select a transit line by tapping (or performing a different selection gesture) anywhere on the line, while other embodiments require the user to select a badge representing the transit route in order to select a transit line.

The second stage 1410 illustrates the same map region in the GUI 1400 after the selection of the green G line 1415. In particular, upon selection of the green transit line 1415, the mapping application reduces the color saturation of the rest of the map outside of the selected transit line. This includes desaturation of both the already-deemphasized non-transit map constructs (e.g., the river, parks, place of interest labels, etc.) as well as the non-selected transit lines (i.e., all of the transit lines other than the selected green subway line 1415). In some embodiments, the application applies a negative saturation filter to the map, then displays the selected transit line above this saturation filter. In addition, the application increases the saturation and slightly thickens the selected line 1415, as well as increasing the size of the line shields 1420 (showing the "G") and the transit stations along the line. Some embodiments, however, only deemphasize (by, e.g., desaturation) the rest of the map, while not actually modifying the selected line and its associated constructs.

Along with emphasizing features already displayed along the transit line, some embodiments display additional map features when a transit line is selected. For instance, upon selection of the green transit line 1415, the mapping application displays a banner 1425 above the line shield 1420. The banner 1425 displays information regarding the selected transit line, indicating the name of the transit line ("Subway G"). Some embodiments also include additional information such as the time the represented transit route is operational, a depiction of a train to indicate the type of transit vehicles that operate on the route, or other information. In some embodiments, the transit line banners are selectable to display additional information about the line (e.g., more detailed schedules with a list of stops/stations, reviews of the transit line or system, etc.).

While this example shows the selection of a transit line that represents a single transit route, some embodiments include selectable transit lines that represent multiple routes (e.g., the MUNI lines in the San Francisco map of FIG. 6).

When a user selects such a grouped line, some embodiments display a single banner with information about each of the routes (e.g., one above the other). Other embodiments display separate banners for each of the routes, or allow the user to cycle through banners for the different routes.

In addition to the features shown in this example, some embodiments display additional information upon the selection of a transit line. For example, some embodiments display additional stations or stops along the transit line that were not previously displayed, in some cases removing other transit stations (not along the selected line) or other map constructs in order to avoid clutter. Some embodiments may also highlight places of interest easily reachable or commonly traveled to via the transit line, or transit stations nearby to the selected line.

As mentioned, transit stations may also be selected in some embodiments. Whereas selection of a single transit line causes the mapping application to highlight that line, in some embodiments when a user selects a transit station, both the station and all lines that intersect that station are emphasized in the map display.

Figure 15:
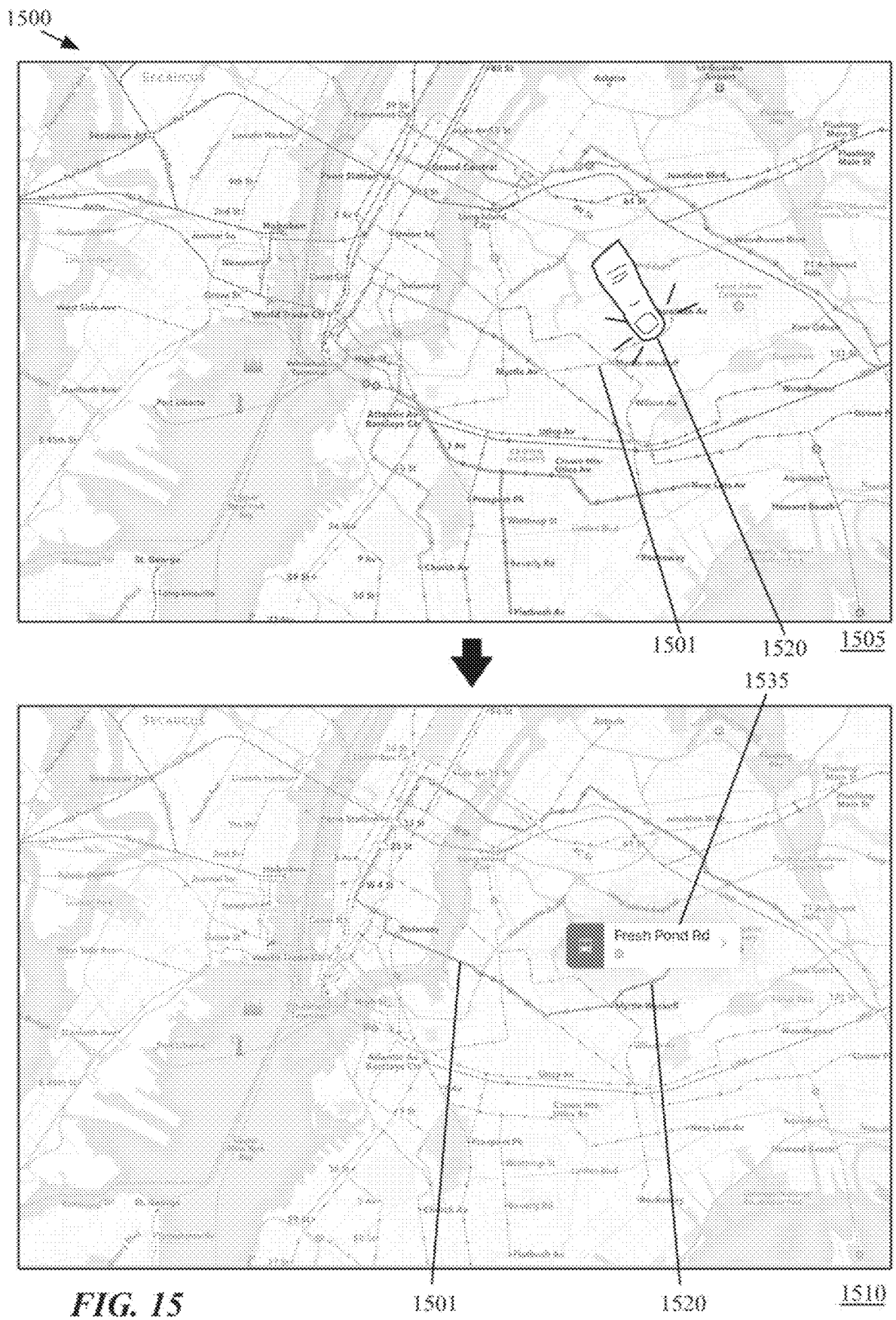
FIG. 15 illustrates an example of the selection of a transit station intersected by multiple transit routes.

FIG. 15 illustrates an example of the selection of a transit station intersected by multiple transit routes over two stages 1505-1510 of the mapping application GUI 1500 of some embodiments. The first stage 1505 displays the same map region as in FIG. 14 (i.e., a section of the New York City region), with numerous transit lines of various colors. Included in this section is the Fresh Pond Rd. station 1520, which is not currently labeled, and which serves as a stop for the M subway line 1501. In this first stage, the user selects the station 1520 (e.g., with a tap input, as shown in the figure).

The second stage 1510 illustrates the same map region in the GUI 1500 after the selection of the Fresh Pond Rd. transit station 1520. In particular, upon selection of the transit station 1520, the mapping application reduces the color saturation of most of the map, excepting the selected transit station and the orange transit line that intersects that transit station. As in the previous figure, this includes desaturation of both the already-deemphasized non-transit map constructs (e.g., the river, parks, place of interest labels, etc.) as well as the non-selected transit lines (i.e., all of the transit lines other than the line 1501 that stops at the selected transit station). In addition, the application increases saturation and thickness of the line 1501, as well as increasing the size of the line shields of the highlighted transit lines.

In some embodiments, a selected transit station may have multiple transit routes that stop at the station (e.g., the stations represented by white pills). In this case, selection of the station in some embodiments results in multiple selected transit lines, all of which am emphasized in the resulting map display. In addition, if the station is connected (e.g., by underground or above-ground passageways, as part of a single building or complex, etc.) to nearby stations, some embodiments also emphasize these stations as well as the lines that intersect the nearby stations.

Along with emphasizing the selected features of the transit station and its associated transit line or lines, some embodiments display additional map features when a transit station is selected. For instance, upon selection of the Fresh Pond Rd. station, the mapping application displays a banner 1535 above the station badge 1520. The banner 1535 displays information regarding the selected transit station, indicating the transit providers and their routes (i.e., M subway route) that stop at the selected station. In addition, the banner 1535 includes a depiction of a train to indicate the type of transit vehicles that operate at the station (transit hubs with multiple types of vehicles may have banners that display the most prominent vehicle type at the station, or multiple icons for the different vehicle types). In some embodiments, the station banner is selectable to cause the application to provide a transit or walking navigation route to the station (e.g., by selecting a particular portion of the banner). In addition, in some embodiments the banner is selectable (e.g., by selecting a different portion of the banner) to cause the application to display a placecard for the transit station. Such a placecard, in some embodiments, displays information about the transit station, such as the hours it is open, reviews of the station, photos of the station, information about the different transit routes that stop at the station, etc. Such transit station place cards are discussed in detail in U.S. patent application Ser. No. 14/869,403 filed Sep. 29, 2015 entitled "Map Application with Transit Navigation Mode", which is incorporated herein by reference.

Figure 16:
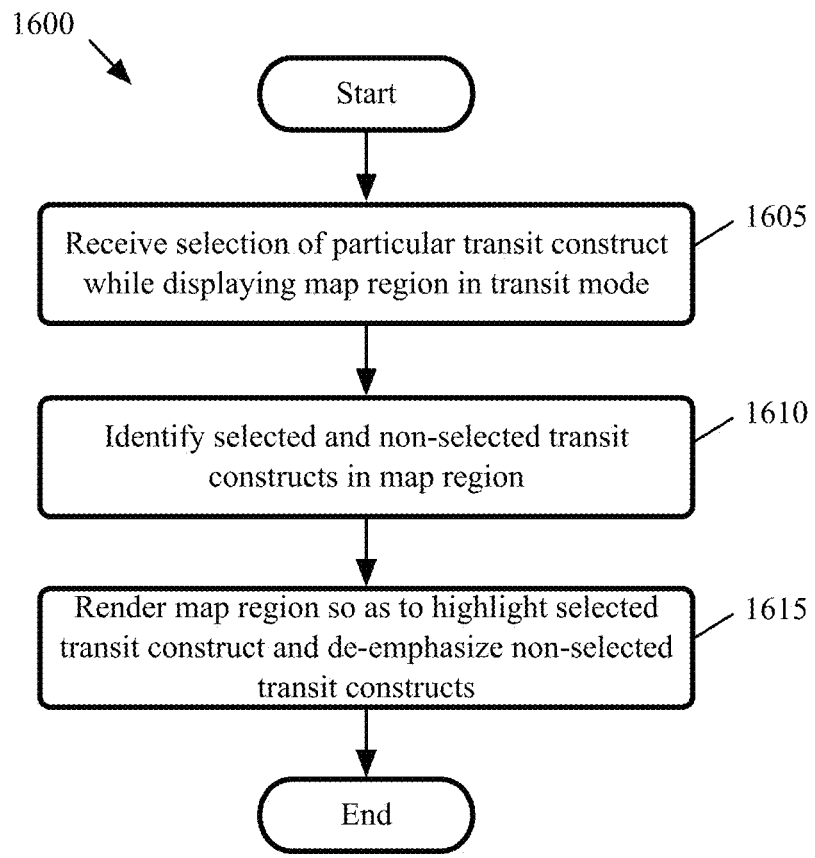
FIG. 16 conceptually illustrates a process of some embodiments for rendering a map region in order to emphasize a selected transit line while de-emphasizing non-selected transit lines.

FIG. 16 conceptually illustrates a process 1600 of some embodiments for rendering a map region in order to emphasize a selected transit line while de-emphasizing non-selected transit lines. The process 1600 is performed by the mapping application of some embodiments while operating in transit mode. In transit mode, as shown in FIG. 1 and described above, the mapping application emphasizes transit-related constructs, such as transit lines and stations.

As shown, the process begins by receiving (at 1605) a selection of a particular transit construct while displaying a map region in transit mode. In some embodiments, the selection is a gestural input from a user (e.g., a tap gesture) through a touch-sensitive display screen of the device that executes the mapping application. In other embodiments, the selection may be through a different type of input device (e.g., a cursor controller, a keyboard, etc.). In order to select a transit line, in some embodiments the selection must be received over a transit line shield displayed along the line, while in other embodiments the user may select anywhere along the line. In some embodiments, as shown above, users may also select a transit station, which can result in the selection of multiple lines. In some embodiments, when the selection is received as a tap gesture through a touchscreen, the device (e.g., the a touch gesture resolution framework of the operating system) resolves the tap gesture to a set of coordinates of the display screen based on the locations at which the tap gesture was received. The mapping application then uses this location to determine which line or station the user has selected based on to which transit construct (or other map construct) the user input is closest.

Upon receiving the selection, the process 1600 identifies (at 1610) the selected and non-selected transit constructs in the map region. When the user selects a single transit line, some embodiments also treat the transit stations/stops intersected by the line as selected as well. In that case, all of the other transit lines are non-selected, as well as the transit stations that the selected line does not intersect. In addition, when the user selects a transit station, some embodiments treat that station as well as any stations connected to the station as selected, in addition to all of the transit lines that run through that station (and its connected stations). Some embodiments also treat the stations along those selected lines as selected.

The process 1600 then renders (at 1615) the map region so as to highlight the selected transit constructs and de-emphasize non-selected transit constructs. In some embodiments, in order to highlight a selected transit line, the mapping application increases the width of the selected line and/or increases the color saturation of the selected line. On the other hand, the non-selected transit lines ae de-emphasized by the mapping application, by displaying these lines with reduced color saturation and/or width. In addition, the selected transit station and/or transit stations along a selected line may be increased in size (especially those stations represented by a simple unlabeled pill rather than a transit system badge). Transit stations along a single transit line (that share the line color) may be increased in size and color saturation in correspondence with their transit line.

F. Display of Road Labels

In some embodiments, the mapping application displays road labels in transit mode using similar techniques as to those used to display traffic information in the standard mode. Specifically, in the standard mode of some embodiments the application displays road labels on the road when there is no traffic information for the road, but above the road when there is traffic information displayed on the road. Similarly, in the transit mode of some embodiments the application displays the road labels on the road for roads that do not have transit lines, but above the road for roads on which transit lines are displayed.

Figure 17:
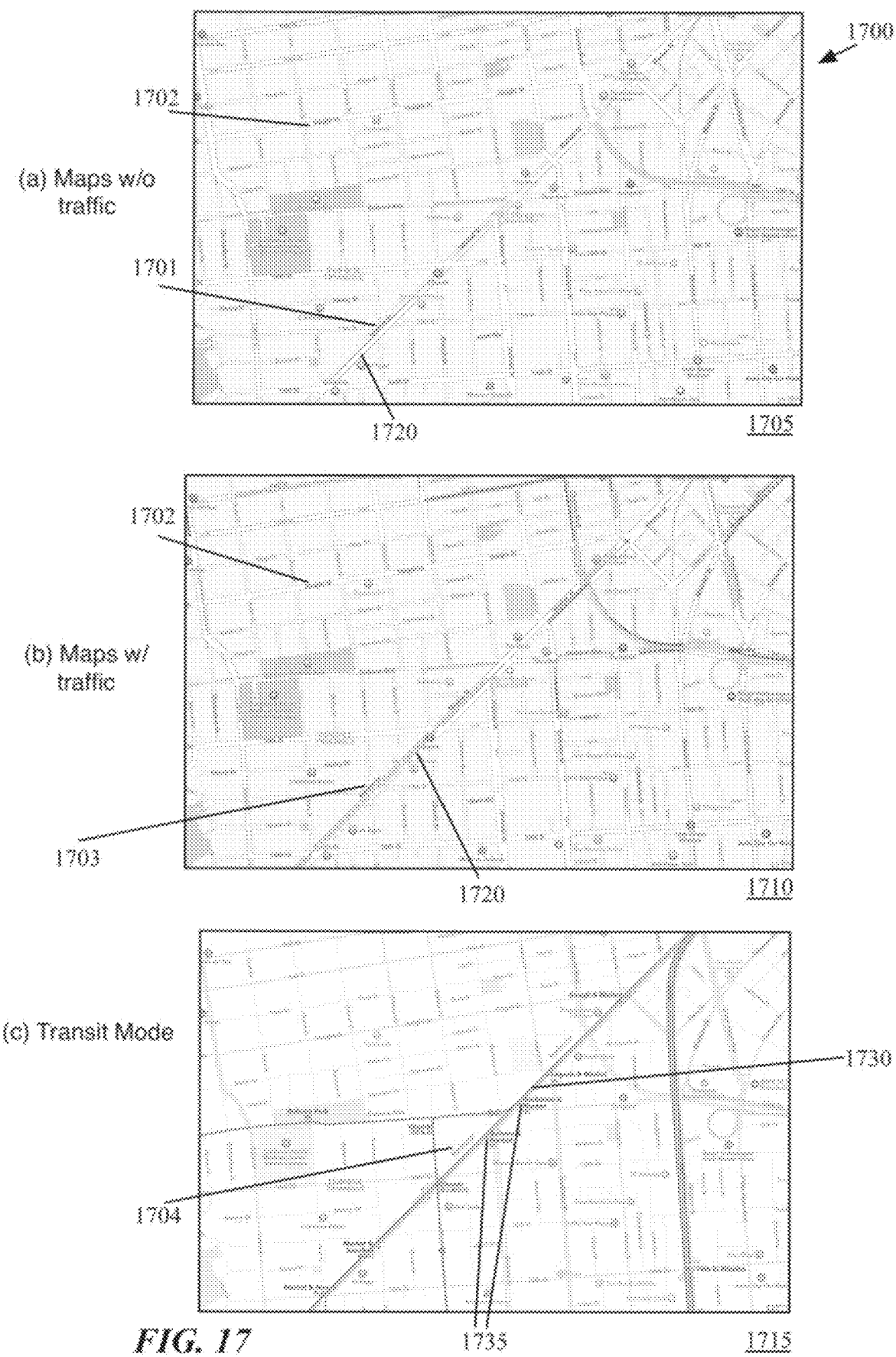
FIG. 17 illustrates three different examples of the same map region (a portion of San Francisco) displayed in the mapping application GUI of some embodiments.

FIG. 17 illustrates three different examples 1705-1715 of the same map region (a portion of San Francisco) displayed in the mapping application GUI 1700 of some embodiments. Specifically, the first example 1705 illustrates the map region in standard mode without traffic, the second example 1710 illustrates the map region in standard mode while displaying traffic information, and the third example 1715 illustrates the map region in transit mode. Each of these examples show the road label for "Market St." displayed differently.

The first example 1705 shows the mapping application GUI 1700 in standard mode without traffic indicators. This could be due to the user having set the application to not display any traffic information, or because there is no traffic in the area displayed in the map region. As shown in this example, the road label 1701 for "The Embarcadero" is overlaid on the road 1720 (the road that the label identifies), as is the road label 1702 for "Bay St."

The second example 1710 shows the mapping application GUI 1700 in standard mode, but with traffic indicators turned on (and with traffic information to display in the map region). In this example, the label 1703 for "Market St." is overlaid on the map just above the road 1720 (running along the road), so that it is easily readable with the traffic information displayed on the road. However, as there is no traffic information for Bay St., the label 1702 is unchanged (still displayed on the road).

The third example 1715 shows the mapping application GUI 1700 in transit mode, rather than standard mode. As can be seen, the map region is displayed using the characteristics described above, with the non-transit roads, bay, land cover, etc. de-emphasized in favor of the transit lines and stations. In the transit mode, a transit line 1730 (for a MUNI transit route) with several stations 1735 is overlaid along the road 1720. Thus, as with the traffic indicators, the application displays the road label 1704 for "Market St." overlaid on the map just above the road, similar to how the road label 1703 is displayed in the second example 1710. In this case, the stylings of the labels in transit mode are used, rather than the stylings for standard mode. In some embodiments, the application displays the labels on the road even when transit lines are present, so long as the label does not obscure any stations or stops.

Figure 18:
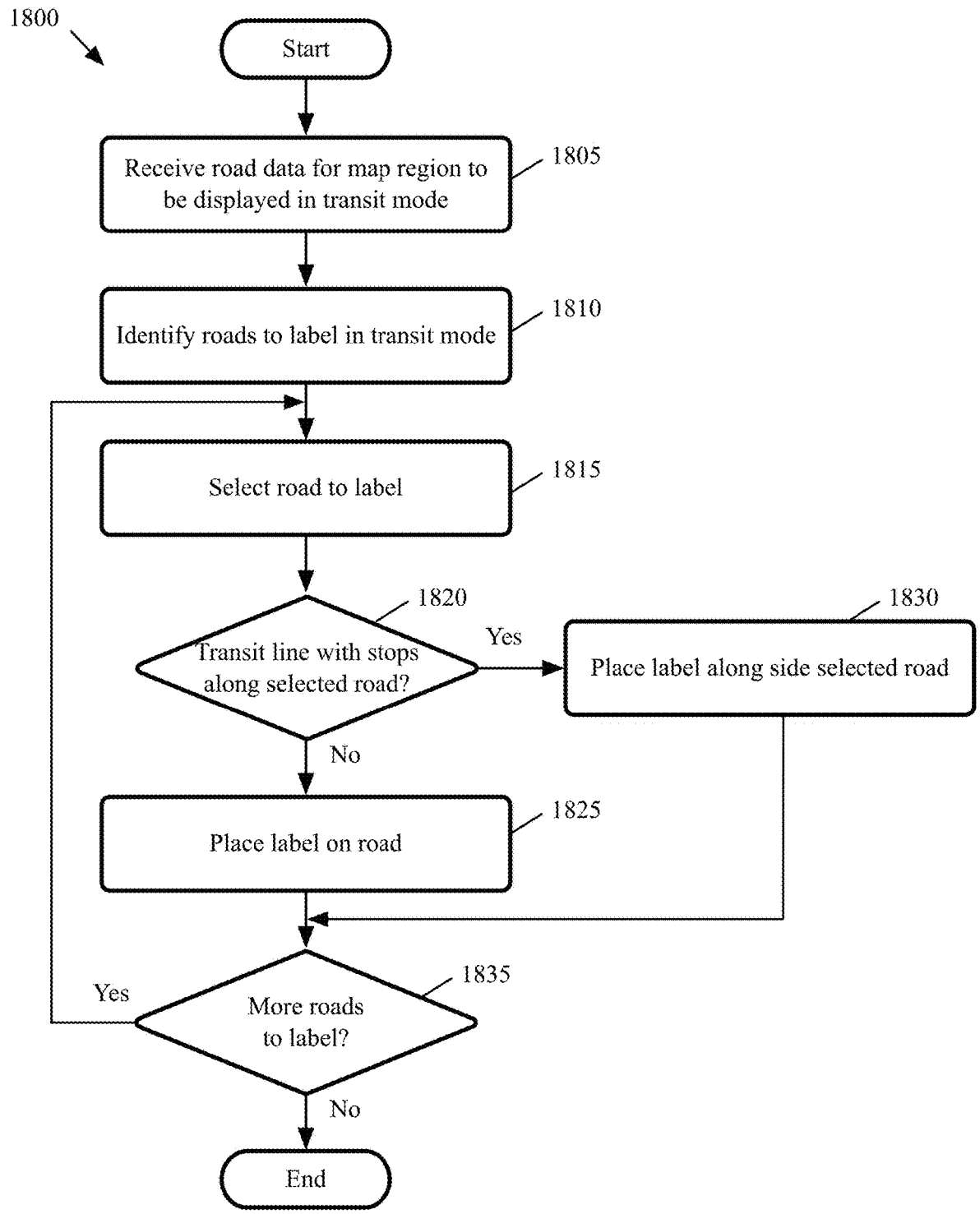
FIG. 18 conceptually illustrates a process of some embodiments for displaying road labels in the transit mode of some embodiments.

FIG. 18 conceptually illustrates a process 1800 of some embodiments for displaying road labels in the transit mode of some embodiments. In some embodiments, the process 1800 is performed by a mapping application operating on a device to display map information for a user in transit mode. The device may be a mobile device (e.g., a touchscreen mobile device such as a smart phone or tablet), a desktop or laptop computer, or other device on which a mapping application operates.

As shown, the process begins by receiving (at 1805) road data for a map region to be displayed in transit mode. As described above by reference to FIG. 8, in some embodiments the mapping application receives the road data as vectorized information within map tiles for the region. The road data of some embodiments includes path information for the road (e.g., as a set of coordinates) as well as road name information. In addition, some embodiments receive transit data (either as part of the same map tiles or in separate map tiles) that specifies where to display transit lines on the map, either as a set of coordinates or by reference to roads along which the transit routes travel.

The process then identifies (at 1810) the roads to label in transit mode. As shown in the above figure, some embodiments label (and display) more of the roads in standard mode than in transit mode, in addition to emphasizing the roads more in the standard mode. Thus, for the current moon level of the map, the application determines which roads should have labels displayed, which may be based on the relative importance of the roads, how cluttered the map display is, and other factors. Some embodiments only display labels for roads that have transit lines when in transit made. The process next selects (at 1815) one of the roads that will be labeled. Though this figure shows the process as looping over each road, one of ordinary skill in the art will recognize that this is a conceptual process, and some embodiments perform the operations for several mads in parallel.

For the selected road, the process 1800 determines (at 1820) whether a transit line is displayed along the current road, and whether any stops need to be displayed in the location at which the road label will be displayed. In some embodiments, this entails determining whether a portion of the road can be identified over which the label can be drawn without obscuring any stations or stops along the transit line that follows the road. For example, some embodiments optimally find a location at which the road does not have a transit line overlaid, while other embodiments prefer to display the road label over or along the transit line (so that the label can be easily linked by the user to the transit line). If the road label can only be displayed along a transit line, some embodiments determine whether a long enough portion of the transit line does not have any stops such that the road label can be displayed between the stops.

When a space exists for the road label such that the label will not obscure any stops, the process places (at 1825) the label on the road (e.g., as shown for Columbus Ave, in example 1715 of FIG. 17). On the other hand, when no such space exists for the road label, the process places (at 1830) the label along the side of the selected road (e.g., as shown for The Embarcadero in the example 1715 of FIG. 17). The process then determines (at 1835) whether any roads remain to be labeled. If more mads remain, the process returns to 1815 to select the next mad.

Once all the roads are labeled, however, the process ends.

II. Map Display in Transit Navigation

As mentioned above, the standard mode of the integrated mapping application of some embodiments enables a user to search for a particular location and routes the user to that location through a navigation mode of the application. In some embodiments, the user can initiate navigation for different types of routes, including driving, walking, and transit routes. When a user enters navigation from the standard mode, some embodiments default to a driving route except for very short distances in which case walking is the default. However, users have the option to select a transit route in some embodiments, even when entering navigation mode from the standard mapping mode. When entering navigation from the transit mode of some embodiments, the application automatically defaults to a transit route to the location, except for very short distances where walking is the default.

When the user requests a transit route, in some embodiments the application provides the user with one or more options of routes to the requested destination that use a combination of transit portions and walking portions (e.g., between transit portions). For instance, unless the user starts the route while at a transit stop, the user will have to walk to the first transit portion (also referred to as a "leg" of the route), in addition to walking between portions and walking from the last portion to the eventual destination. Once the user selects one of the routes for navigation, in some embodiments the application provides the user with directions for each leg of the navigated route. The operation of the application in the transit navigation mode of some embodiments is described in further detail in U.S. patent application Ser. No. 14/869,403 filed Sep. 29, 2015 entitled "Map Application with Transit Navigation Mode", which is incorporated by reference above.

A. Initiating Transit Navigation

Figure 19:
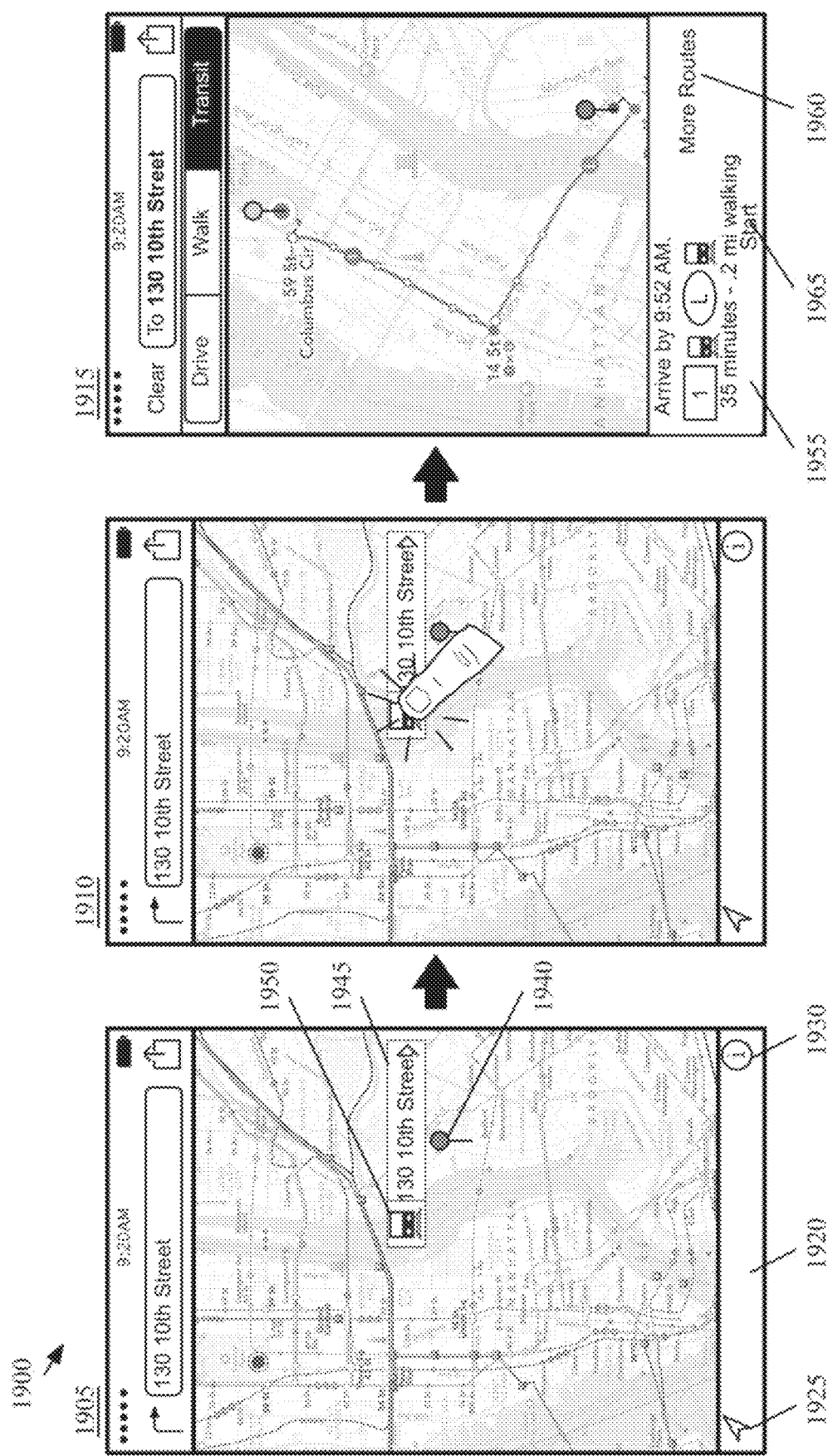
FIG. 19 illustrates an example of a user searching for a destination in transit mode and initiating a transit route to the destination.

As mentioned, the mapping application may enter the transit navigation mode from either the standard map browsing mode or the transit map browsing mode described above in Section I. FIG. 19 illustrates an example of a user searching for a destination in transit mode and initiating a transit route to the destination over three stages 1905-1915 of a mapping application GUI 1900 of some embodiments.

The first stage 1905 shows the mapping application GUI 1900 in transit mode, after a user has searched for a particular address in New York City. Specifically, the application displays a map region showing portions of Manhattan and Brooklyn, in addition to various user interface constructs. The application GUI 1900 includes a lower UI item bar 1920, that includes a UI item 1925 for centering the map on the device location and a UI item 1930 for causing the application to display a set of selectable options (e.g., the mode choices shown in the second stage 110 of FIG. 1). The GUI 1900 also includes a search bar through which the user can enter a search term, such as an address, location name, etc. In this case, the user has entered an address "123 10$^{th}$ Street". As a result, the application displays a pin 1940 at the location 123 A Street, as well as a banner 1945 for this location. The banner includes a selectable transit routing icon 1950, that depicts a train. This icon is selectable to cause the application to display one or more transit routes to the destination.

In the second stage 1910, the user selects the transit muting icon 1950. As a result, in the third stage 1915 the mapping application displays a route from the current location of the device (Central Park, near the 59$^{th}$ St./Columbus Circle subway station) to the selected location. Because the application was in transit browsing mode, some embodiments automatically present a transit route, although as shown the user can select driving or walking options as well. The lower section 1955 of the GUI 1900 displays a route summary indicating that the user will have to take two transit routes (the 1 Line and L line), both of which are trains (as shown by the train indicators next to the line numbers). This route summary area 1955 includes a selectable item 1960 that causes the application display additional transit routes as well as a selectable item 1965 that causes the application to enter a transit navigation mode. The transit navigation mode of some embodiments displays panels for step-by-step navigation from the current location of the device to the destination of the route, instructing the user which transit vehicles to board, how to board them, when to exit the transit vehicles, and how to navigate between transit vehicles.

Figure 20:
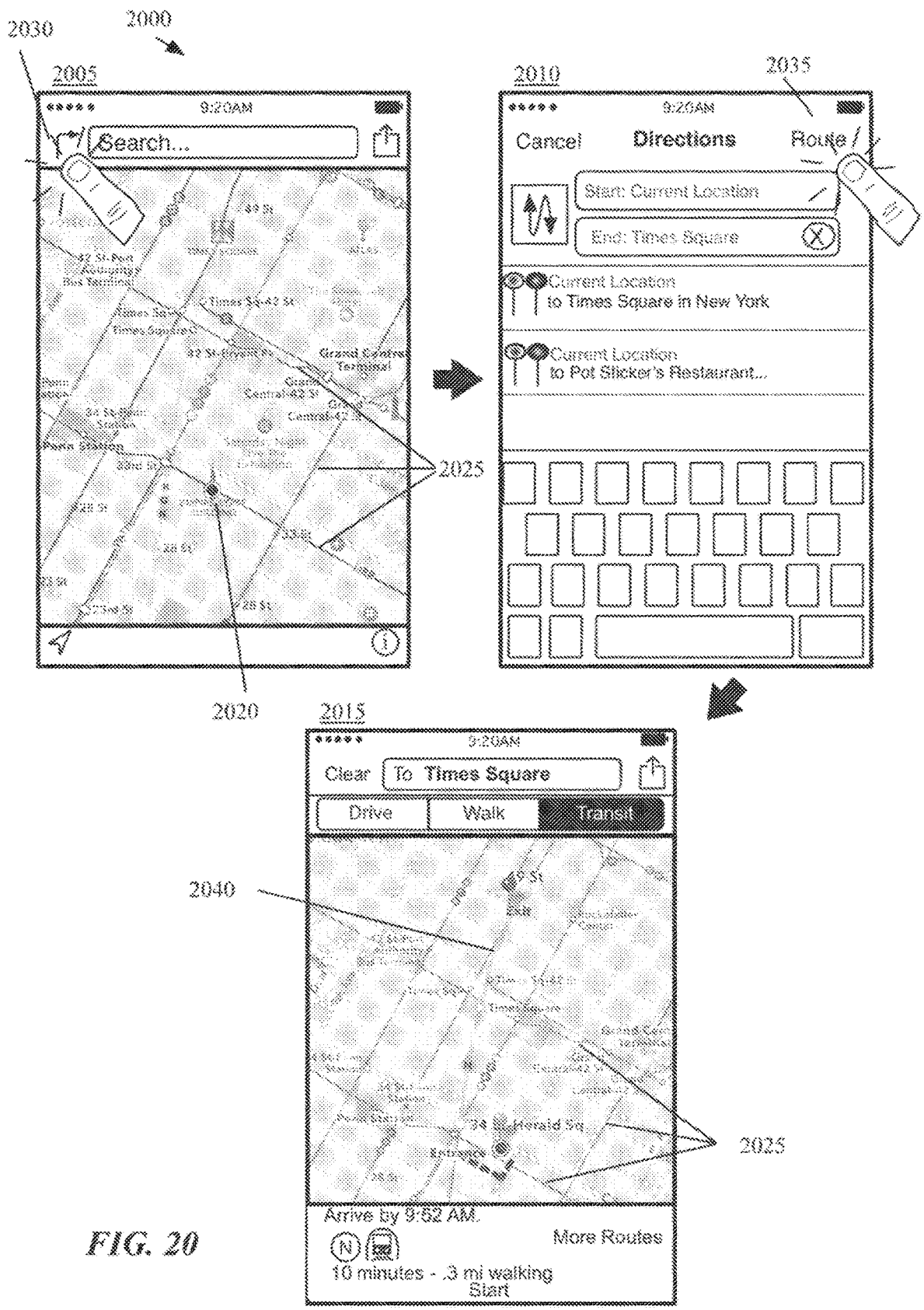
FIG. 20 illustrates an example of a user requesting directions to a destination in transit mode.

FIG. 20 illustrates an example of a user requesting directions to a destination in transit mode and initiating a transit route to the destination over three stages 2005-2015 of the GUI 2000 of some embodiments. As shown, the first stage 2005 illustrates, in transit mode, a map of Manhattan that includes a position indicator 2020 that indicates the current position of the user and several transit lines 2025 that are displayed in various colors. In some embodiments, transit lines are displayed in different colors in order to clearly identify different potential transit routes within the map. As described above, transit lines may be designated as a separate color to indicate which transit vehicle routes or providers service a particular area. The first stage 2005 shows a user selecting a selectable routing item 2030 in order to request a route to a particular destination.

The second stage 2010 illustrates a directions input field, into which the user has input a request for directions to Times Square. The user also selects the route item 2035, to instruct the mapping application to provide one or more transit routes to the destination. In the third stage 2015, the mapping application displays a route 2040 from the current location of the user (Empire State Building) to Times Square. The route 2040, which traverses a portion of a transit line, is displayed with the color yellow while other transit lines 2025 are dimmed and colored gray. In addition, the route 2040 is thicker than other transit lines displayed on the map. In some embodiments, only portions of transit lines that are traversed by the user are colored because with an identified route, the user no longer needs to be made aware of other available transit lines. Coloring only the traversed portion, while graying other transit lines in the map, also allows the user to focus on the route without being distracted by other lines on the map. In some embodiments, this same dimming and graying effect on transit lines that are not traversed by a user during transit navigation also occurs when the user initiates transit navigation through selection of a selectable transit routing icon as described in FIG. 19.

B. Transit Navigation Panels

Figure 21:
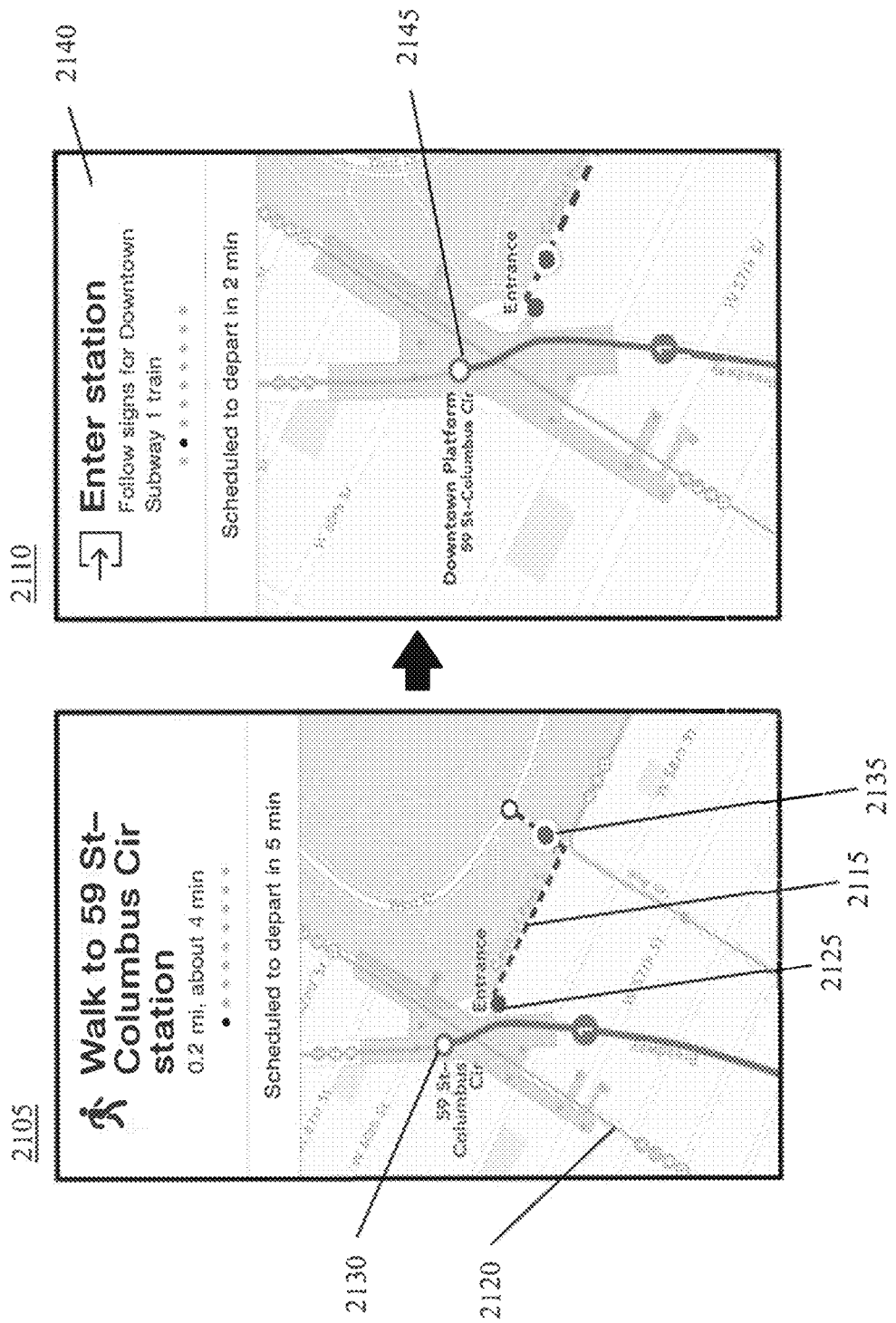
FIGS. 21-23 illustrate transit navigation panels during the course of a transit route between Central Park near 59$^{th}$ Street and 10$^{th}$ Street in Brooklyn.
Figure 22:
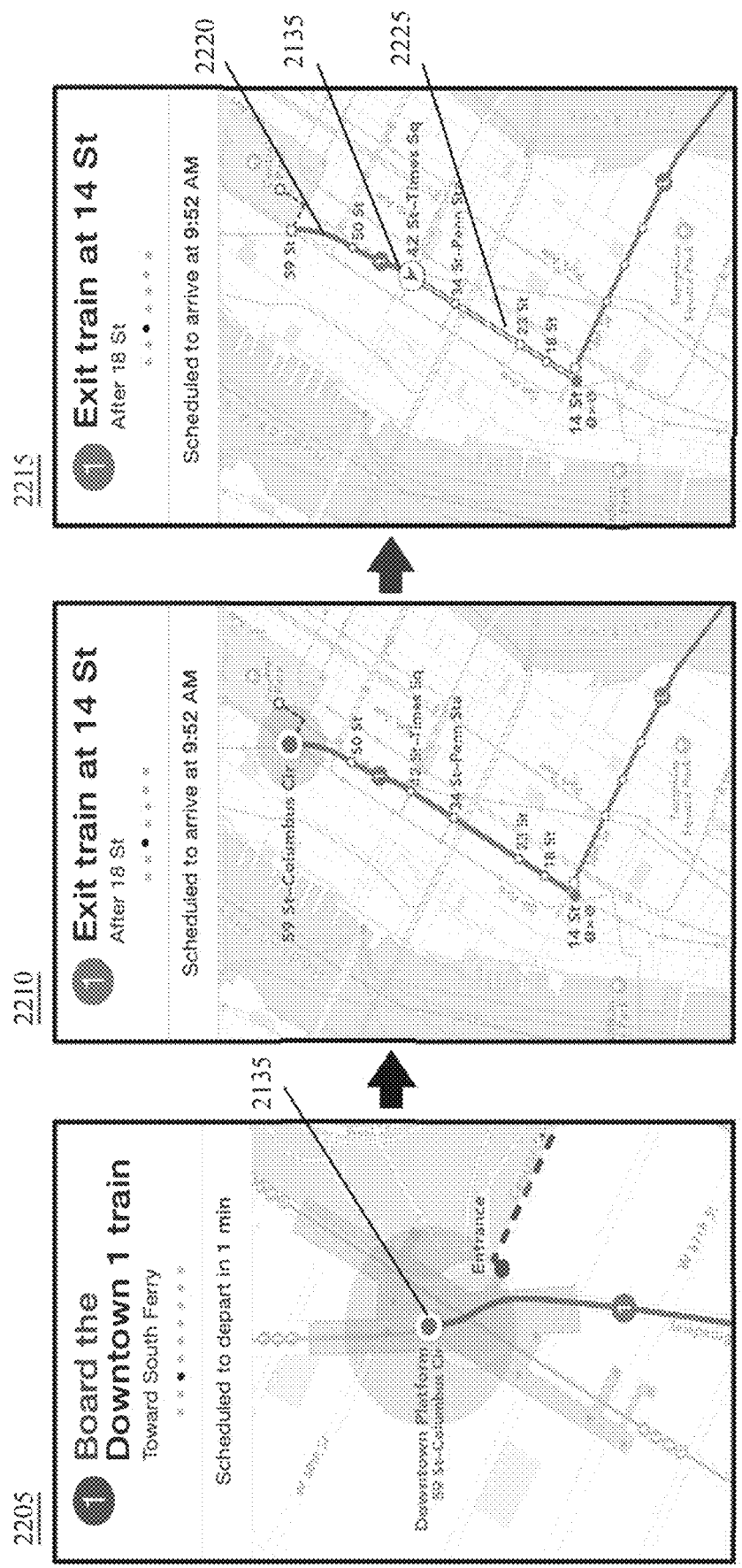
Figure 23:
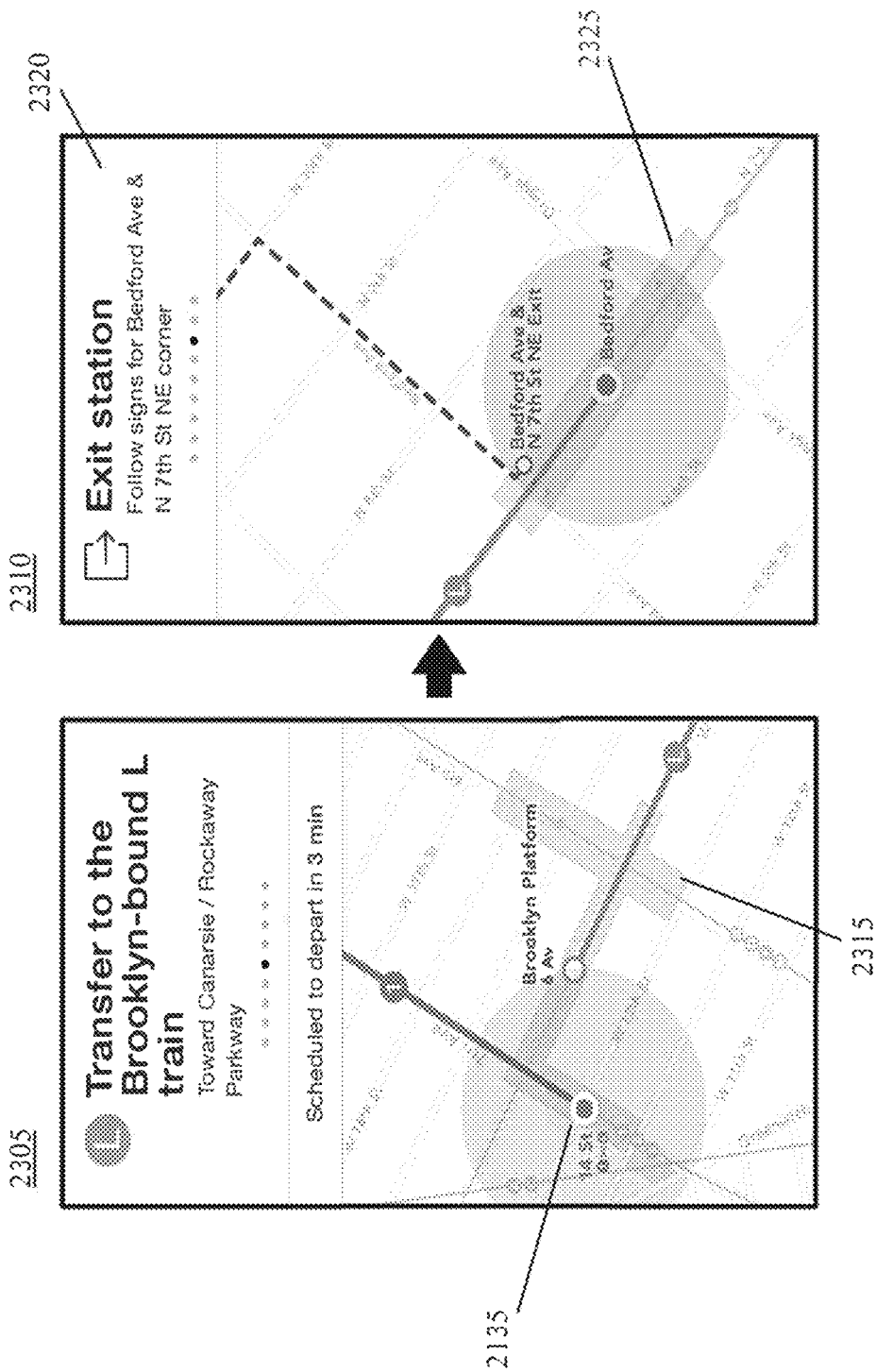

FIGS. 21-23 illustrate transit navigation panels during the course of a transit route between Central Park near 59$^{th}$ Street and 10$^{th}$ Street in Brooklyn. FIG. 21 illustrates two successive stages 2105-2110 during which the devices moves (presumably along with the user of the device) from the starting location of the route to the entrance of the first transit station along the route.

In the first stage 2105, the user has started navigation (by, e.g., selecting the UI item 1965 shown in stage 1915 of FIG. 19). As the first portion of the route involves walking to a subway station 2130, the mapping application displays a suggested walking path towards the entrance to the station. As shown, some embodiments label the station entrance 2125, so that the user knows the specific part of the station to aim for, rather than simply walking towards the location of the station and then trying to find the entrance on their own (especially since the station is often underground). As described below, for stations with multiple entrances, some embodiments identify the optimal entrance based on the user's location and/or the location within the transit station that the user will need to navigate to in order to catch the next transit leg of the route. While the device position (shown by the circular location indicator 2135) is outside of a threshold distance from the transit station, the application displays the name of the transit station (59 St.—Columbus Cir. station).

As shown, in some embodiments, the application displays the walking path 2115 as a grey, dashed line, while displaying the transit line(s) on route as solid lines, using the same color assigned to the line in the transit map browsing mode. The on-route transit line 2120 is shown in red, with a large red shield indicating the route the user is taking. On the other hand, off route transit lines, such as the line 2120, are shown as dimmed with smaller route shields. This allows the user to easily differentiate the walking path from the transit lines, as well as the on-route transit line from the other transit lines that may use the same station. In this case, the 1 line that is on the route shares rail tracks with the 2 and 3 line, as shown by the section of dimmed, gray transit line north of the station. However, for the portion south of the station, the application displays only the 1 line shield, as this is the transit route that the user will ride. In addition, the remainder of the map (e.g., other streets, the park, etc.) are dimmed in comparison to the standard map browsing display.

In the second stage 2110, the user (and thus the device) has travelled along the walking path to a location nearby to the station entrance 2125, as shown by the location identifier 2135. At this point, the application displays instructions for entering the station and boarding the upcoming transit leg. In addition, the map display is zoomed in to better highlight the layout of the station, allowing for easy navigation. Furthermore, in addition to the navigation banner 2140 specifying to follow signs for the Downtown 1 train, the map display highlights the location of the proper boarding platform 2145, and specifically labels the platform ("Downtown Platform" in addition to the station name.

FIG. 22 illustrates a set of navigation panels and the corresponding map display as the user boards the 1 train and then subsequently rides the train along the transit leg, over three stages 2205-2215. As shown, in the first stage 2205, the user has now entered the station and proceeded to the appropriate subway platform, to catch the Downtown 1 train. Thus, the navigation banner provides instructions for the user to board the train. In addition, now that the device is located on the platform, the location indicator 2135 is aligned with the platform indicator, and the platform/station label is shown as blue to match the device location indicator.

The second stage 2210 illustrates the navigation display once the user has boarded the transit vehicle for a transit leg, but before the transit vehicle has started progressing along the route. As shown, the application zooms out the transit display to show the entirety of the active leg in some embodiments, in addition to a portion of the subsequent and/or previous legs (as those legs fit within the display). In this case, because the next leg (the L train towards Brooklyn) starts from the same station at which the user will exit the 1 train, a large portion of the L train line is also shown. Both of these transit legs are shown using solid lines in their respective colors, drawn brighter and larger than the other transit lines that are faded into the map background. To differentiate between the active leg and the inactive (past or future) legs of the route, the application of some embodiments labels the stops of the active leg (i.e., 50 St., 42 St.—Times Sq., 34 St.—Penn Sta., etc.), but only shows small circles without labels for the stops of the inactive transit legs (i.e., the stops along the L line). This information also aids the user in anticipating when the user will need to exit the current transit line and transfer to the next leg. In some embodiments, if the user zooms in on the map near the inactive route leg, the application will display the stop/station labels for that leg.

In the third stage, the train (carrying the user and the device) has proceeded along the route to the $50^{th}$ St. station. Once the device has begun to travel along a transit leg of the route, the application of some embodiments modifies the display of (i) the active transit leg and (ii) the location indicator. As shown, the active transit leg is displayed so as to differentiate the traveled portion 2220 of the active leg and the untraveled portion 2225 of the active leg. In this case, the application displays the traveled portion as a solid line (in the same manner as before the user is traveling along the transit leg) while displaying the untraveled portion as two parallel lines (i.e., the solid colored line with a white line down the center).

For the location indicator 2135, some embodiments display an arrow indicating the current direction of travel. In addition, the application displays the current station name in differentiated text alongside the location indicator when the device is located within a station. In this case, the text for the current station (42 St.—Times Sq.) is displayed in slightly larger blue text, as compared to the black text used for the other stations. Some embodiments, when the device is above-ground (e.g., for an above-ground rail, a bus line, etc.) move the location indicator smoothly along the transit route. However, for underground transit routes, when GPS data is not available, some embodiments use SPI to identify when the device passes through a station, and update the location indicator with each station passed.

FIG. 23 illustrates two navigation panels 2305 and 2310 and the corresponding map display as the user first exits one transit leg and navigates to the next transit leg, and then exits the last transit leg. In the first stage 2305, the user has exited the first train (the 1 line) and, as shown by the location indicator 2135, is now in the 14 St. station. In addition, the position and station indicator notes that the user is to perform a transfer from the 1 line to the L line. The mapping application also displays a station polygon 2315 for the 14 St. station and a departure platform indicator (for the Brooklyn Platform of the 6 Av. stop, which connects to the 14 St. stop) to enable the user to easily navigate to the appropriate platform.

Subsequently, the user will walk through the station to the 6 Av. Brooklyn Platform, and board the L train to Brooklyn. During the course of the transit leg along the L train, this will be the active leg, and the application displays the gray L line in the same manner as shown for the red 1 line in the previous FIG. 22. Finally, the second stage 2310 illustrates the navigation display as the user and device arrive at the end of the last transit leg of the route, having disembarked the train. In this case, the navigation banner 2320 specifies for the user to exit the station, following signs for a specific exit (Bedford Ave. & N $7^{th}$ St. NE corner), as this exit will place the user in the optimal location for the final walking portion of the route to the destination. In addition, the map display shows the station polygon 2325 for the Bedford Ave. station, the current location of the user (having disembarked the train), and a location of the exit for the user to take. In addition, the map display includes the initial portion of the walking leg to the destination, again using a thick dashed grey line. Once the user exits the station and is walking along the route, some embodiments use a similar display to that shown in the first stage 2105 of FIG. 21, with a generically-labeled exit and the entire walking route to the destination shown. Some embodiments, at this point, switch from the transit navigation mode to a turn-by-turn walking navigation mode.

C. Transit Station Entrances

As shown above in FIG. 21, during a walking portion of a transit route that ends in a transit station (as opposed to, e.g., a bus stop on a street corner), some embodiments display a specific entrance to the transit station in the map display portion of the navigation panel. This walking portion may be the first portion of the overall transit route (to arrive at the first station), or may be an intermediate portion of the route between two stations. In either case, in some embodiments the mapping service that provides the routes stores data about the different entrances for each transit station.

This enables the mapping service (e.g., a routing server of the mapping service) to provide a route to a specific entrance based on a combination of at least (i) the current location of the user device and (ii) the destination within the transit station to catch the next leg of the transit route. As a result, some embodiments may direct the user to two different entrances of the same station to catch the same transit vehicle (depending on the device's location) or to two different entrances of the same station from the same starting location (to board different transit vehicles in different portions of the station). Some embodiments may include other factors, such as the travel time (if walking travel times can be differentiated on factors other than distance, such as stoplight presence or hills), or the presence of obstacles (e.g., crossing above-ground railroad tracks, construction, etc.).

Figure 24:
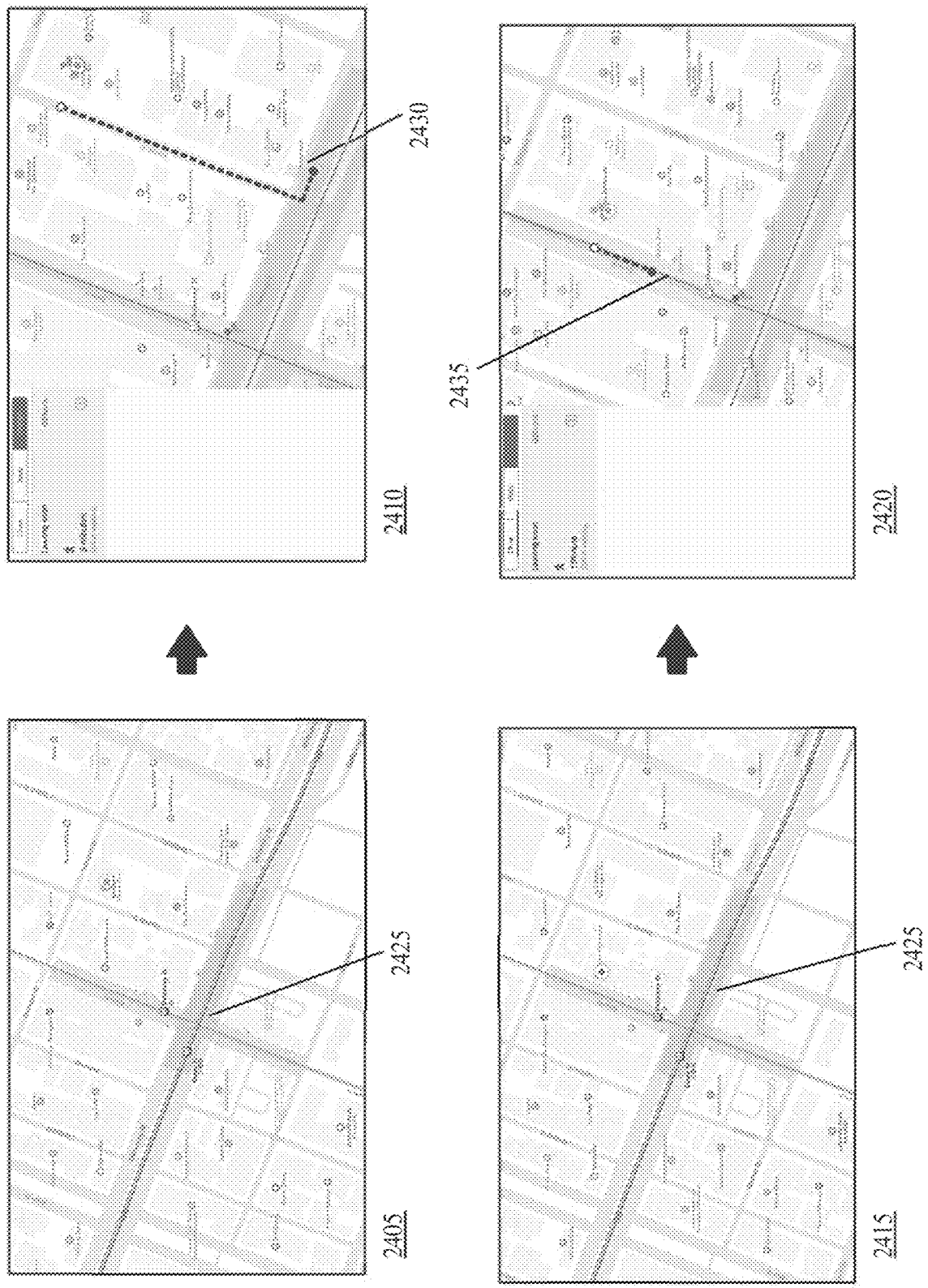
FIG. 24 illustrates two examples of the map display of some embodiments that show walking directions to two different entrances of a transit station.

FIG. 24 illustrates two examples of the map display of some embodiments that show two walking directions to two different entrances of a transit station 2425. In both examples the instructions are for entering the same transit station, but the device starts from two different locations in the two examples. In the first stage 2405 of the first example, the user starts on Norfolk St., while in the first stage 2415 of the second example the user starts on Essex St.

In both examples, the user requires a route to the Essex St.—Delancey St. station. However, the second stage 2410 of the first example 2405 has a walking navigation path directing the user to enter the station via a first entrance 2430, whereas in the second stage 2420 of the second example the walking path directs the user to enter the station via a second entrance 2435. In some cases, even if a first entrance is closer to a desired platform, the mapping service identifies that the user can still enter the station through a second entrance and reach the platform, and that this is easier than navigating to the first entrance. While this example shows the selection of an entrance for two different starting locations, similarly the mapping service may select two different station exits based on two different destinations or disembarking locations.

III. Using Locality-Specific Map Orientations

In the above examples, the mapping application displays the map primarily in a North-up orientation. In some embodiments, this orientation is modifiable through user input (e.g., multi-touch gestures that involves placing two touch points over the map display and rotation the touch points clockwise or counter-clockwise. Just as the user can perform such map manipulation in the standard map mode, some embodiments allow similar manipulation in transit mode (in addition to other browsing techniques, such as swipe gestures to pan the map).

In addition, certain locations may have standard viewing orientations that are not the typical North-up orientation. As an example, in Manhattan, local maps tend to orient the island so that the Avenues all run vertically and the Streets all run horizontally, such that the map is about 29 degrees off of North (in fact, the local population tends to treat the Northeast direction of the Avenues as North within the locality). Thus, some embodiments automatically display the map using this local orientation when (i) a certain locality with a locality-specific map orientation is shown in the map display and (ii) the map is displayed at certain zoom levels. For instance, at very low zoom levels, where no street or local transit information is being shown, some embodiments do not use the locality-specific map orientation, but use the locality-specific orientation once the map is zoomed in to focus more on the specific locality. Some embodiments use this feature specifically in transit browsing mode.

Figure 25:
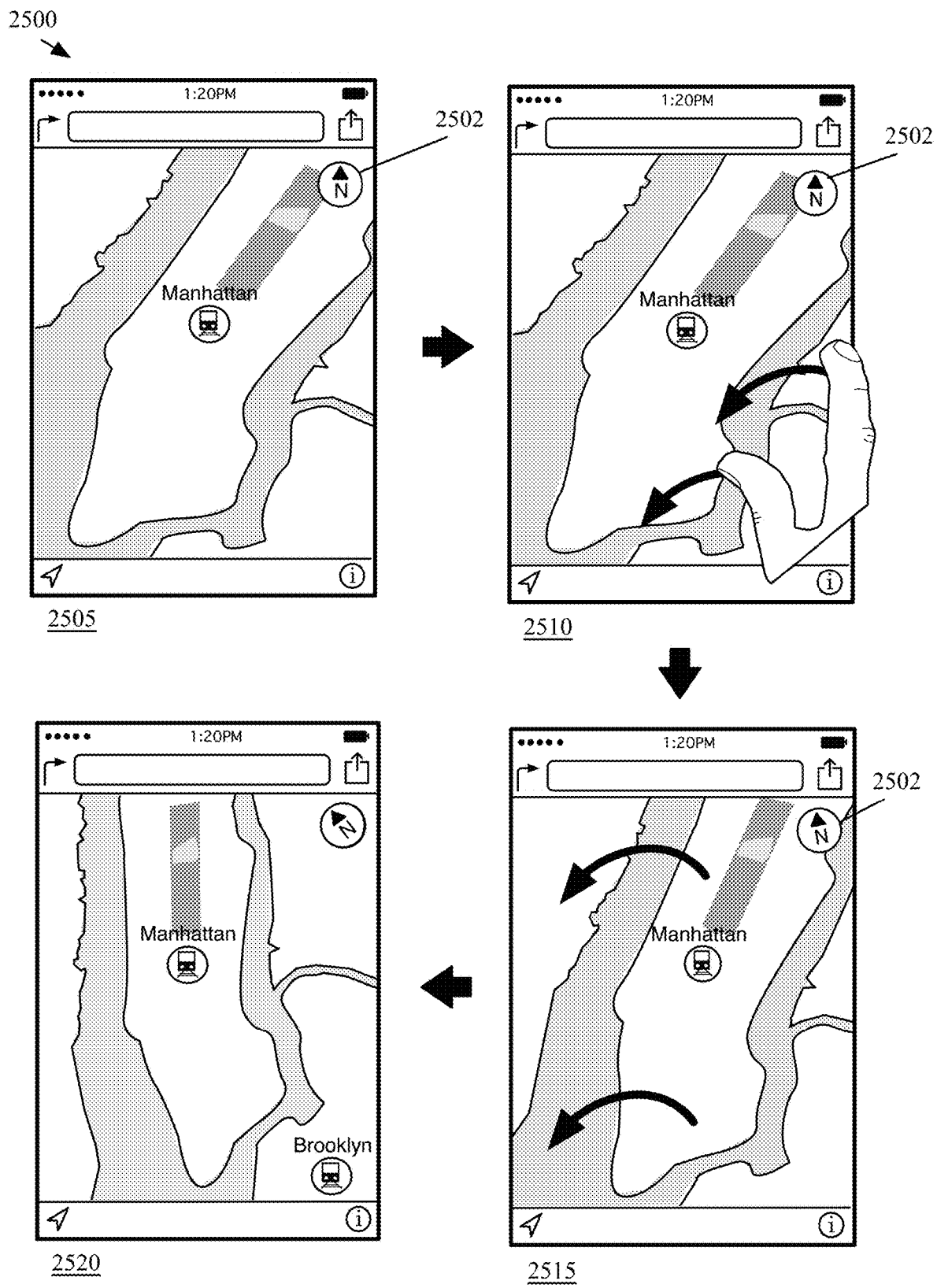
FIG. 25 illustrates an example of the mapping application automatically snapping the map to a locality-specific orientation when the map is rotated near to that orientation.

In some embodiments, the mapping application automatically snaps the map to a locality-specific orientation when the map is rotated near to that orientation. FIG. 25 illustrates an example of such snapping over four stages 2505-2520 of a mapping application GUI 2500 of some embodiments. The first stage 2505 illustrates a touchscreen display on which the mapping application GUI 2500 is displayed, in transit browsing mode. The mapping application GUI 2500 currently displays a map of Manhattan, in transit browsing mode. For the sake of simplicity, the transit lines (e.g., subways, LIRR rails, etc.) are not displayed in this figure. The GUI 2500 also includes a compass 2502 that indicates the map is displayed in the traditional North-up orientation In the second stage 2510, the user begins to rotate the map counter-clockwise by use a touch gesture placing two fingers over the map displaying the GUI 2500 and rotating the two fingers together. As a result, the third stage 2515 illustrates that the map has rotated counterclockwise, with the compass 2502 indicating that the map is no longer displayed in North-up orientation. In addition, at this stage the user has removed the fingers, and is no longer rotating the map display. However, as illustrated, the mapping application continues to rotate the map display counterclockwise at this stage.

In some embodiments, once the map is rotated within a threshold (e.g., an angular threshold) of the locality-specific orientation, the application automatically snaps the map display to the locality-specific orientation by rotating the map to that orientation. Thus, the fourth stage 2520 illustrates that the map display has been adjusted further to the locality-specific orientation, as indicated by the compass 2502 and that Manhattan Island is now oriented vertically (as indicated by Central Park in the center of the island). While shown in transit mode, some embodiments also perform similar operations in standard mode or flyover/satellite mode.

Figure 26:
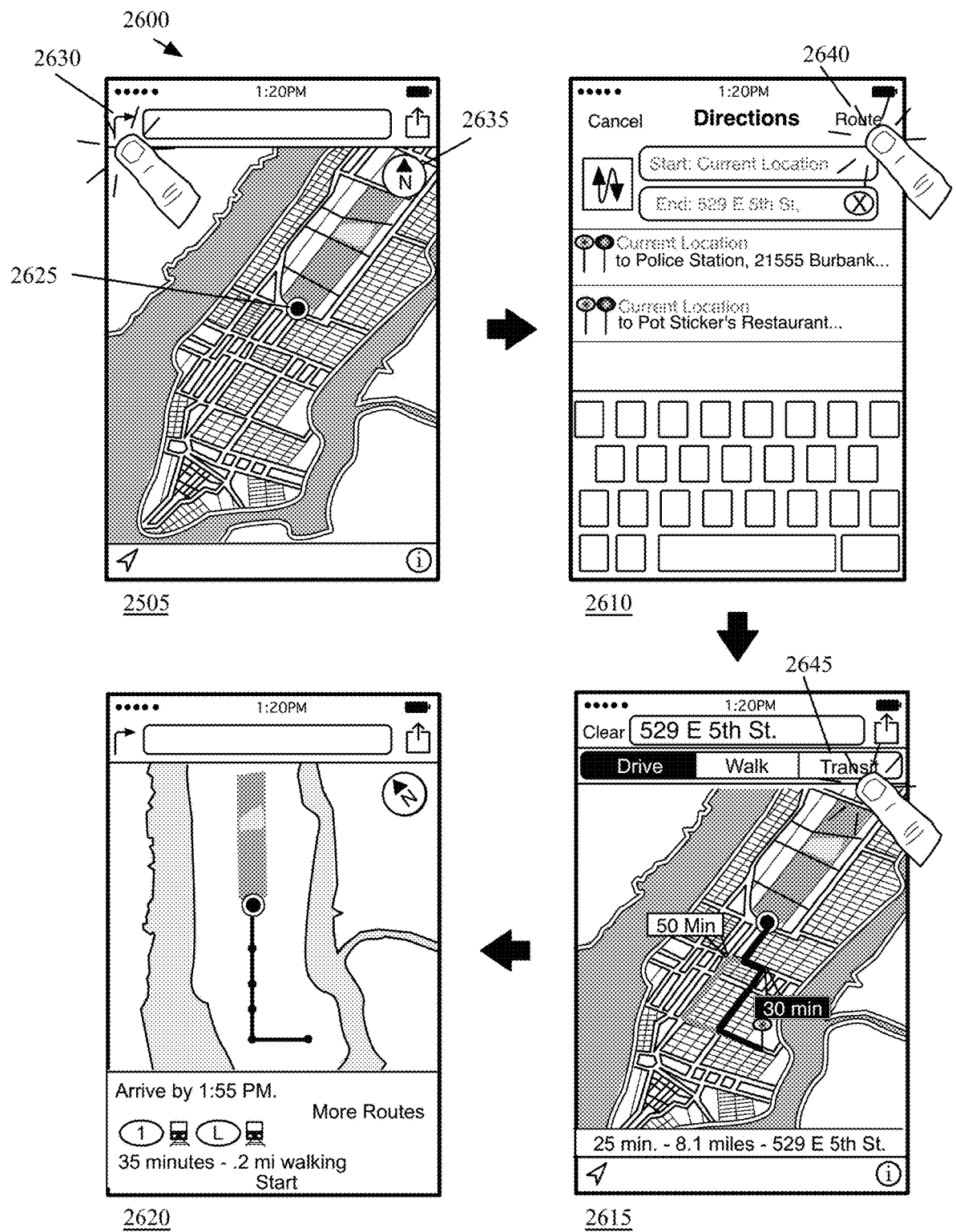
FIG. 26 illustrates an example of the mapping application automatically rotating the map display to a locality-specific orientation when displaying a transit route.

In addition, some embodiments automatically display transit routes in the locality-specific orientation, without any rotational input from the user. FIG. 26 illustrates an example of the mapping application automatically rotating the map display to a locality-specific orientation when displaying a transit route, over four stages 2605-2620 of the mapping application GUI 2600 of some embodiments. As shown, the first stage 2605 illustrates a map of Manhattan in the standard map browsing mode of some embodiments, oriented in the standard North-up orientation (as illustrated by the compass 2635). The GUI 2600 also includes a location indicator 2625 that indicates the current position of the device in the map, and a selectable routing item 2630, which the user selects at this stage.

The second stage 2610 illustrates a directions input field, into which the user has input a request for directions to the address 529 East $5^{th}$ Street. The user also selects the route item 2640, to instruct the mapping application provide one or more routes to the destination. Because the application is currently in standard browsing mode, the third stage illustrates possible driving routes to the requested destination. However, the user might prefer to take public transit to the destination. As such, in this stage, the user selects the transit routing option 2645, one of three controls for requesting different types of routes (driving, walking, and transit). These controls allow the user to switch between different types of routes (i.e., different routing modes).

Lastly, the fourth stage 2620 illustrates that the mapping application now displays a transit route in response to the user selection. In some embodiments, the application displays a single route 2650 from the current location of the device to the requested destination. The details of the route presentation are described in U.S. patent application Ser. No. 14/869,403 filed Sep. 29, 2015 entitled "Map Application with Transit Navigation Mode", which is incorporated by reference above. As shown, in some embodiments the application presents the transit route 2660 using the locality-specific orientation, as shown by the compass 2635 and the orientation of Manhattan perpendicular to the edges of the map display. In some embodiments, however, the application displays the route in the current map orientation, but can be snapped to the locality-specific orientation by user rotation of the map display.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 27:
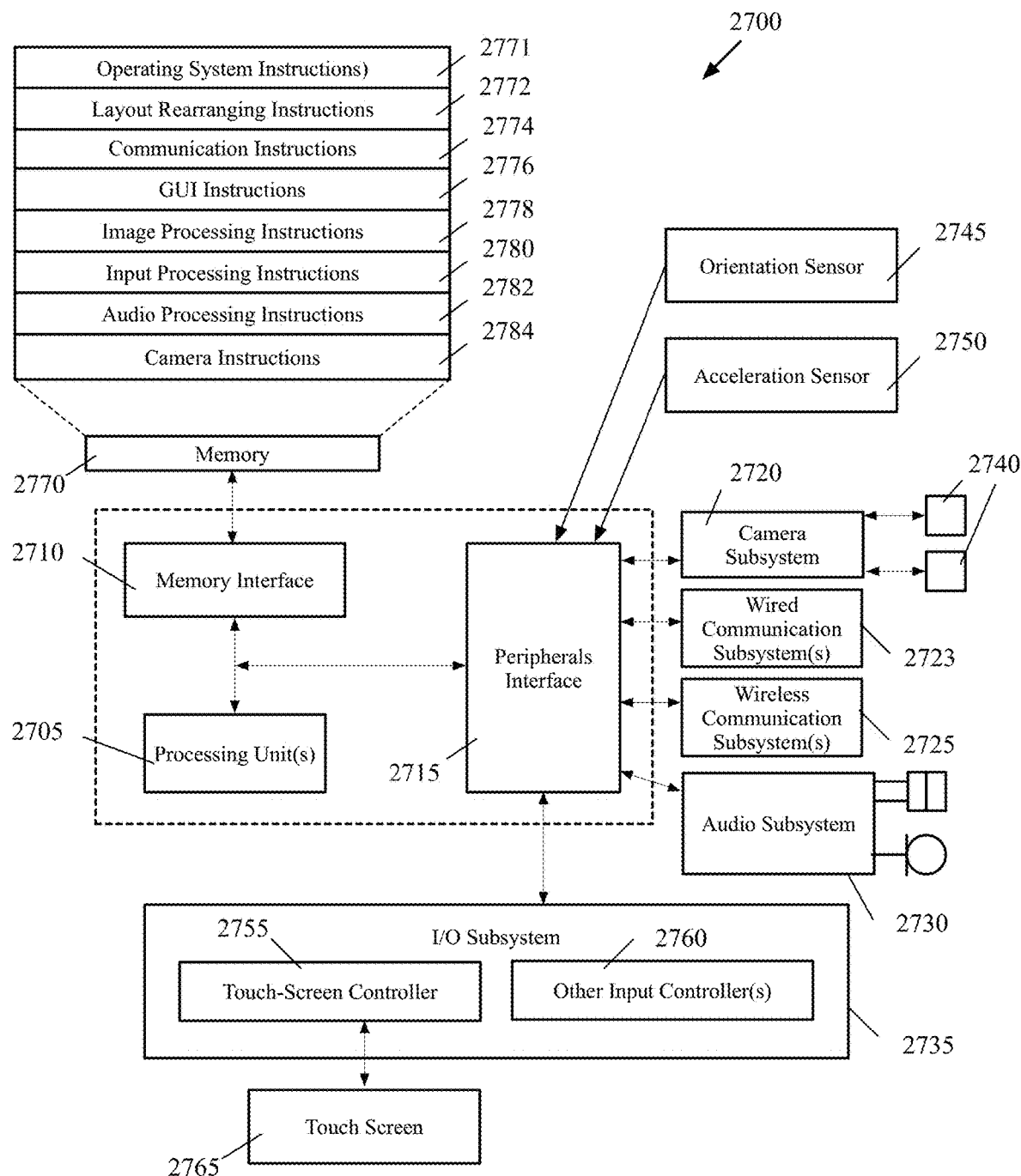
FIG. 27 illustrates an example of an architecture of a mobile computing device with which some embodiments are implemented.

The user data sharing of some embodiments occurs on mobile devices, such as smart phones (e.g., iPhones®) and tablets (e.g., iPads®). FIG. 27 is an example of an architecture 2700 of such a mobile computing device. As shown, the mobile computing device 2700 includes one or more processing units 2705, a memory interface 2710 and a peripherals interface 2715.

The peripherals interface 2715 is coupled to various sensors and subsystems, including a camera subsystem 2720, a wired communication subsystem(s) 2723, a wireless communication subsystem(s) 2725, an audio subsystem 2730, an I/O subsystem 2735, etc. The peripherals interface 2715 enables communication between the processing units 2705 and various peripherals. For example, an orientation sensor 2745 (e.g., a gyroscope) and an acceleration sensor 2750 (e.g., an accelerometer) is coupled to the peripherals interface 2715 to facilitate orientation and acceleration functions.

The camera subsystem 2720 is coupled to one or more optical sensors 2740 (e.g., a charged coupled device (CCD) optical sensor, a complementary metal-oxide-semiconductor (CMOS) optical sensor, etc.). The camera subsystem 2720 coupled with the optical sensors 2740 facilitates camera functions, such as image and/or video data capturing. The wired communication subsystem 2723 and wireless communication subsystem 2725 serve to facilitate communication functions.

In some embodiments, the wireless communication subsystem 2725 includes radio frequency receivers and transmitters, and optical receivers and transmitters (not shown in FIG. 27). These receivers and transmitters of some embodiments are implemented to operate over one or more communication networks such as a GSM network, a Wi-Fi network, a Bluetooth network, etc. The audio subsystem 2730 is coupled to a speaker to output audio (e.g., to output voice navigation instructions). Additionally, the audio subsystem 2730 is coupled to a microphone to facilitate voice-enabled functions in some embodiments.

The I/O subsystem 2735 involves the transfer between input/output peripheral devices, such as a display, a touch screen, etc., and the data bus of the processing units 2705 through the peripherals interface 2715. The I/O subsystem 2735 includes a touch-screen controller 2755 and other input controllers 2760 to facilitate the transfer between input/output peripheral devices and the data bus of the processing units 2705. As shown, the touch-screen controller 2755 is coupled to a touch screen 2765. The touch-screen controller 2755 detects contact and movement on the touch screen 2765 using any of multiple touch sensitivity technologies. The other input controllers 2760 are coupled to other input/control devices, such as one or more buttons. Some embodiments include a near-touch sensitive semen and a corresponding controller that can detect near-touch interactions instead of or in addition to touch interactions.

The memory interface 2710 is coupled to memory 2770. In some embodiments, the memory 2770 includes volatile memory (e.g., high-speed random access memory), non-volatile memory (e.g., flash memory), a combination of volatile and non-volatile memory, and/or any other type of memory. As illustrated in FIG. 27, the memory 2770 stores an operating system (OS) 2771. The OS 2771 includes instructions for handling basic system services and for performing hardware dependent tasks. The memory 2770 additionally includes layout rearranging instructions 2772 in order for the device 2700 to perform the layout rearranging process of some embodiments. In some embodiments, these instructions 2772 may be a subset of the operating system instructions 2771, or may be part of the instructions for an application.

The memory 2770 also includes communication instructions 2774 to facilitate communicating with one or more additional devices (e.g., for peer-to-peer data sharing, or to connect to a server through the Internet for cloud-based data sharing); graphical user interface instructions 2776 to facilitate graphic user interface processing; image processing instructions 2778 to facilitate image-related processing and functions; input processing instructions 2780 to facilitate input-related (e.g., touch input) processes and functions; audio processing instructions 2782 to facilitate audio-related processes and functions; and camera instructions 2784 to facilitate camera-related processes and functions. The instructions described above am merely exemplary and the memory 2770 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 27 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 27 may be split into two or more integrated circuits.

B. Computer System

Figure 28:
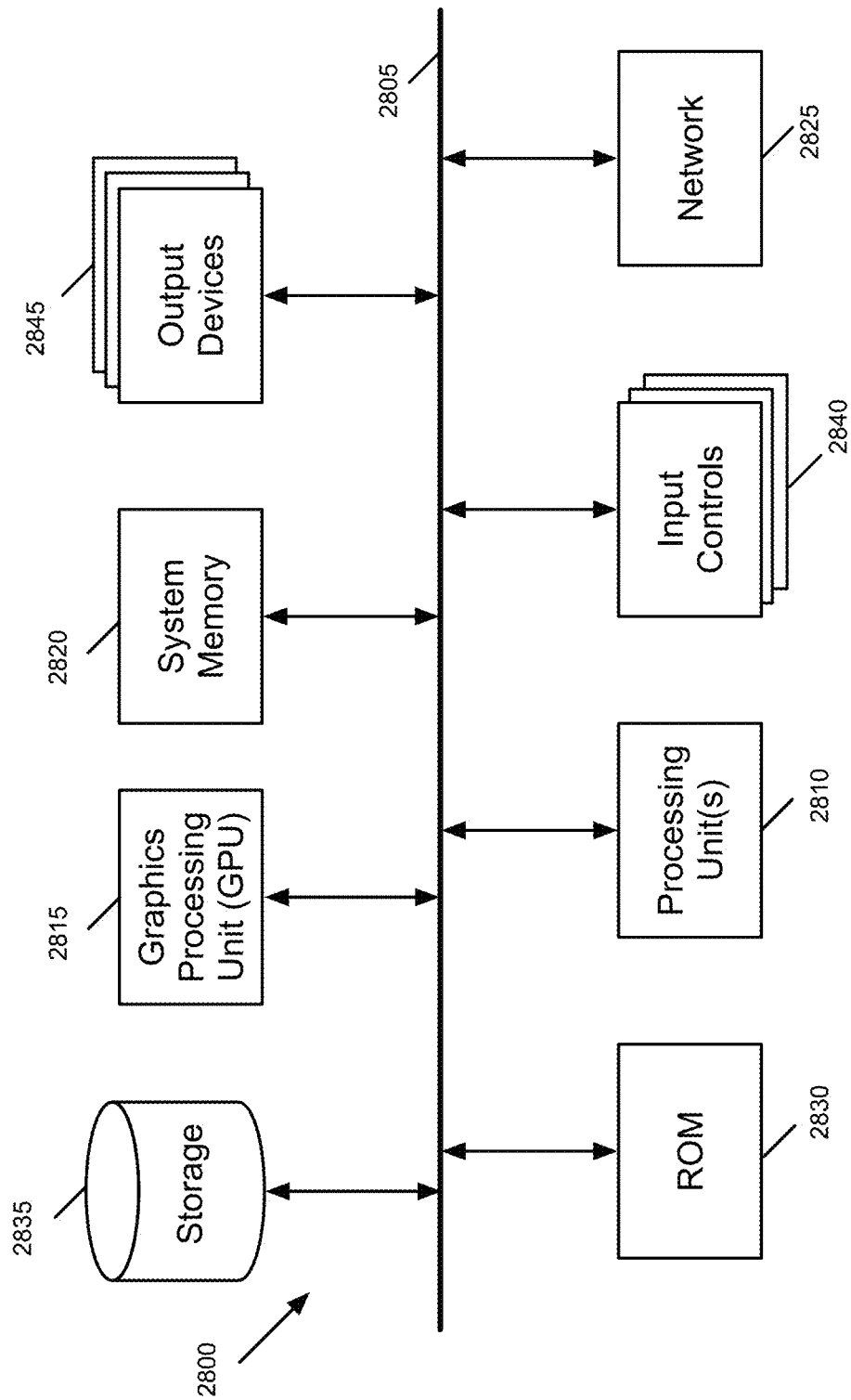
FIG. 28 conceptually illustrates another example of an electronic system with which some embodiments of the invention are implemented.

FIG. 28 conceptually illustrates another example of an electronic system 2800 with which some embodiments of the invention are implemented. The electronic system 2800 may be a computer (e.g., a desktop computer, personal computer, tablet computer, etc.), phone. PDA, or any other sort of electronic or computing device. Such an electronic system includes various types of computer readable media and interfaces for various other types of computer readable media. Electronic system 2800 includes a bus 2805, processing unit(s) 2810, a graphics processing unit (GPU) 2815, a system memory 2820, a network 2825, a read-only memory 2830, a permanent storage device 2835, input devices 2840, and output devices 2845.

The bus 2805 collectively represents all system, peripheral, and chipset buses that communicatively connect the numerous internal devices of the electronic system 2800. For instance, the bus 2805 communicatively connects the processing unit(s) 2810 with the read-only memory 2830, the GPU 2815, the system memory 2820, and the permanent storage device 2835.

From these various memory units, the processing unit(s) 2810 retrieves instructions to execute and data to process in order to execute the processes of the invention. The processing unit(s) may be a single processor or a multi-core processor in different embodiments. Some instructions are passed to and executed by the GPU 2815. The GPU 2815 can offload various computations or complement the image processing provided by the processing unit(s) 2810. In some embodiments, such functionality can be provided using CoreImage's kernel shading language.

The read-only-memory (ROM) 2830 stores static data and instructions that are needed by the processing unit(s) 2810 and other modules of the electronic system. The permanent storage device 2835, on the other hand, is a read-and-write memory device. This device is a non-volatile memory unit that stores instructions and data even when the electronic system 2800 is off. Some embodiments of the invention use a mass-storage device (such as a magnetic or optical disk and its corresponding disk drive, integrated flash memory) as the permanent storage device 2835.

Other embodiments use a removable storage device (such as a floppy disk, flash memory device, etc., and its corresponding drive) as the permanent storage device. Like the permanent storage device 2835, the system memory 2820 is a read-and-write memory device. However, unlike storage device 2835, the system memory 2820 is a volatile read-and-write memory, such a random access memory. The system memory 2820 stores some of the instructions and data that the processor needs at runtime. In some embodiments, the invention's processes are stored in the system memory 2820, the permanent storage device 2835, and/or the read-only memory 2830. For example, the various memory units include instructions for processing multimedia clips in accordance with some embodiments. From these various memory units, the processing unit(s) 2810 retrieves instructions to execute and data to process in order to execute the processes of some embodiments.

The bus 2805 also connects to the input and output devices 2840 and 2845. The input devices 2840 enable the user to communicate information and select commands to the electronic system. The input devices 2840 include alphanumeric keyboards and pointing devices (also called "cursor control devices"), cameras (e.g., webcams), microphones or similar devices for receiving voice commands, etc. The output devices 2845 display images generated by the electronic system or otherwise output data. The output devices 2845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 28, bus 2805 also couples electronic system 2800 to a network 2825 through a network adapter (not shown). In this manner, the computer can be a part of a network of computers (such as a local area network ("LAN"), a wide area network ("WAN"), or an Intranet), or a network of networks, such as the Internet. Any or all components of electronic system 2800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM. ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments ae performed by one or more integrated circuits, such as application specific integrated circuits (ASICs) or field programmable gate arrays (FPGAs). In some embodiments, such integrated circuits execute instructions that ae stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signal, wired download signals, and any other ephemeral signals.

V. Map Service Environment

Figure 29:
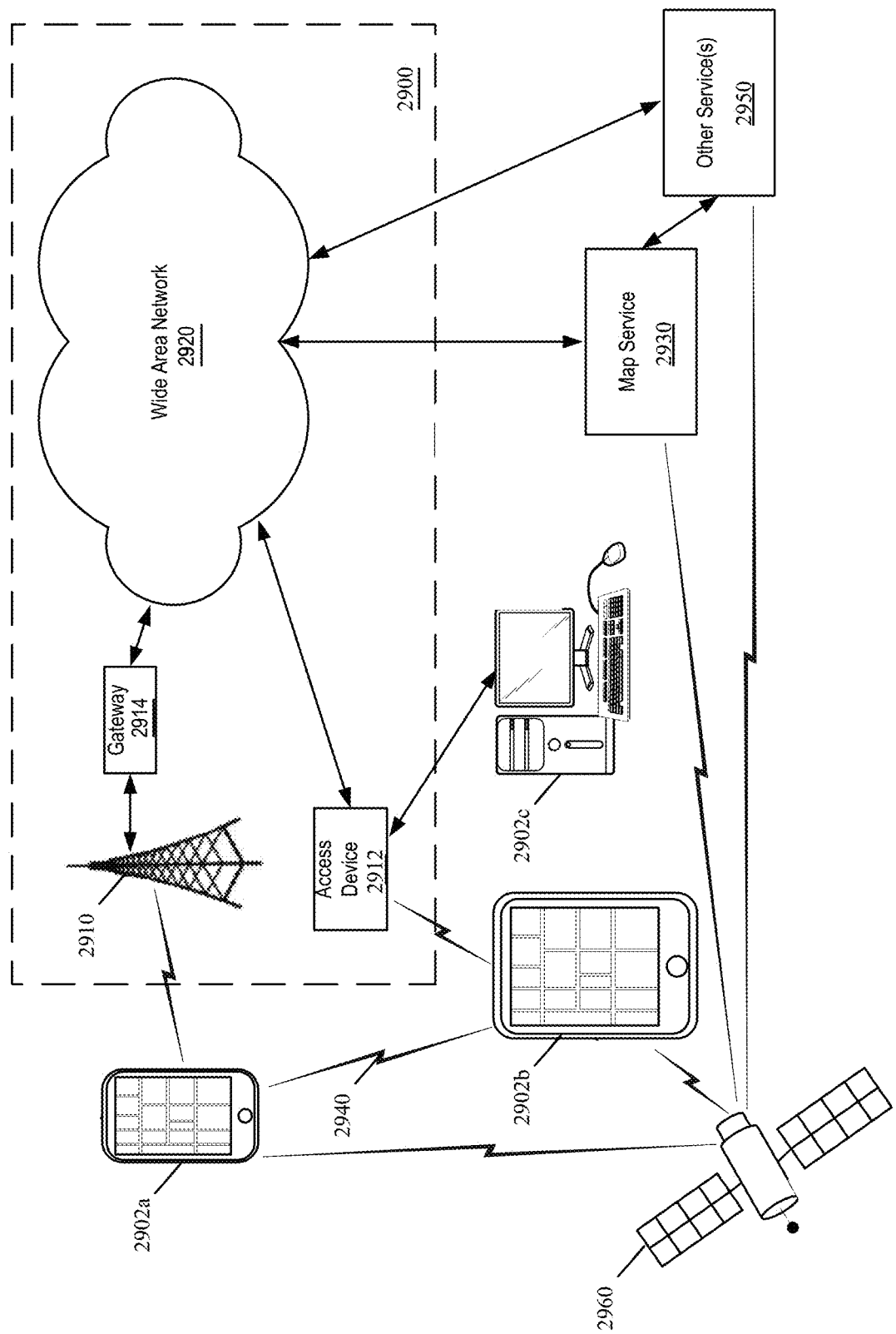
FIG. 29 illustrates a map service operating environment, according to some embodiments.

Various embodiments may operate within a map service operating environment. FIG. 29 illustrates one possible embodiment of an operating environment 2900 for a map service (also referred to as a mapping service) 2930 and client devices 2902a-2902c. In some embodiments, devices 2902a, 2902b, and 2902c communicate over one or mom wired or wireless networks 2910. For example, wireless network 2910, such as a cellular network, can communicate with a wide area network (WAN) 2920, such as the Internet, by use of gateway 2914. A gateway 2914 in some embodiments provides a packet oriented mobile data service, such as General Packet Radio Service (GPRS), or other mobile data service allowing wireless networks to transmit data to other networks, such as wide area network 2920. Likewise, access device 2912 (e.g., IEEE 2902.11g wireless access device) provides communication access to WAN 2920.

The client devices 2902a and 2902b can be any portable electronic or computing device capable of communicating with a map service (e.g., smart phone, tablet, laptop computer, etc.). Device 2902c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 2902a-2902c are not shown as each accessing the map service 2930 via either the wireless network 2910 and gateway 2914 or the access device 2912, one of ordinary skill in the art will recognize that the client devices of some embodiments may access the map service via multiple different wired and/or wireless protocols.

Devices 2902a-2902c can also establish communications by other means. For example, these devices may communicate with other wireless devices (e.g., other devices 2902b, cell phones, etc.) over the wireless network 2910 or through access device 2912. Likewise the devices 2902a-2902c can establish peer-to-peer communications 2940 (e.g., a personal area network) by use of one or more communication subsystems, such as Bluetooth® communication or similar peer-to-peer protocols.

Devices 2902a-2902c may also receive Global Positioning Satellite (GPS) signals from GPS satellites 2960. In addition, in some embodiments the map service 2930 and other services 2950 may also receive GPS signals from GPS satellites 2960.

A map service 2930 may provide map services for one or more client devices 2902a-2902c in communication with the map service 2930 through various communication methods and protocols. A map service 2930 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 2902a-2902c may utilize these map services to obtain the various map service data, then implement various techniques to process the data and provide the processed data to various entities (e.g., internal software or hardware modules, display screens of the client devices, external display screens, or other external systems or devices.

The map service 2930 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 2902a-2902c, the map service 2930 of some embodiments, performs various optimization techniques to analyze a map tile before encoding the tile.

In some embodiments, the map tiles are generated by the map service 2930 for different possible display resolutions at the client devices 2902a-2902c. In some embodiments, the higher zoom levels may include mom detail (e.g., more street level information, etc.). On the other hand, map tiles for lower zoom levels may omit certain data (e.g., the street level details would not be used when displaying the entire earth).

To generate the map information (e.g., map tiles), the map service 2930 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 2930 responds to requests from the client devices 2902a-2902c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 2902a-2902c that obtain map service data from the map service 2930 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 2902a-2902c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 2930. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 2902a-2902c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc., The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 2930 and/or other service(s) 2950 are configured to process search requests from any of the client devices. Search requests may include but are not limited to queries for businesses, addresses, residential locations, points of interest, or some combination thereof. Map service 2930 and/or other service(s) 2950 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 2930 and/or other service(s) 2950 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 2930 and/or other service(s) 2950, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 2930 and/or other service(s) 2950 provide one or more feedback mechanisms to receive feedback from client devices 2902a-2902c. For instance, client devices may provide feedback on search results to map service 2930 and/or other service(s) 2950 (e.g., feedback specifying ratings, reviews, temporary or permanent business closures, errors etc.); this feedback may be used to update information about points of interest in order to provide more accurate or more up-to-date search results in the future. In some embodiments, map service 2930 and/or other service(s) 2950 may provide testing information to the client device (e.g., an A/B test) to determine which search results are best. For instance, at random intervals, the client device may receive and present two search results to a user and allow the user to indicate the best result. The client device may report the test results to map service 2930 and/or other service(s) 2950 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, a number of the figures (including FIGS. 7, 16, and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
presenting a first graphical element representing a transit feature on a transit map at a first zoom level, the first graphical element having a nondescript appearance;
receiving a zoom input for transitioning the transit map to a second zoom level;
determining that the zoom input causes a zoom level of the transit map to cross a zoom level threshold; and
in response to the determination, replacing the first graphical element with a second graphical element representing the transit feature at the second zoom level, the second graphical element having a second appearance representing a transit authority for the transit feature.

2. The method of claim 1, wherein zooming out causes the transit map to replace the second appearance with the nondescript appearance.

3. The method of claim 1, wherein the second graphical element corresponds to an icon used by the transit authority for the transit feature.

4. The method of claim 1, wherein the transit feature is one or more of a transit line, a transit stop, a transit platform, and a transit vehicle.

5. The method of claim 1, wherein the second appearance includes a badge used by the transit authority, a logo that identifies the transit authority in the physical world, a color used by the transit authority, or at least one textual feature used by the transit authority.

6. The method of claim 1, wherein the transit feature is a transit stop traversed by a plurality of transit lines, further comprising:
presenting the transit stop with the nondescript appearance at the first zoom level, including presenting a plurality of transit features representing the plurality of transit lines with a single graphical element;
receiving the zoom input; and
in response to receiving the zoom input, replacing the single graphical element with a plurality of graphical elements representing the plurality of transit lines.

7. The method of claim 1, wherein the plurality of graphical elements includes a plurality of badges that are used by a plurality of transit authorities to represent the plurality of transit lines in the physical world.

8. A non-transitory machine-readable medium storing a mapping application for execution by at least one processing unit of a mobile device, the mapping application comprising sets of instructions for:
presenting a first graphical element representing a transit feature on a transit map at a first zoom level, the first graphical element having a nondescript appearance;
receiving a zoom input for transitioning the transit map to a second zoom level;
determining that the zoom input causes a zoom level of the transit map to cross a zoom level threshold; and
in response to the determination, replacing the first graphical element with a second graphical element representing the transit feature at the second zoom level, the second graphical element having a second appearance representing a transit authority for the transit feature.

9. The non-transitory machine-readable medium of claim 8, wherein zooming out causes the transit map to replace the second appearance with a nondescript appearance.

10. The non-transitory machine-readable medium of claim 8, wherein the second graphical element corresponds to an icon used by the transit authority for the transit feature.

11. The non-transitory machine-readable medium of claim 8, wherein the transit feature is one or more of a transit line, a transit stop, a transit platform, and a transit vehicle.

12. The non-transitory machine-readable medium of claim 8, wherein the second appearance includes a badge used by the transit authority, a logo that identifies the transit authority in the physical world, a color used by the transit authority, or at least one textual feature used by the transit authority.

13. The non-transitory machine-readable medium of claim 8, wherein the transit feature is a transit stop traversed by a plurality of transit lines, and wherein the program further comprises sets of instructions for:
presenting the transit stop with the nondescript appearance at the first zoom level, including presenting a plurality of transit features representing the plurality of transit lines with a single graphical element;
receiving the zoom input; and
in response to receiving the zoom input, replacing the single graphical element with a plurality of graphical elements representing the plurality of transit lines.

14. The non-transitory machine-readable medium of claim 8, wherein the plurality of graphical elements includes a plurality of badges that are used by a plurality of transit authorities to represent the plurality of transit lines in the physical world.

15. An electronic device comprising:
a set of processing units for executing sets of instructions; and
a non-transitory machine readable medium storing a map application executable by at least one of the processing units of the device, the application comprising sets of instructions for:
presenting a first graphical element representing a transit feature on a transit map at a first zoom level, the first graphical element having a nondescript appearance;

receiving a zoom input for transitioning the transit map to a second zoom level;

determining that the zoom input causes a zoom level of the transit map to cross a zoom level threshold; and in response to the determination, replacing the first graphical element with a second graphical element representing the transit feature at the second zoom level, the second graphical element having a second appearance representing a transit authority for the transit feature.

16. The electronic device of claim 15, wherein zooming out causes the transit map to replace the second appearance with a nondescript appearance.

17. The electronic device of claim 15, wherein the second graphical element corresponds to an icon used by the transit authority for the transit feature.

18. The electronic device of claim 15, wherein the transit feature is one or more of a transit line, a transit stop, a transit platform, and a transit vehicle.

19. The electronic device of claim 15, wherein the second appearance includes a badge used by the transit authority, a logo that identifies the transit authority in the physical world, a color used by the transit authority, or at least one textual feature used by the transit authority.

20. The electronic device of claim 15, wherein the application further comprises sets of instructions for:

presenting the transit stop with the nondescript appearance at the first zoom level, including presenting a plurality of transit features representing the plurality of transit lines with a single graphical element;

receiving the zoom input; and in response to receiving the zoom input, replacing the single graphical element with a plurality of graphical elements representing the plurality of transit lines.

* * * * *